United States Patent
Moriguchi et al.

(10) Patent No.: US 6,681,000 B1
(45) Date of Patent: Jan. 20, 2004

(54) SIGNAL CONVERTER SERVER NETWORK INFORMATION SYSTEM CONTROL METHODS THEREOF AND TELEPHONE TERMINAL

(75) Inventors: Atsushi Moriguchi, Tokyo (JP); Takatoshi Itagaki, Tokyo (JP)

(73) Assignee: NTT DoCoMo, Inc, (JP)

( * ) Notice: Subject to any disclaimer, the term of this patent is extended or adjusted under 35 U.S.C. 154(b) by 0 days.

(21) Appl. No.: 09/787,739

(22) PCT Filed: Jul. 31, 2000

(86) PCT No.: PCT/JP00/05143

§ 371 (c)(1),
(2), (4) Date: Mar. 20, 2001

(87) PCT Pub. No.: WO01/10103

PCT Pub. Date: Feb. 8, 2001

(30) Foreign Application Priority Data

Jul. 30, 1999 (JP) .......................... 11-218232
Dec. 8, 1999 (JP) .......................... 11-349525

(51) Int. Cl.[7] .............................. H04M 11/00
(52) U.S. Cl. ....................... 379/90.01; 379/88.17; 379/88.18
(58) Field of Search ................ 379/90.01, 77, 379/88.04, 88.05, 88.11, 88.13, 88.17, 88.18, 88.19, 88.2, 88.21, 88.22, 88.23, 92.02, 93.02, 93.03, 93.04, 93.05–93.09, 93.12, 93.13, 93.25, 93.26, 100.11, 101.01, 102.01, 102.02, 102.03

(56) References Cited

U.S. PATENT DOCUMENTS 5,884,262 A * 3/1999 Wise et al. ............... 379/88.01

FOREIGN PATENT DOCUMENTS

| EP | 0 797 338 A2 | 9/1997 | |
|----|---|---|---|
| JP | 403089691 A * | 4/1991 | ............ H04N/7/14 |
| JP | 405110703 A * | 4/1993 | ........... H04M/11/00 |
| JP | 6-261318 | 9/1994 | |
| JP | 408056267 A * | 2/1995 | ........... H04M/11/00 |
| JP | 7-58878 | 3/1995 | |
| JP | 8-88689 | 4/1996 | |
| JP | 8-317119 | 11/1996 | |
| JP | 10-75307 | 3/1998 | |
| JP | 10-307766 | 11/1998 | |
| JP | 411041288 A * | 2/1999 | ............ H04L/12/56 |
| JP | 11-164058 | 6/1999 | |
| JP | 411163759 A * | 6/1999 | ............. H04B/1/40 |

OTHER PUBLICATIONS

"Email in the Palm of Your Hand, Soon to Take On the Internet," Part 2: Product Planning, Nikkei Electronics, Mar. 22, 1999, No. 739, pp. 127–131 (original Japanese and English translation).

* cited by examiner

Primary Examiner—Melur Ramakrishnaiah
(74) Attorney, Agent, or Firm—Brinks Hofer Gilson & Lione

(57) ABSTRACT

Since telephone terminals 301, 302 and 303 are used as control terminals in a network information system by using DTMF signals (or packet signals), there is no need for a specially designed terminal or computer system, and any user (or researchee) who has the telephone terminal can respond to a server. In addition, by using a calling function, which is essentially provided to the telephone terminals, when the system is in use, audio communication can be easily established between users.

17 Claims, 36 Drawing Sheets

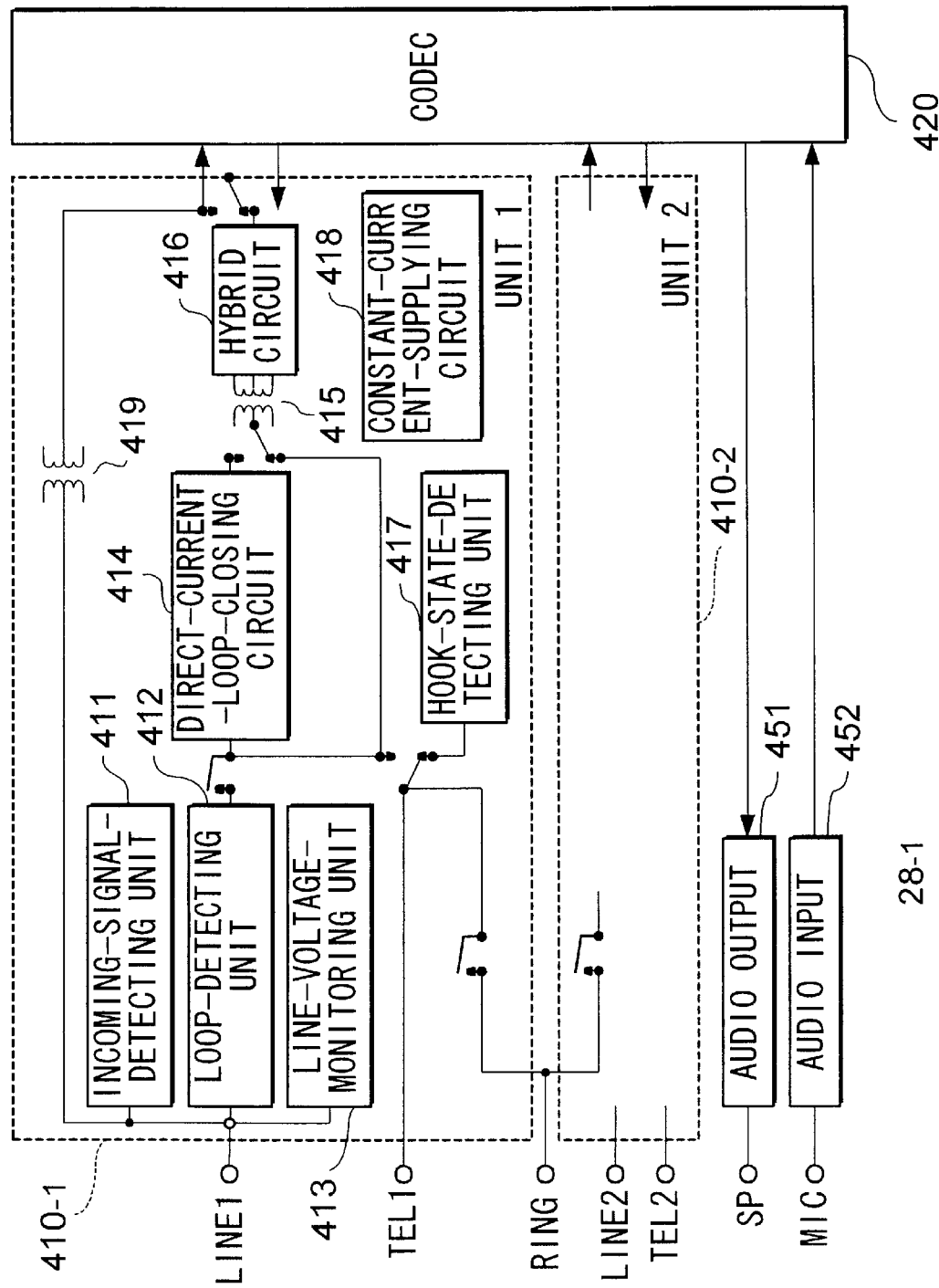

FIG. 30

| LINE NUMBER | CALLER NUMBER |
|---|---|
| 28-1 { L1=0 | 09012345678 |
|      { L2=1 | 09012345321 |
| 28-2 { L1=2 | 09045678901 |
|      { L2=3 | 09043219876 |
| ⋮ | |
| 28-n { L1=2n-2 | — |
|      { L2=2n-1 | — |

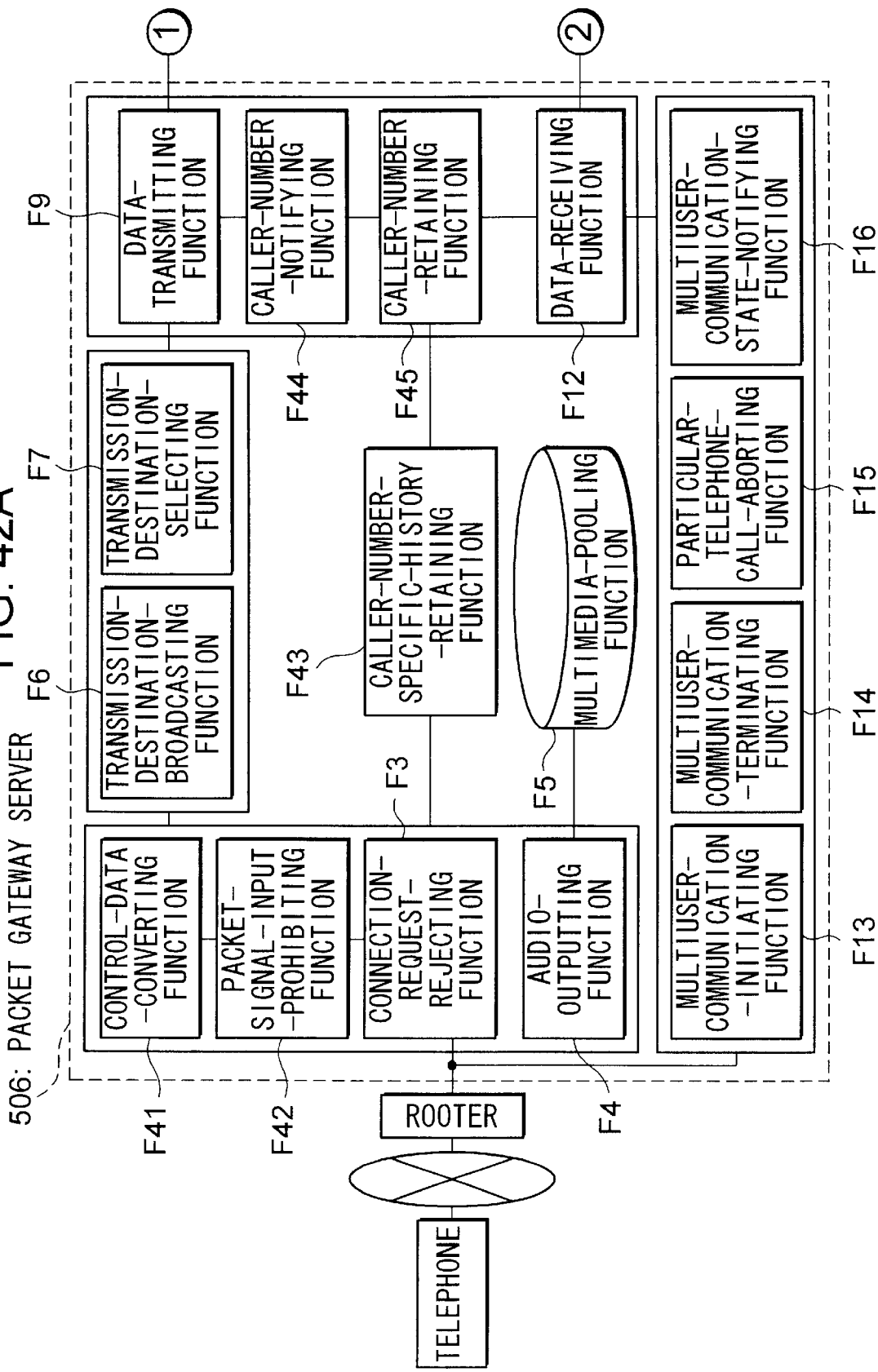

SIGNAL CONVERTER SERVER NETWORK INFORMATION SYSTEM CONTROL METHODS THEREOF AND TELEPHONE TERMINAL

TECHNICAL FIELD

The present invention relates to a signal converter, a server, a network information system, control methods thereof and a telephone terminal and, more specifically, to a signal converter which realizes the control of a server by using a DTMF (Dual Tone Multi Frequency) signal, i.e., a PB (Push Button) signal or a packet signal, from a telephone terminal such as a portable telephone terminal or a stationary telephone terminal, a server, a network information system, control methods thereof and a telephone terminal.

BACKGROUND ART

As a system in which a user can communicate with an information provider interactively, a personal computer communication system and a system that collects questionnaires in real time are known.

Particularly in recent years, along with the development of personal computer communications, a network game has been receiving attention. This network game can be enjoyed in a variety of ways such as playing against unknown players or solving riddles with a number of other players gathered in the same field.

However, the above conventional system has a problem in that each of the players must develop a computer system, which makes the game difficult to participate in for some players.

That is, when a number of players play against one another, a personal computer connected to a network environment such as LAN (Local Area Network) is essential for each of the players.

However, there are not many places with a substantial LAN environment as exemplified by offices, it has been nearly impossible to implement a LAN environment to which a plurality of personal computers are connected.

Further, when a number of players wish to play against one another, they must gather in the same field, which makes it difficult for them to play against one another.

As a solution to these problems, a network game using the Internet is available. However, such a network game also requires each player to implement a computer system and is not a system in which everybody can participate easily.

Further, in the case of the system that collects questionnaires in real time, it is necessary to use specifically designed terminals, and the implementation and modification of the system are not always easy.

If widely popular telephone terminals (stationary telephone terminals, portable telephone terminals (=mobile telephones including PHS)) can be used as controllers, the above problems can be solved at a time.

Therefore, the object of the present invention is to provide a signal converter that can respond to the information provided by an information provider (i.e., server) by using a telephone terminal as a controller, a server, a network information system, control methods thereof and a telephone terminal.

DISCLOSURE OF THE INVENTION

The first embodiment of the present invention is a signal converter that is connected to a server via a communication line to output control data to the server, comprising a signal-converting unit that converts a DTMF signal from a telephone terminal connected via a public communication line into predetermined control data and a data-transmitting unit that transmits the control data to the server via the communication line.

The second embodiment of the present invention is the first embodiment of the present invention, which further comprises a connection-request-rejecting unit that rejects a connection request from a telephone terminal other than the telephone terminal registered in advance.

The third embodiment of the present invention is the second embodiment of the present invention, in which the connection-request-rejecting unit further comprises a connection-not-granted message-transmitting unit that transmits a connection-not-granted message to the telephone terminal other than the telephone terminal registered in advance when receiving a connection request from the telephone terminal.

The fourth embodiment of the present invention is the first embodiment of the present invention, which further comprises an audio-information-storing unit that stores audio information in advance, and an audio-information-transmitting unit that reads the audio information from the audio-information-storing unit and transmits it to the telephone terminal when audio-output-instructing data is inputted from the server.

The fifth embodiment of the present invention is the first embodiment of the present invention, in which the data-transmitting unit further comprises a data-transmission-prohibiting unit that prohibits the transmission of the control data corresponding to the telephone terminal other than the telephone terminal which is permitted to transmit the control data at a predetermined timing when receiving DTMF signals from a plurality of telephone terminals.

The sixth embodiment of the present invention is the first embodiment of the present invention, in which the number of communication lines is at least two and the data-transmitting unit transmits the same control data to the plurality of communication lines simultaneously.

The seventh embodiment of the present invention is the first embodiment of the present invention, which further comprises a target-server-selecting unit that selects a server to which the signal converter should be connected via the communication line when a predetermined DTMF signal is inputted.

The eighth embodiment of the present invention is the first embodiment of the present invention, which further comprises a telephone-terminal-identifying-information-providing unit that provides the server with the caller number of the telephone terminal or the caller identification number corresponding to the caller number and the line number corresponding to the telephone terminal identified by the caller number.

The ninth embodiment of the present invention is the eighth embodiment of the present invention, which further comprises a line-information-storing unit that stores the caller number or the caller identification number corresponding to the caller number and the line number corresponding to the telephone terminal identified by the caller number.

The tenth embodiment of the present invention is the eighth embodiment of the present invention, in which the data-transmitting unit transmits the line number when transmitting the control data to the server via the communication line.

The eleventh embodiment of the present invention is the first embodiment of the present invention, which further comprises an audio-channel-establishing unit that establishes an audio channel which enables audio communication at least between two of the telephone terminals when a plurality of the telephone terminals are connected via the public communication lines.

The twelfth embodiment of the present invention is the eleventh embodiment of the present invention, in which the audio-channel-establishing unit establishes the audio channel between the telephone terminals corresponding to the connection-instructing data from the server.

The thirteenth embodiment of the present invention is the eleventh embodiment of the present invention, in which the connection-instructing data is predetermined binary data.

The fourteenth embodiment of the present invention is the eleventh embodiment of the present invention, which further comprises a channel-disconnecting unit that disconnects the telephone terminal corresponding to the audio channel established by the audio-channel-establishing unit from the audio channel on the basis of the instruction data outputted by the server when a predetermined DTMF signal is inputted from the telephone terminal or the instruction data outputted by the server by itself.

The fifteenth embodiment of the present invention is a server that is connected via a public communication line to a signal converter comprising a signal-converting circuit that converts a DTMF signal from a telephone terminal connected via the communication line into predetermined control data and a data-transmitting circuit that transmits the control data via the communication line, which comprises an emulation unit that converts the control data received via the communication line into operation control data for the corresponding application program.

The sixteenth embodiment of the present invention is the fifteenth embodiment of the present invention, which further comprises a data-transmitting unit that transmits a variety of data to the signal converter via the communication line.

The seventeenth embodiment of the present invention is a server which is connected via a public communication line to a signal converter which comprises a signal-converting circuit that converts a DTMF signal from a telephone terminal connected via the communication line into predetermined control data, a data-transmitting circuit that transmits the control data via the communication line to the server, an audio-information-storing circuit that stores audio information in advance and an audio-information-transmitting circuit that reads the audio information from the audio-information-storing unit and transmits it to the telephone terminal when audio-output-instructing data is inputted from the server, which further comprises an audio-output-instructing unit that generates the audio-output-instructing data and transmits the data to the data-transmitting unit in the server via the communication line.

The eighteenth embodiment of the present invention is a server that is connected via a public communication line to a signal converter which comprises a signal-converting circuit that converts a DTMF signal from a telephone terminal connected via the communication line into predetermined control data and a data-transmitting circuit that transmits the same control data via a plurality of the communication lines to the server simultaneously, which comprises an emulation unit that converts one of the same control data inputted via the plurality of the communication lines into operation control data corresponding to the game application program corresponding to the control data.

The nineteenth embodiment of the present invention is a server that is connected via a public communication line to a signal converter which comprises a signal-converting circuit that converts a DTMF signal from a telephone terminal connected via the communication line into predetermined control data, a data-transmitting circuit that transmits the control data via the communication line to the server, a telephone terminal-identifying-information-providing circuit that provides the caller number of the telephone terminal or the caller identification number corresponding to the caller number and the line number corresponding to the telephone terminal identified by the caller number to the server when the telephone terminal is connected via the public communication line and a line-information-storing circuit that stores the caller number or the caller identification number corresponding to the caller number and the line number corresponding to the telephone terminal identified by the caller number, which comprises a line-information-storing unit that stores the caller number or the caller identification number corresponding to the caller number and the line number corresponding to the telephone terminal identified by the caller number.

The twentieth embodiment of the present invention is the seventeenth embodiment of the present invention, which further comprises a transmission-destination-specifying-data-transmitting unit that transmits the line number corresponding to the telephone terminal together with a variety of data corresponding to the telephone terminal when the variety of data are transmitted to the signal converter via the communication line.

The twenty-first embodiment of the present invention is the fifteenth embodiment of the present invention, in which the application program is a game application program and the operation control data is used as data for operating a game.

The twenty-second embodiment of the present invention is the fifteenth embodiment of the present invention, in which the application program is an application program for accumulation and the operation control data is used as data for accumulation.

The twenty-third embodiment of the present invention is the fifteenth embodiment of the present invention, in which the application program is an application program for controlling the distribution of broadcast contents and the operation control data is used as content-selecting data for a user to select a content to view.

The twenty-fourth embodiment of the present invention is the twenty-third embodiment of the present invention, which further comprises a descramble-data-transmitting unit that transmits data for descrambling the content corresponding to the content-selecting data to the telephone terminal corresponding to the content-selecting data when receiving the content-selecting data.

The twenty-fifth embodiment of the present invention comprises a server comprising an emulation unit that converts control data received via a communication line into operation control data for the corresponding application program and a signal converter comprising a signal-converting unit that is connected to the telephone terminal via a public communication line and converts a DTMF signal from the telephone terminal into predetermined control data and a data-transmitting unit that transmits the control data to the server via the communication line.

The twenty-sixth embodiment of the present invention is the twenty-fifth embodiment of the present invention, in which the application program is an application program for controlling the distribution of broadcast contents, the operation control data is used as content-selecting data for a user to select a content to view, and the server comprises a descramble-data-transmitting unit that transmits data for descrambling the content corresponding to the content-selecting data to the telephone terminal corresponding to the content-selecting data via the signal converter when receiving the content-selecting data.

The twenty-seventh embodiment of the present invention is a method for controlling a signal converter that is connected to a server via a communication line to output control data to the server, which comprises a signal-converting step in which a DTMF signal from a telephone terminal connected via a public communication line is converted into predetermined control data, and a data-transmitting step in which the control data is transmitted to the server via the communication line.

The twenty-eighth embodiment of the present invention is a method for controlling a server that is connected to via a public communication line to a signal converter comprising a signal-converting circuit that converts a DTMF signal from a telephone terminal connected via the communication line into predetermined control data and a data-transmitting circuit that transmits the control data via the communication line, which comprises an emulation step in which the control data received via the communication line is converted into operation control data for the corresponding application program.

The twenty-ninth embodiment of the present invention is a server that is connected via a public communication line to a signal converter comprising a signal-converting circuit that converts a DTMF signal from a telephone terminal connected via the communication line into predetermined control data, a data-transmitting circuit that transmits the control data via the communication line, and an audio-channel-establishing circuit that is capable of establishing an audio channel enabling audio communication at least between two of the telephone terminals when a plurality of the telephone terminals are connected via the public communication lines and that establishes the audio channel between the telephone terminals corresponding to the connection-instructing data from the server, which comprises a processing unit that performs predetermined processing on the basis of the control data received from the signal converter, and a connection-instructing-data-transmitting unit that transmits the connection-instructing data for instructing the establishment of the audio channel in the audio channel-establishing unit to the signal converter when the result of the processing in the processing unit matches a predetermined condition.

The thirty-first embodiment of the present invention is the thirtieth embodiment of the present invention, in which the processing unit changes a predetermined data value registered in advance on the basis of the control data, and the connection-instructing-data-transmitting unit determines that the result of the processing matches the condition when the changed data value falls within a predetermined range.

The thirty-second embodiment of the present invention is the thirty-first embodiment of the present invention, in which the control data includes an identification number for identifying the telephone terminal connected to the signal converter via the public communication line; the processing unit changes the data value for each identification number and stores the changed data by associating them with the identification numbers; and the connection-instructing-data-transmitting unit sets the predetermined range on the basis of comparison of the data stored in association with the identification numbers.

The thirty-third embodiment of the present invention is the thirty-first embodiment of the present invention, in which the processing unit comprises a display-control unit that controls a screen display on the basis of the predetermined data; and the predetermined data is data indicating display coordinates in the display control unit.

The thirty-fourth embodiment of the present invention is a server that is connected via a public communication line to a signal converter comprising a signal-converting circuit that converts a DTMF signal from a telephone terminal connected via the communication line into predetermined control data and a data-transmitting circuit that transmits the control data via the communication line, which comprises a call-requesting unit that transmits call-requesting data that makes a call request to the telephone terminal.

The thirty-fifth embodiment of the present invention is a signal converter that is connected to a server via a communication line to output control data to the server, which comprises a signal-converting unit that converts the operation data which is included in a packet signal transmitted from the telephone terminal connected via a public communication line and which corresponds to the operations of the operating buttons of the telephone terminal into predetermined control data, and a data-transmitting unit that transmits the control data to the server via the communication line.

The thirty-sixth embodiment of the present invention is the thirty-fifth embodiment of the present invention, which further comprises a connection-request-rejecting unit that rejects a connection request from a telephone terminal other than the telephone terminal registered in advance, on the basis of the telephone-terminal-identifying information included in the packet signal.

The thirty-seventh embodiment of the present invention is the thirty-fifth embodiment of the present invention, in which the connection-request-rejecting unit further comprises a connection-not-granted message-transmitting unit that transmits a connection-not-granted message to the telephone terminal other than the telephone terminal registered in advance when receiving a connection request from the telephone terminal.

The thirty-eighth embodiment of the present invention is the thirty-fifth embodiment of the present invention, which further comprises an audio-information-storing unit that stores audio information in advance, and an audio-information-transmitting unit that reads the audio information from the audio-information-storing unit and transmits it to the telephone terminal when audio-output-instructing data is inputted from the server.

The thirty-ninth embodiment of the present invention is the thirty-fifth embodiment of the present invention, wherein the data-transmitting unit further comprises a data-transmission-prohibiting unit that prohibits the transmission of the control data corresponding to telephone terminals other than the telephone terminal which is permitted to transmit the control data at a predetermined timing when receiving the packet signals from a plurality of telephone terminals.

The fortieth embodiment of the present invention is the thirty-fifth embodiment of the present invention, in which the number of communication lines is at least two, and the data-transmitting unit transmits the same control data to the plurality of communication lines simultaneously.

The forty-first embodiment of the present invention is the thirty-fifth embodiment of the present invention, which further comprises a target-server-selecting unit that selects a server to which the signal converter should be connected via the communication line when a predetermined packet signal is inputted.

The forty-second embodiment of the present invention is the thirty-fifth embodiment of the present invention, which further comprises a telephone-terminal-identifying-information-providing unit that provides the server with the caller number of the telephone terminal or the caller identification number corresponding to the caller number and the line number corresponding to the telephone terminal identified by the caller number.

The forty-third embodiment of the present invention is the forty-second embodiment of the present invention, which further comprises a line-information-storing unit that stores the caller number or the caller identification number corresponding to the caller number and the line number corresponding to the telephone terminal identified by the caller number.

The forty-fourth embodiment of the present invention is the forty-second embodiment of the present invention, in which the data-transmitting unit transmits the line number when transmitting the control data to the server via the communication line.

The forty-fifth embodiment of the present invention is the thirty-fifth embodiment of the present invention, which further comprises an audio-packet-channel-establishing unit that establishes an audio-packet channel which enables audio communication at least between two of the telephone terminals when a plurality of the telephone terminals are connected via the public communication lines.

The forty-sixth embodiment of the present invention is the forty-fifth embodiment of the present invention, in which the audio-packet-channel-establishing unit establishes the audio channel between the telephone terminals corresponding to the connection-instructing data from the server.

The forty-seventh embodiment of the present invention is the forty-fifth embodiment of the present invention, in which the connection-instructing data is predetermined binary data.

The forty-eighth embodiment of the present invention is the forty-fifth embodiment of the present invention, which further comprises a channel-disconnecting unit that disconnects the telephone terminal corresponding to the audio-packet channel established by the audio-packet-channel-establishing unit from the audio-packet channel on the basis of the instruction data outputted by the server when a packet signal including predetermined control data is inputted from the telephone terminal or the instruction data outputted by the server by itself.

The forty-ninth embodiment of the present invention is a server that is connected via a public communication line to a signal converter comprising a signal-converting circuit that converts the operation data which is included in a packet signal transmitted from a telephone terminal connected via a public communication line and which corresponds to the operations of the operating buttons of the telephone terminal into predetermined control data, and a data-transmitting circuit that transmits the control data to the server via the communication line, which comprises an emulation unit that converts the control data received via the communication line into operation control data for the corresponding application program.

The fiftieth embodiment of the present invention is the forty-ninth embodiment of the present invention, which further comprises a data-transmitting unit that transmits a variety of data to the signal converter via the communication line.

The fifty-first embodiment of the present invention is a server which is connected via a public communication line to a signal converter which comprises a signal-converting circuit that converts the operation data which is included in a packet signal transmitted from a telephone terminal connected via the communication line and which corresponds to the operations of the operating buttons of the telephone terminal into predetermined control data, a data-transmitting circuit that transmits the control data via the communication line to the server, an audio-information-storing circuit that stores audio information in advance and an audio-information-transmitting circuit that reads the audio information from the audio-information-storing circuit and transmits it to the telephone terminal when audio-output-instructing data is inputted from the server, which further comprises an audio-output-instructing unit that generates the audio-output-instructing data and transmits the data to the data-transmitting unit in the server via the communication line.

The fifty-second embodiment of the present invention is a server that comprises a signal-converting circuit that converts the operation data which is included in a packet signal transmitted from a telephone terminal connected via a public communication line and which corresponds to the operations of the operating buttons of the telephone terminal into predetermined control data, a data-transmitting circuit that transmits the control data via a plurality of the communication lines to the server, and an emulation unit that converts one of the same control data inputted via the plurality of the communication lines into operation control data corresponding to the game application program corresponding to the control data.

The fifty-third embodiment of the present invention is a server that is connected via a public communication line to a signal converter that comprises a signal-converting circuit that converts the operation data which is included in a packet signal transmitted from a telephone terminal connected via the communication line and which corresponds to the operations of the operating buttons of the telephone terminal into predetermined control data, a data-transmitting circuit that transmits the control data to the server via the communication line, a telephone-terminal-identifying-information-providing circuit that provides the caller number of the telephone terminal or the caller identification number corresponding to the caller number and the line number corresponding to the telephone terminal identified by the caller number to the server when the telephone terminal is connected via a public communication line, and a line-information-storing circuit that stores the caller number or the caller identification number corresponding to the caller number and the line number corresponding to the telephone terminal identified by the caller number, which further comprises a line-information-storing unit that stores the caller number or the caller identification number corresponding to the caller number and the line number corresponding to the telephone terminal identified by the caller number.

The fifty-fourth embodiment of the present invention is the fifty-first embodiment of the present invention, in which further comprises a transmission-destination-specifying-data-transmitting unit that transmits the line number corresponding to the telephone terminal together with a variety of data corresponding to the telephone terminal when the variety of data are transmitted to the signal converter via the communication line.

The fifty-fifth embodiment of the present invention is the forty-ninth embodiment of the present invention, in which the application program is a game application program and the operation control data is used as data for operating a game.

The fifty-sixth embodiment of the present invention is the forty-ninth embodiment of the present invention, in which the application program is an application program for accumulation and the operation control data is used as data for accumulation.

The fifty-seventh embodiment of the present invention is the forty-ninth embodiment of the present invention, in which the application program is an application program for controlling the distribution of broadcast contents and the operation control data is used as content-selecting data for a user to select a content to view.

The fifty-eighth embodiment of the present invention is the fifty-seventh embodiment of the present invention, which further comprises a descramble-data-transmitting unit that transmits data for descrambling the content corresponding to the content-selecting data to the telephone terminal corresponding to the content-selecting data when receiving the content-selecting data.

The fifty-ninth embodiment of the present invention comprises a server comprising an emulation unit that converts control data received via a communication line into operation control data for the corresponding application program, and a signal converter comprising a signal-converting unit that is connected to the telephone terminal via a public communication line and converts the operation data which is included in a packet signal transmitted from the telephone terminal and which corresponds to the operations of the operating buttons of the telephone terminal into predetermined control data and a data-transmitting unit that transmits the control data to the server via the communication line.

The sixtieth embodiment of the present invention is the fifty-ninth embodiment of the present invention, in which the application program is an application program for controlling the distribution of broadcast contents, the operation control data is used as content-selecting data for a user to select a content to view, and the server comprises a descramble-data-transmitting unit that transmits data for descrambling the content corresponding to the content-selecting data to the telephone terminal corresponding to the content-selecting data via the signal converter when receiving the content-selecting data.

The sixty-first embodiment of the present invention is a method for controlling a signal converter that is connected a to a server via a communication line to output control data to the server, which comprises a signal-converting step in which the operation data which is included in a packet signal transmitted from a telephone terminal connected via a public communication line and which corresponds to the operations of the operating buttons of the telephone terminal is converted into predetermined control data, and a data-transmitting step in which the control data is transmitted to the server via the communication line.

The sixty-second embodiment of the present invention is a method for controlling a server that is connected via a public communication line to a signal converter comprising a signal-converting circuit that converts the operation data which is included in a packet signal transmitted from a telephone terminal connected via the communication line and which corresponds to the operations of the operating buttons of the telephone terminal into predetermined control data and a data-transmitting circuit that transmits the control data via the communication line to the server, which further comprises an emulation step in which the control data received via the communication line is converted into operation control data for the corresponding application program.

The sixty-third embodiment of the present invention is a telephone terminal that is connected via a public communication line to a signal converter comprising a signal-converting circuit that converts operation data into predetermined control data and a data-transmitting circuit that transmits the control data via the communication line to the server, which further comprises an operating unit having operating buttons, an operation-detecting unit that detects the operation of the operating unit, a packet-generating unit that generates a packet signal including operation data on the basis of the detected operation of the operating unit, and a packet-transmitting unit that transmits the packet signal to the server via the communication line.

The sixty-fourth embodiment of the present invention is the sixty-third embodiment of the present invention, in which the packet-generating unit generates a packet signal including the operation data corresponding to the operation of the operating button within a predetermined time period when the predetermined time period is expired after the operation of the operating button, and the packet-transmitting unit that automatically transmits the packet signal to the server via the communication line when the packet signal is generated in the packet-generating unit.

BRIEF DESCRIPTION OF THE DRAWINGS

FIGS. 28A and 28B constitute a diagram illustrating the configuration of a computer telephony card.

FIG. 30 is a diagram exemplifying the contents of a database.

FIGS. 42A and 42B constitute a block diagram of the functions of the packet gateway server and the game server.

BEST MODE FOR CARRYING OUT THE INVENTION

The suitable embodiments of the present invention will be described with reference to the drawings.

[A] First Embodiment

In the first embodiment of the present invention, a network information system will be described by taking a network game system as an example.

[1] General Constitution of Network Game System

Figure 1:
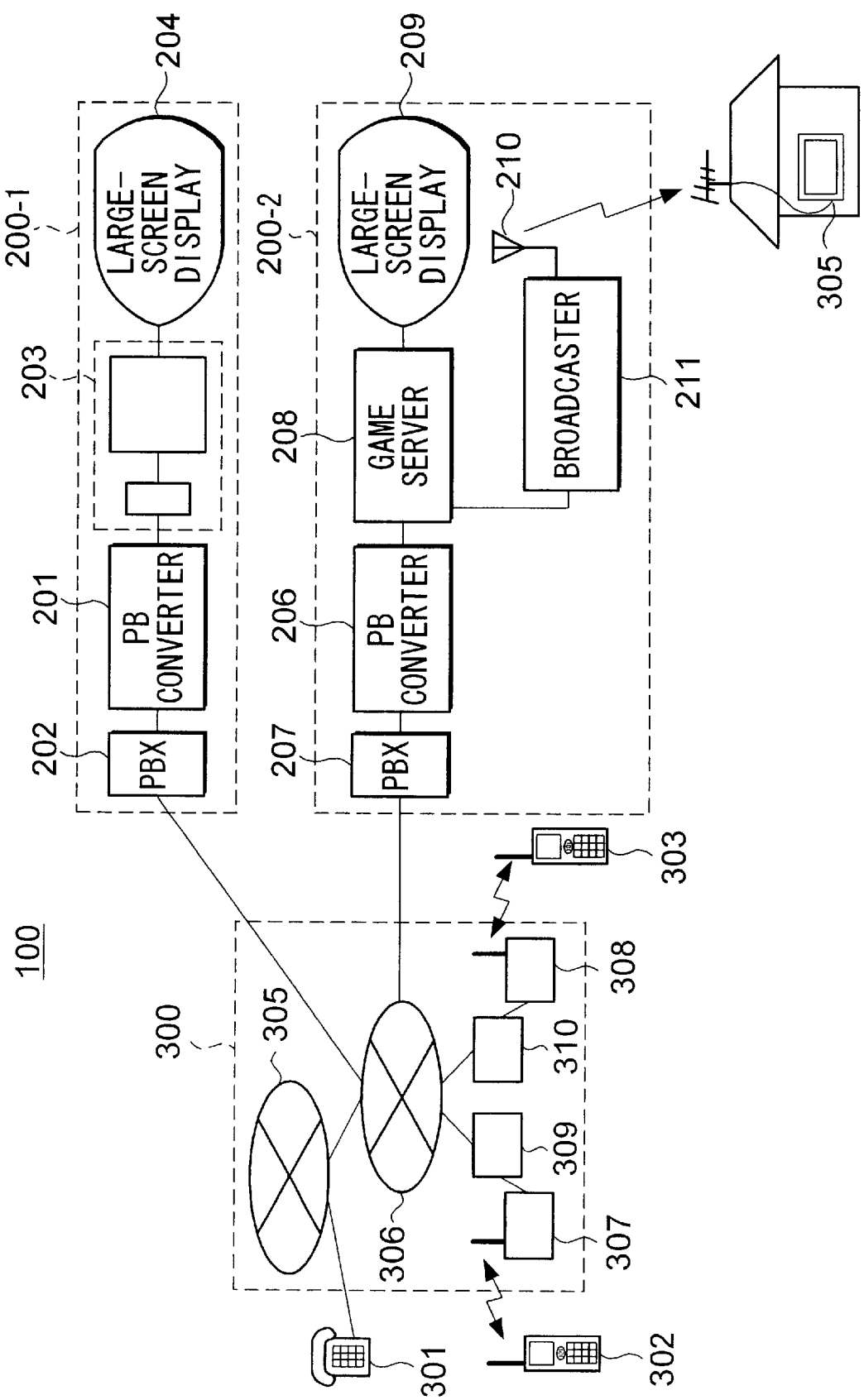
FIG. 1 is a general block diagram of the network game system of the first embodiment.

The general constitution of a network game system is shown in FIG. 1.

A network game system 100 roughly comprises a first network game server 200-1, a second network game server 200-2, and a public line network 300 that connects a stationary telephone terminal 301, a portable telephone terminal 302 or a portable telephone terminal 303 to the network game servers 200-1 and 200-2 via communication lines.

The first-network game server 200-1 comprises a PB converter 201 that converts a PB (Push Button) signal inputted from the public line network 300 into control data, a private branch exchange (PBX) 202 that connects the stationary telephone terminal 301, portable telephone terminal 302 or portable telephone terminal 303 connected to the PBX via the public line network 300 to the PB converter 201, a game server 203 that actually executes a game application program, and a large-screen display 204 that displays a game screen under the control of the game server 203.

The second network game server 200-2 comprises a PB converter 206 that converts a PB signal inputted from the public line network 300 into control data, a private branch exchange (PBX) 207 that connects the stationary telephone terminal 301, portable telephone terminal 302 or portable telephone terminal 303 connected to the PBX via the public line network 300 to the PB converter 206, a game server 208 that actually executes a game application program, a large-screen display 209 that displays a game screen on the basis of the picture signal outputted from the game server 208, and a broadcaster 211 that converts the picture signal and audio signal outputted from the game server 208 into airwaves and transmits the airwaves to a household television set 305 via a broadcast antenna 210.

The public line network 300 comprises a wire public line network 305, a wireless public line network 306, wireless base stations 307 and 308, and control stations 309 and 310.

[2] General Constitution of PB Converters

Since the PB converter 201 and the PB converter 206 have the same constitution, the general constitutions of the PB converters will be described below by taking the PB converter 201 as an example.

[2.1] General Constitution of PB Converter 201

Figure 2:
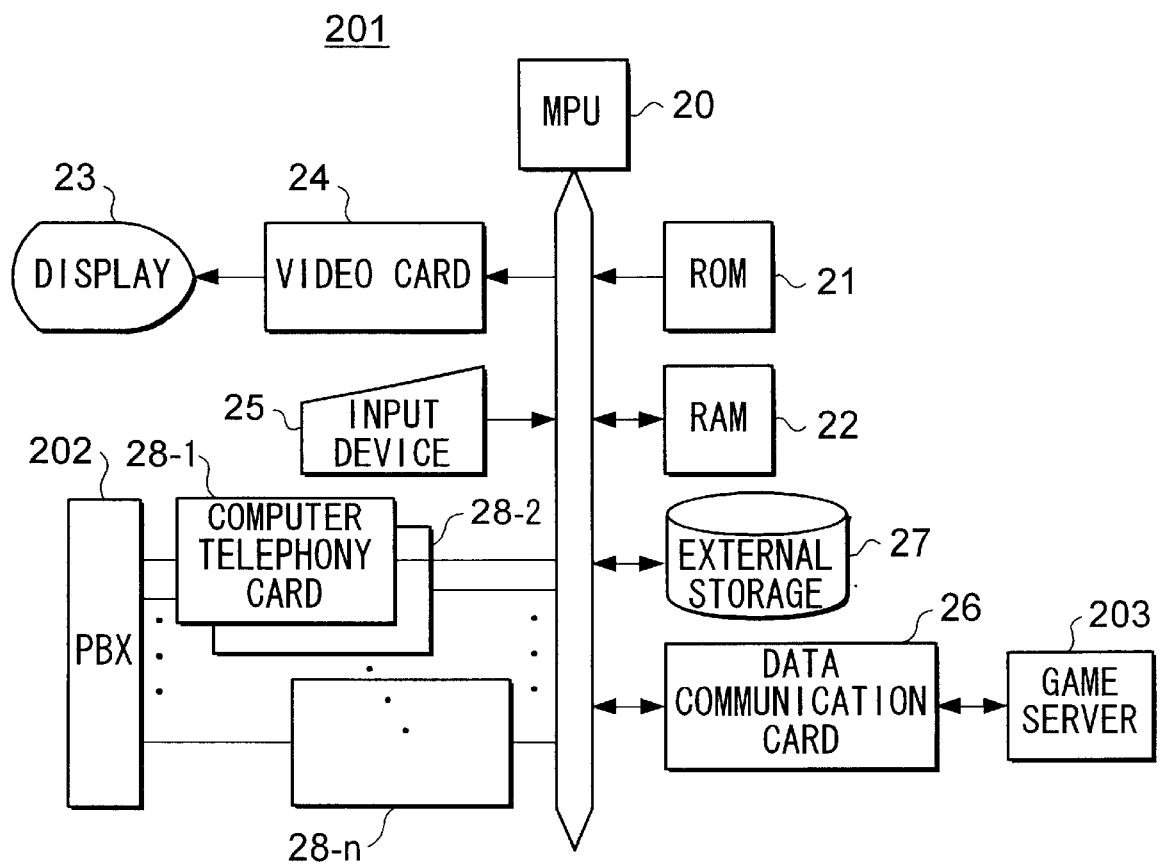
FIG. 2 is a general block diagram of a PB converter.

The general block diagram of the PB converter 201 is shown in FIG. 2.

The PB converter 201 comprises an MPU (Micro Processor Unit) 20 that controls the whole PB converter 201, a ROM 21 in which a control program and control data are stored, a RAM 22 which stores a variety of data temporarily and is also used as a working area, a display 23 that displays a variety of information, a video card 24 that interfaces between the MPU 20 and the display 23, an input device 25 such as a keyboard with which an operator performs a variety of operations, a data communication card 26 that interfaces between the MPU 20 and the game server 203, an external storage 27 such as a hard disk that stores large amounts of various data, a plurality of computer telephony cards 28-1 to 28-n that interface between the MPU 20 and the PBX 202, and buses 29 which interconnect the MPU 20, the ROM 21, the RAM 22, the display 23, the video card 24, the input device 25, the data communication card 26, the external storage 27 and the computer telephony cards 28-1 to 28-n with one another.

[2.2] Constitutions of Computer Telephony Cards

A detailed description will be given to the constitutions of the computer telephony cards 28-1 to 28-n (28 unless particularly specified). All the computer telephony cards 28-1 to 28-n have the same constitution.

The computer telephony card 28 has two line connection terminals and comprises not only audio signal processing units 410-1 and 410-2 each of which corresponds to each of the two lines but also a CODEC 420, an MVIP controller 431, a DSP (Digital Signal Processor) 432, an access control unit 433, an SRAM 434, an I/O port 435, an expansion bus interface (I/F) 436, a PC interface 440, a bus controller 441, a bus 422, an audio output unit 451, and an audio input unit 452. The specification of the bus 422 may be, for example, an existing specification such as ISA (Industry Standard Architecture) or PCI (Peripheral Component Interconnect) or other specification.

The CODEC 420 has the function of converting an analog audio signal (including a PB signal) into digital data and the function of converting the digital data into an analog audio signal.

The MVIP controller 431 controls the input and output of digital data corresponding to each line in accordance with MVIP (Multi-Vendor Integration Protocol). Further, the MVIP controller 431 has a line-switching-and-connecting function, which enables the controller 431 to handle line connection not only in the same card but also between different cards connected via an MVIP bus.

The DSP 432 not only controls the line connection by the MVIP controller 431 but also detects a DTMF (PB signal) from the inputted aural signal. The data (1 to 9, 0, *, #, and A to D) corresponding to the PB signals detected in the DSP 432 are written in the predetermined area of the SRAM 434 at the timing controlled by the access control unit 433. In the present embodiment, the data corresponding to the PB signals written in the SRAM 434 are converted into predetermined commands and transmitted to the game server 203.

The I/O port 435 is a port which inputs and outputs signals controlling ON's and OFF's of various switches provided in the analog processing units 410-1 and 410-2.

The expansion bus interface (I/F) 436 is an interface used when a facsimile feature or the like is additionally implemented, and a PC interface 440 is an interface between the DSP 432 and a bus 442. The bus controller 441 controls the bus 442.

The audio output unit 451 outputs an audio signal to the outside of the card and has a speaker terminal SP. The audio-input unit 452 is inputted an audio signal from the outside of the card and has a microphone terminal MIC.

Next, a description will be given to the analog processing unit 410-1. The description of the analog processing unit 410-2 will be omitted since it has the same structure as that of the analog processing unit 410-1.

The analog processing unit 410-1 comprises an incoming signal-detecting unit 411 that detects an incoming signal, a loop-detecting unit 412 that detects inversion of polarity, a line-voltage-monitoring unit 413 that monitors whether a voltage is sufficient for calling, a direct-current-loop-closing circuit 414 that closes a direct-current loop to have a line connected, a transformer 415 that extracts an audio signal (alternating-current signal), a hybrid circuit 416 that separates the aural signal into an input signal and an output signal, a hook-state-detecting unit 147 that detects the state of the hook of a telephone externally connected to a terminal TEL1, a constant-current-supplying circuit 418 that supplies a predetermined amount of current to the externally connected telephone, an F-NET-signal-inputting circuit 419 that receives an incoming call in an on-hook state, a line connection terminal LINE1 (telephony port), and an externally connected telephone terminal TEL1.

Figure 28B:
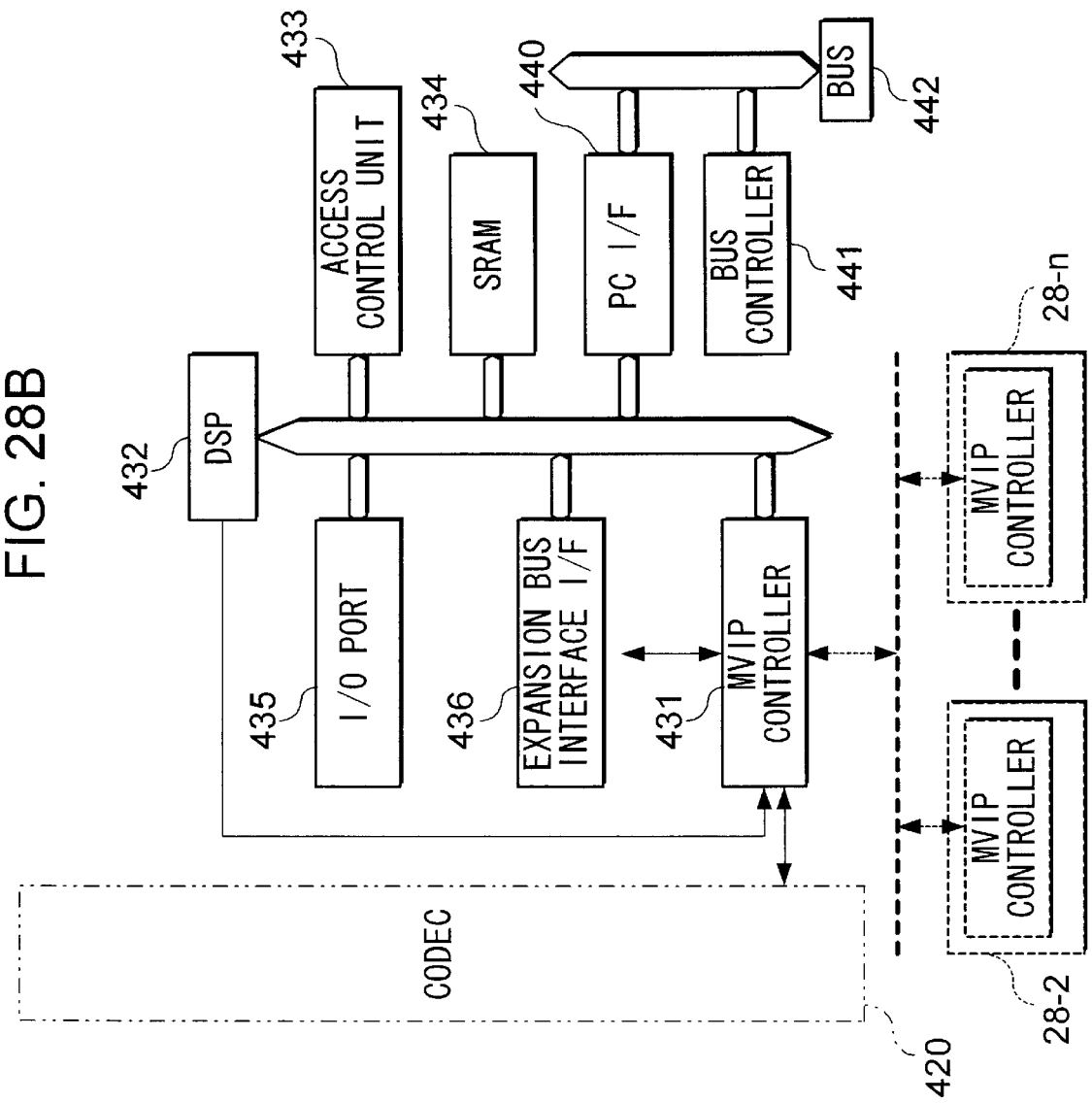

Further, the terminal RING in FIGS. 28A and 28B is used for connecting to a power supply for ringing the externally connected telephone's bell.

The computer telephony card shown in FIGS. 28A and 28B complies with a telecommunication terminal equipment qualification standard, and when a computer telephony card having the above function and complying with the qualification standard is used, the present embodiment of the present invention can be accomplished. Therefore, a further description to each function will be omitted.

[3] General Constitution of Game Server

[3.1] General Constitution of Game Server 203

Figure 3:
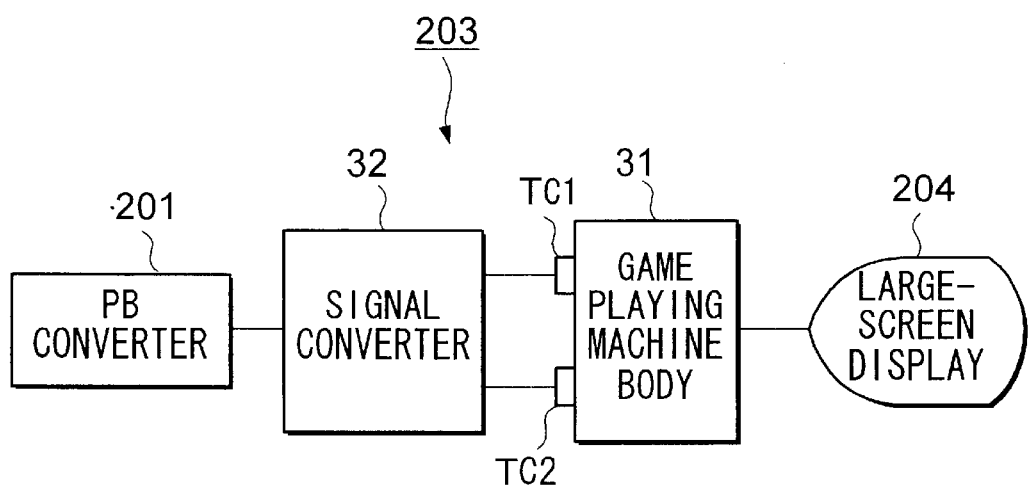
FIG. 3 is a general block diagram of a game server 203.

The general block diagram of the game server 203 is shown in FIG. 3.

The game server 203 is constituted by using a so-called "game playing machine". It roughly comprises a game playing machine body 31 (including a ROM cassette for a game application program or a CD-ROM player) having controller input terminals TC1 and TC2 to which special game controllers are connected and a signal converter 32 that converts the output signals of the PB converter into the signals such as is outputted from the game controllers. The number of the controller input terminals is not limited to two but may be three or more.

[3.2] General Constitution of Game Server 208

Figure 4:
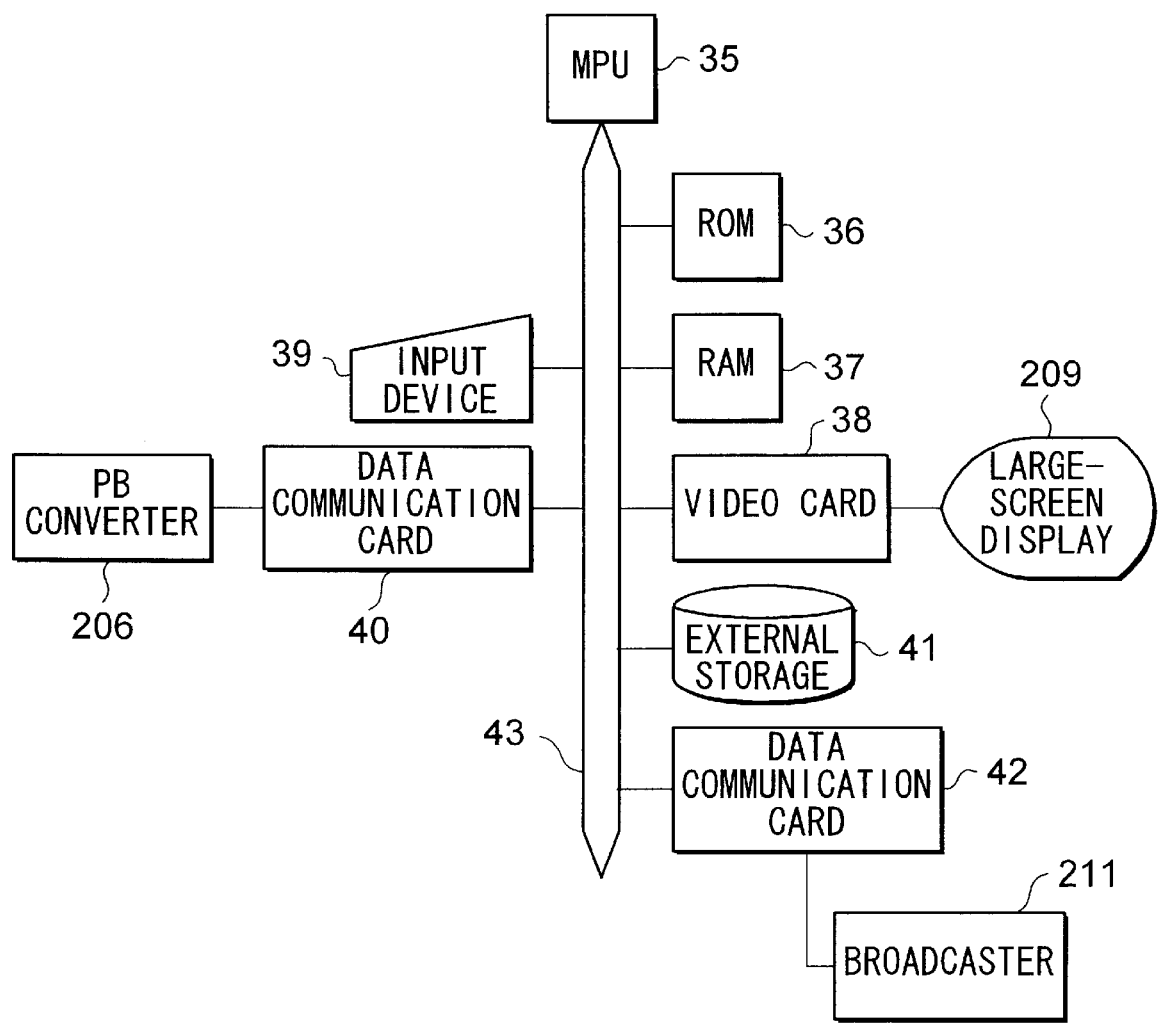
FIG. 4 is a general block diagram of a game server 208.

The general block diagram of the game server 208 is shown in FIG. 4.

The game server 208 is a personal computer in which a game application program is installed to serve as a game server and comprises an MPU (Micro Processor Unit) 35 that controls the whole game server 208, a ROM 36 in which a control program and control data are stored, a RAM 37 that stores a variety of data temporarily and is also used as a working area, a video card 38 that interfaces between the MPU 35 and the large-screen display 209, an input device 39 such as a keyboard with which an operator performs a variety of operations, a data communication card 40 that interfaces between the MPU 35 and the PB converter 206, an external storage 41 such as a hard disk that stores large amounts of various data, a data communication card 42 that interfaces between the MPU 35 and the broadcaster 211, and buses 43 which interconnect the MPU 35, the ROM 36, the RAM 37, the video card 38, the input device 39, the data communication card 40, the external storage 41 and the data communication card 42 with one another.

[4] Constitutions of Functions of PB Converters and Game Servers

Next, the constitutions of the functions of the PB converters and the game servers will be described by taking the PB converter 206 and the game server 208 as examples.

Figure 5A:
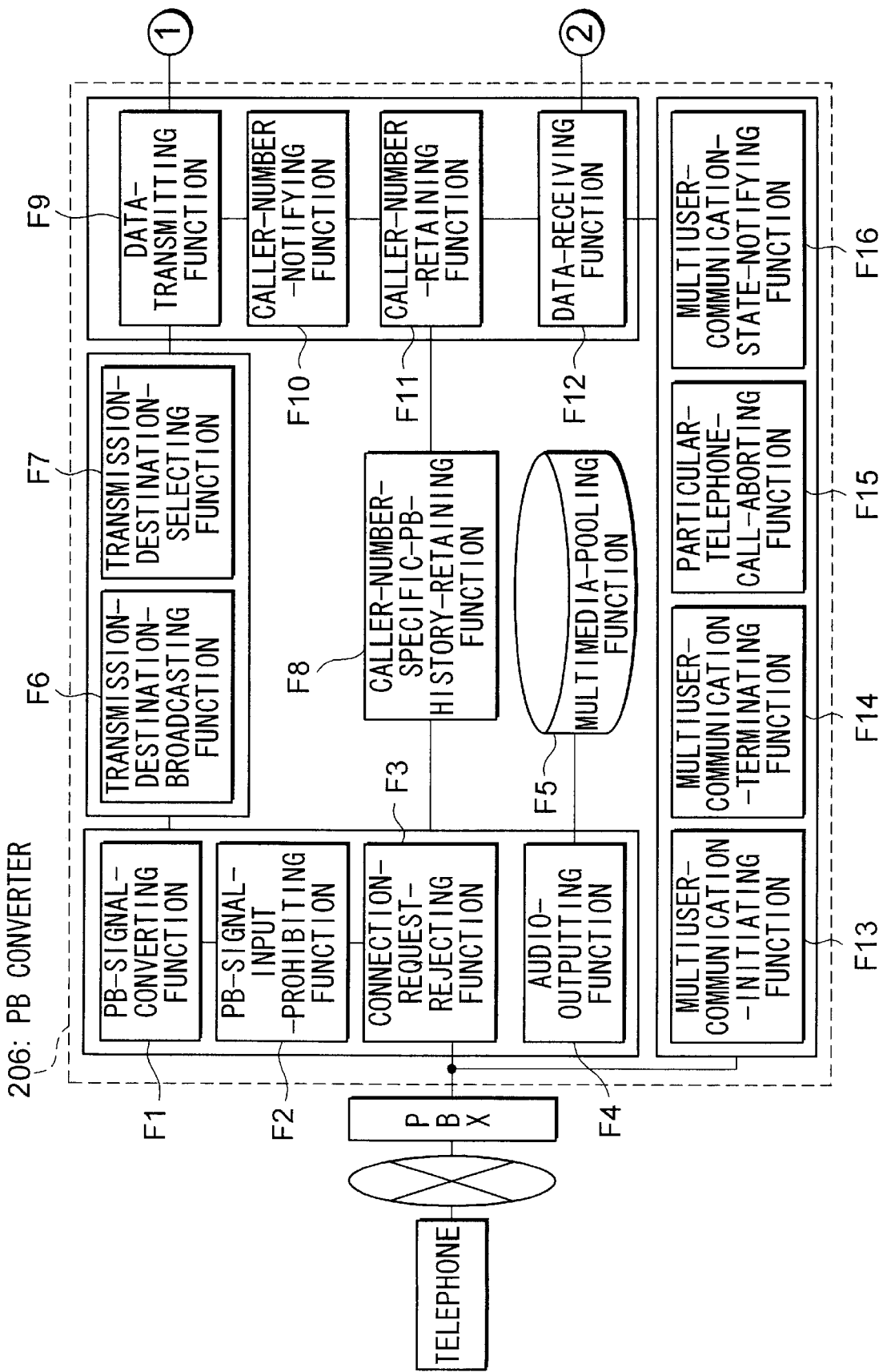
FIGS. 5A and 5B constitute a block diagram of the functions of the PB converter and the game server.
Figure 5B:
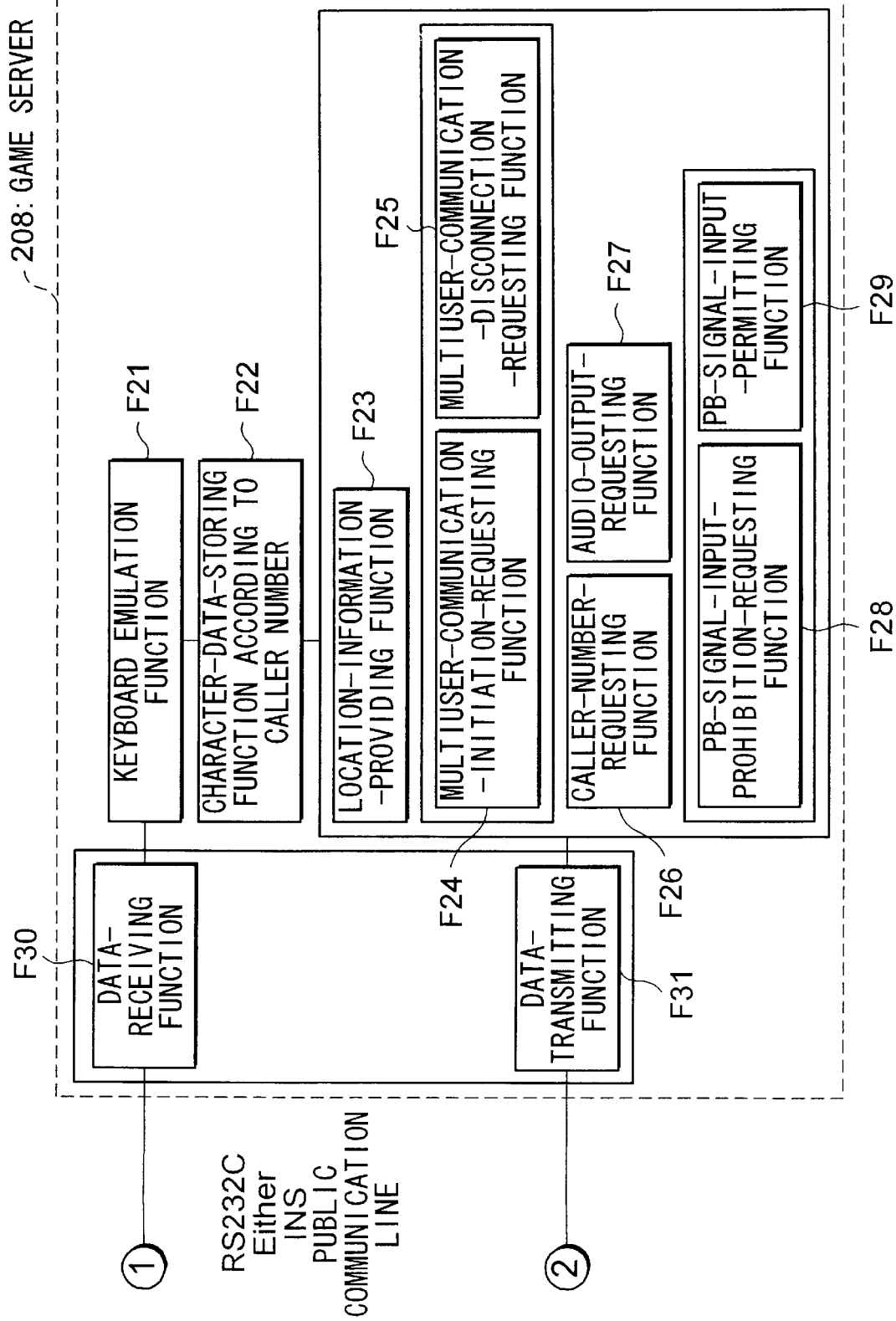

The block diagrams of the functions of the PB converter 206 and the game server 208 are shown in FIGS. 5A and 5B.

[4.1] Constitution of functions of PB converter 206

[4.1.1] PB-signal-converting Function

The PB converter 206 has a PB-signal-converting function F1 that converts a PB signal (DTMF) received from the network via the PBX 207 into a predetermined code such as an ASCII code.

As the predetermined code, any code can be used according to the specification of the converter.

[4.1.2] PB-signal-input-prohibiting Function

Further, the PB converter 206 also has a PB-signal-input-prohibiting function F2 that does not transmit data corresponding to a PB signal (DTMF) received from a particular stationary telephone terminal or portable telephone terminal to the game server 208 when receiving the PB signal.

This PB-signal-input-prohibiting function F2 is used to switch "real-time processing", which accepts all the inputs from a number of users in real time when the users are connected to the game server 208 via stationary telephone terminals and portable telephone terminals, to "time-division processing". That is, for example, the PB-signal-input-prohibiting function F2 makes it possible to receive and process the inputs of PB signals corresponding to 10 users in a certain time slot and those corresponding to other 10 users in the next time slot. Thus, the load on the game server 208 can be reduced.

[4.1.3] Connection-request-rejecting Function

The PB converter 206 has a connection-request-rejecting function F3 that rejects a connection-requesting call from a non-registered telephone terminal.

Specifically, when the PB converter 206 receives a call from the non-registered telephone terminal, it transmits a connection-not-granted message to the telephone terminal by means of audio guidance or the like.

[4.1.4] Audio-outputting Function

The PB converter 206 has an audio-outputting function F4 that reads the audio information corresponding to a predetermined control code from a multimedia pool and reproduces and transmits the information to a telephone terminal when a predetermined audio output is requested from the game server 208 according to the predetermined control code.

[4.1.5] Multimedia-pooling Function

The PB converter 206 has a multimedia-pooling function F5 that stores multimedia data such as a variety of image data and audio data.

[4.1.6] Transmission-destination-broadcasting Function

The PB converter 206 has a transmission-destination-broadcasting function F6 that connects the PB converter and the game server 208 via a plurality of lines for the sake of retaining the reliability of communication.

By this function, processing can be continued without having any problems even when a particular line is disconnected, and the reliability of communication therefore improves.

[4.1.7] Transmission-destination-selecting Function

The PB converter 206 has a transmission-destination-selecting function F7 that connects the PB converter 206 to the game server 208 (for example, a game server in Osaka) at the location corresponding to a predetermined particular PB signal (for example, [3#]) when the PB signal is inputted when the PB converter 206 is connectable to a plurality of game servers 208 provided at different locations (for example, Tokyo and Osaka).

[4.1.8] Caller-number-specific-PB-history-retaining Function

The PB converter 206 has a caller-number-specific-PB-history-retaining function F8 that retains the history (indicating which PB signals were inputted) of received PB signals for each caller number.

By this function, an UNDO function (function to restore the pre-operation state) can be performed, the performance of the player who has marked the high score can be replayed and a data analysis can be performed on the basis of the histories of a plurality of players.

[4.1.9] Data-transmitting Function

The PB converter 206 has a data-transmitting function F9 that transmits the control data obtained by the conversion of PB signals or ordinary text data as binary data.

[4.1.10] Caller-number-notifying Function

The PB converter 206 has a caller-number-notifying function F10 that pairs a caller number (or a caller identification number corresponding to the caller number) for specifying a portable telephone terminal or the line with a CTI (Computer Telephony Integration) line number for specifying a single-line computer telephony card and notifies the game server 208 of the numbers.

Further, in the case of a multi-line computer telephony card, a CTI line number is allocated to each computer telephony port to notify the game server 208 of the numbers. Further, when a plurality of computer telephony cards are implemented, a CTI line number is allocated to each computer telephony port.

In this case, the CTI line numbers are preferably serial numbers from the viewpoint of management.

By the notification, the game server 208 and the PB converter 206 can exchange data not by directly exchanging the redundant caller number but by associating the data with the caller number.

[4.1.11] Caller-number-retaining Function

The PB converter 206 has a caller-number-retaining function F11 that retains the correspondence between the caller number (or caller identification number corresponding to the caller number) and the CTI line number which have been notified by the above caller-number-notifying function.

By retaining the correspondence, the PB converter 206 can exchange data with the game server 208 not by directly exchanging the redundant caller number but by being notified of the CTI line number associated with the caller number.

[4.1.12] Data-receiving Function

The PB converter 206 has a data-receiving function F12 that receives the binary data transmitted from the game server 208 as control data or particular binary data transmitted from the game server 208 as ordinary text data.

[4.1.13] Multiuser-communication-initiating Function

The PB converter 206 has a multiuser-communication-initiating function F13 that forms audio channels for establishing communications among a plurality of users that correspond to the instruction from the game server 208.

[4.1.14] Multiuser-communication-terminating Function

The PB converter 206 has a multiuser-communication-terminating function F14 that terminates communications among a plurality of users among whom audio channels are formed.

[4.1.15] Particular-telephone-call-aborting Function

The PB converter 206 has a particular telephone call-aborting function F15 that aborts the telephone call on the telephone terminal corresponding to the abort instruction that the game server 208 has outputted either by itself or based on the PB signal from any of telephone terminals while communications are in progress among a plurality of users.

[4.1.16] Multiuser-communication-state-notifying Function

The PB converter 206 has a multiuser-communication-state-notifying function F16 that notifies the game server 208 of the number of the line that forms an audio channel when any audio channel is formed.

It is desirable from the viewpoint of management that this function provide the notification to the game server periodically (for example, once every three seconds).

[4.2] Constitutions of Functions of Game Server 208

[4.2.1] Keyboard-emulation Function

The game server 208 has a keyboard emulation function F21 that converts the specific code received by the PB converter into a game-operating code.

That is, when the PB signal is inputted into the PB converter by operating the keypad of a telephone terminal, a specific code corresponding to the PB signal is generated and sent out to the game server. Thus, the game server 208 converts the specific code into the operating code to process a game.

[4.2.2] Character-data-storing Function

The game server 208 has a character-data-storing function F22 that stores the history of actions, experience value and the like of the game character corresponding to the player according to the caller number (or caller identification number corresponding to the caller number).

This function allows the player to immediately resume playing a game from the point where he stopped playing the game, next time he logs in the game server.

[4.2.3] Location-information-providing Function

The game server 208 has a location-information-providing function F23 that provides the information about locations.

[4.2.4] Multiuser-communication-initiation-requesting Function

The game server 208 has a multiuser-communication-initiation-requesting function F24 that requests the initiation of communication to form an audio line so that the user corresponding to the line number (allocated to each computer telephony card (in the case of a single-line card) or each computer telephony port (in the case of a multi-line card)) selected in the PB converter can communicate with other predetermined user.

[4.2.5] Multiuser-communication-disconnection-requesting Function

The game server 208 has a multiuser-communication-disconnection-requesting function F25 that requests the disconnection of the audio line used by the user corresponding to the line number (allocated to each computer telephony card (in the case of a single-line card) or each computer telephony port (in the case of a multi-line card)) selected in the PB converter.

[4.2.6] Caller-number-requesting Function

The game server 208 has a caller-number-requesting function F26 that requests the PB converter to notify a caller number (or caller identification number corresponding to the caller number) when the game server 208 has lost the information about the caller number (or caller identification number corresponding to the caller number) for some reason or needs to refer again to the caller number (or caller identification number corresponding to the caller number) of the telephone terminal connected to a particular line.

[4.2.7] Audio-output-requesting Function

The game server 208 has an audio-output-requesting function F27 that transmits the audio information (such as audio guidance, music and sound effects) preset in the PB converter to the user's telephone terminal such as a portable telephone terminal.

[4.2.8] PB-signal-input-prohibition-requesting Function

The game server 208 has a PB-signal-input-prohibition-requesting function F28 that controls a communication traffic by permitting only particular players out of a plurality of players (game participants) to key in via a keypad.

[4.2.9] PB-signal-input-permitting Function

The game server 208 has a PB-signal-input-permitting function F29 that permits a player who has been prohibited from inputting a PB signal when the above-described PB-signal-input-prohibition-requesting function F28 is active or a newly participating player who is ready for using the network game system to input the PB signal.

[4.2.10] Data-receiving Function

The game server 208 has a data-receiving function F30 that receives binary data transmitted from the PB converter 206 as control data or particular binary data transmitted from the PB converter 206 as ordinary text data.

[4.2.11] Data-transmitting Function

The game server 208 has a data-transmitting function F31 that transmits control data or ordinary text data as binary data.

[4.3] Relationship Between PB-converting Function F1 and Keyboard Emulation Function F21

The relationship between the PB-converting function F1 and the keyboard emulation function F21 out of the above-described functions will be described in more detail with reference to FIG. 29.

Figure 29:
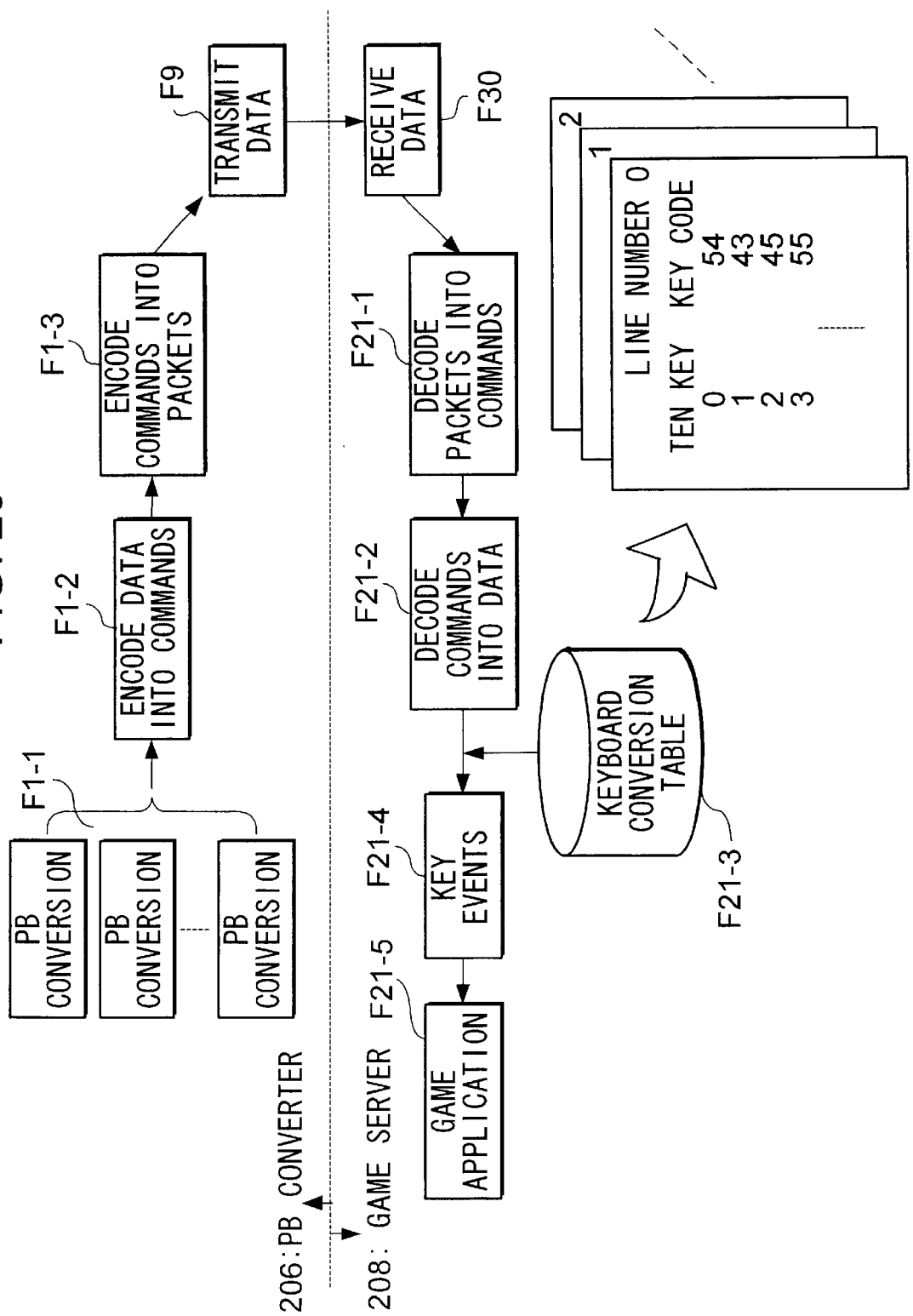
FIG. 29 is a diagram illustrating the relationship between a PB conversion function and a keyboard emulation function.

As described above, in the present embodiment, since PB signals are converted into codes in the computer telephony cards 28-1 to 28-n, a plurality of PB-converting functions operate in multi-thread mode as shown by F1-1 of FIG. 29. The MPU 20 of the PB converter 206 encodes the data (ten-key numbers) corresponding to the PB signals converted in the cards into commands in accordance with the above-described protocol with the game server 208 (F1-2) and encodes the commands into packets (F1-3).

Since the PB-signal-converting functions operate in multi-thread mode as described above, there occurs a case where another thread requests the transmission of another packet while one thread is transmitting a packet. Therefore, in the present embodiment, the data-transmitting function F9 exclusive-controls the transmission of the packets to avoid congestion.

Meanwhile, the data-receiving function F30 and the keyboard emulation function F21 of the game server 208 operate in single-thread mode. The packet received from the PB converter 206 by the data-deceiving function F30 is decoded from a packet format by a packet-decoding function F21-1, and the restored command is decoded by a command-decoding function F21-2, and the decoded command is then converted into keyboard information by referring to a keyboard conversion table F21-3.

In the keyboard conversion table F21-3, for example, as shown in FIG. 29, key codes associated with the ten-keys of a terminal are stored for each line number. The key codes are allocated uniquely, and the keyboard emulation function F21 can specify a key code according to the line number and ten-key number presented in the received command.

Further, the keyboard emulation function F21 also has a function (F21-5) that transmits the keyboard information obtained by referring to the keyboard conversion table F21-3 to a game application as key events (F21-4) indicating the operations of a keyboard.

Thus, the user can play the game by operating the ten-keys of a terminal.

[5] Command

Control commands are exchanged between the PB converter and the game server. The commands will be described in detail hereinafter.

[5.1] System of Commands

The commands are roughly classified into the first to fourth-type commands according to functions and application purposes.

These four types of commands are distinguished by two identification bits BID (=b7 and b6) on the MSB (Most Significant Bit) side in a command byte which corresponds to the first byte of each command.

Figure 6:
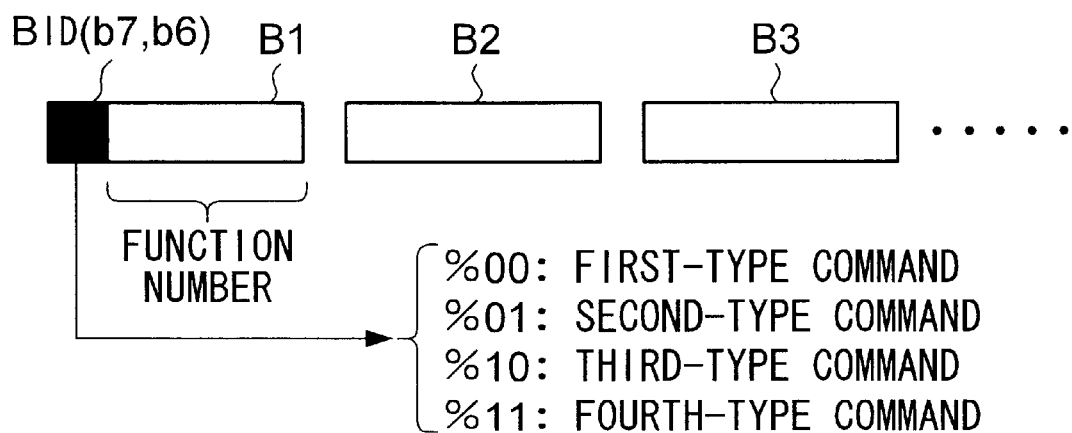
FIG. 6 is a diagram illustrating a command format.

More specifically, as shown in FIG. 6, the commands are distinguished by the identification bits BID constituting the first byte B1 as follows. In the following description, the symbol "%", represents a binary digit.

BID=%00→first-type command

BID=%01→second-type command

BID=%10→third-type command

BID=%11→fourth-type command

The remaining six bits in the first byte (b5 to b0) are allocated to function numbers except for the first-type command.

[5.2] First-type Command (2-Byte Code)

Figure 7:
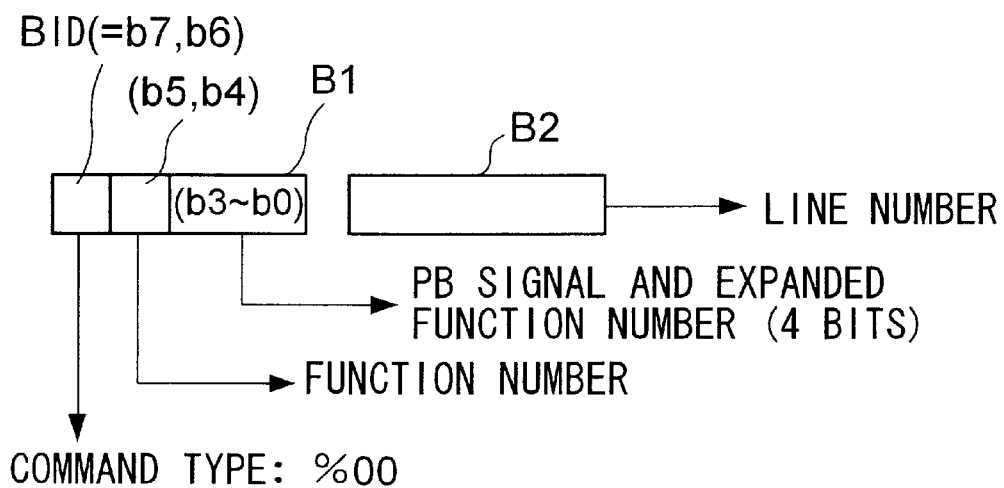
FIG. 7 is a diagram illustrating the format of the first-type command.

The first-type command, as shown in FIG. 7, is two-byte data comprising the first byte B1 and the second byte B2. As described above, the identification bits BID constituting the first byte B1 are "%00".

Further, the two bits (=b5 and b4; function number bits) subsequent to the identification bits BID are allocated to function numbers. Therefore, in principle, it is possible to assign four (=22) types of functions to the first-type command. However, when the function number bits are "%11", the remaining four bits (=b3 to b0) in the first byte B1 can also be allocated as expanded function numbers.

In the case of the PB signal-providing function, for example, PB signals are allocated to the remaining four bits (=b3 to b0) in the first byte.

Further, the second byte B2 is allocated to the line number corresponding to a number to specify a computer telephony card in the PB converter.

[5.3] Second-type Command (3-Byte Code)

Figure 8:
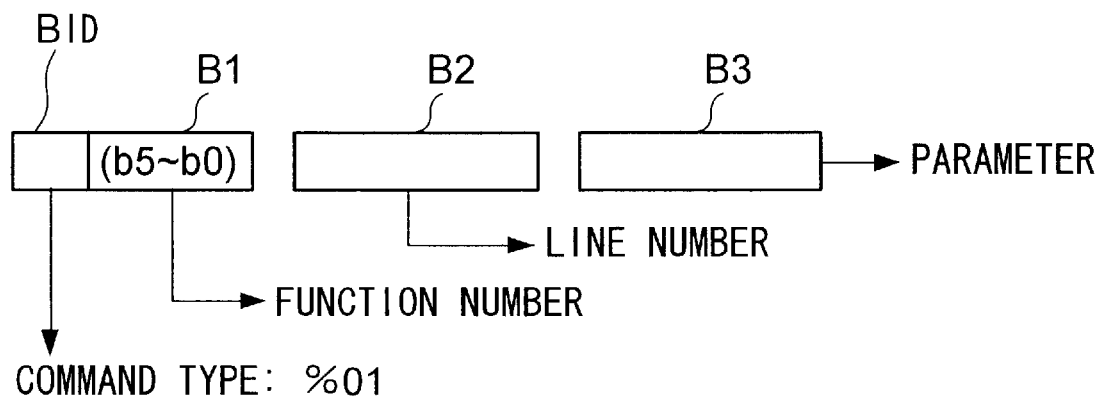
FIG. 8 is a diagram illustrating the format of the second-type command.

The second-type command, as shown in FIG. 8, is three-byte data comprising the first byte B1, the second byte B2 and the third byte B3. As described above, the identification bits BID constituting the first byte B1 are "%01".

Further, the six bits (=b5 to b0; function number bits) subsequent to the identification bits BID are allocated to function numbers. Therefore, it is possible to allocate sixty four (=26) types of functions to the second-type command.

Further, the second byte B2 is allocated to the line number corresponding to a number to specify a computer telephony card in the PB converter.

Further, the third byte B3 is allocated to a parameter.

[5.4] Third-type Command (Variable Length Code)

Figure 9:
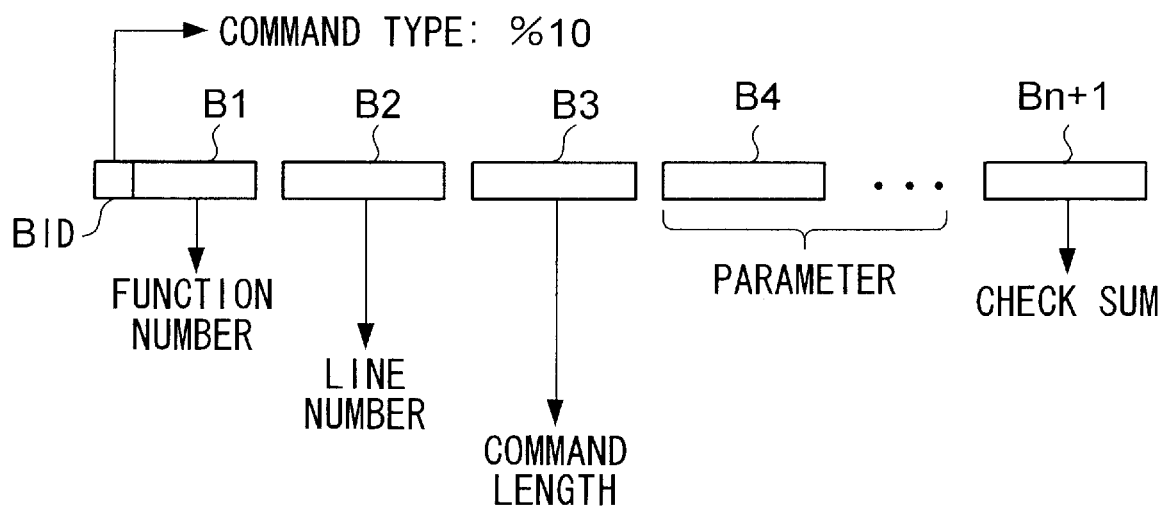
FIG. 9 is a diagram illustrating the format of the third-type command.

The third-type command is a variable length command as shown in FIG. 9. As described above, the identification bits BID constituting the first byte B1 are "%10".

Further, the six bits (=b5 to b0; function number bits) subsequent to the identification bits BID are allocated to function numbers. Therefore, it is possible to allocate sixty four (=26) types of functions to the third-type command.

Further, the second byte B2 is allocated to the line number corresponding to a number to specify a computer telephony card in the PB converter.

Further, the third byte B3 is allocated to a command length, and the fourth byte B4 to the nth byte Bn are allocated to parameters.

The (n+1)th byte B(n+1) is allocated as a check sum byte.

[5.5] Fourth-type Command (Test Mode Code)

The fourth-type command is a command used in a test mode and not activated under normal operations of devices.

It has the same command format as that of the third-type command. As described above, the identification bits BID constituting the first byte B1 are "%11".

[6] Process Sequences

Next, process sequences will be described.

[6.1] Start-up Sequence

Figure 10:
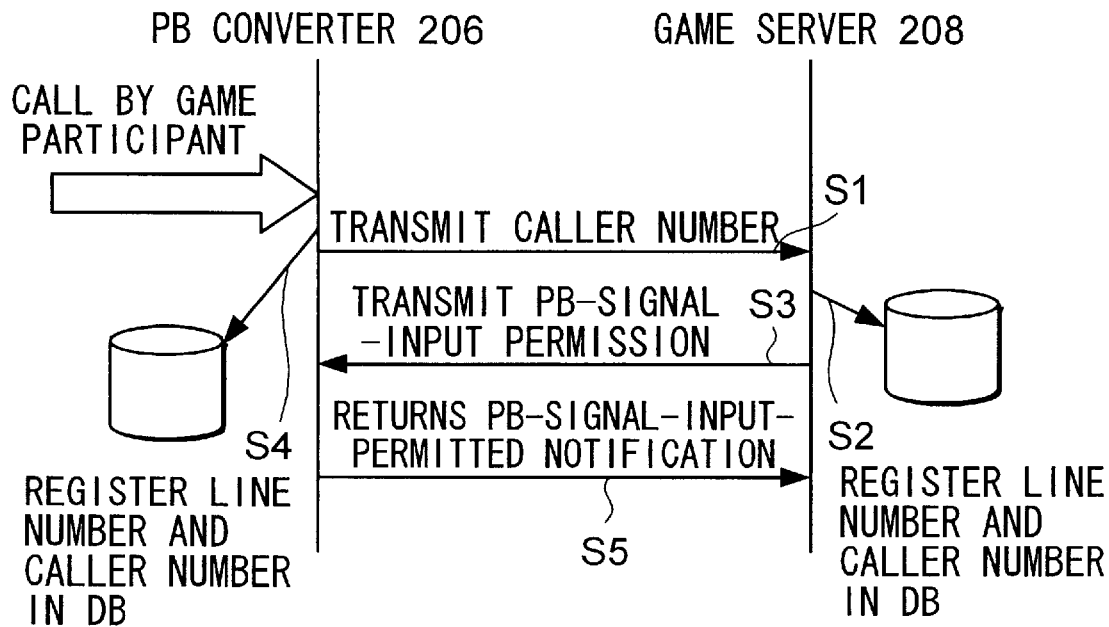
FIG. 10 is a diagram illustrating a start-up sequence.

A start-up sequence is shown in FIG. 10.

When a portable telephone terminal or a stationary telephone terminal originates a call and is connected to the PB converter 206, the PB converter 206 transmits the number of the line connected and the caller number (or caller identification number corresponding to the caller number) used as the identifier of the telephone terminal to the game server 208 to notify the server of these numbers (step S1).

At this point, the PB converter 206 registers the line number and the caller number (and the caller identification number corresponding to the caller number as required) in a database (DB) after associating them with one another (step S2).

FIG. 30 is a diagram exemplifying the contents of the database. In the present embodiment, as described above, n number of computer telephony cards 28-1 to 28-n are connected and each card has two lines. Thus, for example, as shown in FIG. 30, serial line numbers are allocated to the telephony ports of the computer telephony cards 28-1 to 28-n and registered in a database in which the serial line numbers are associated with the numbers of the connected callers.

Meanwhile, the game server 208 also registers the line numbers and the caller numbers (or caller identification numbers corresponding to the caller numbers) in a database (DB) by associating the line numbers with the caller numbers (step S3).

After this registration, communication is carried out between the PB converter 206 and the game server 208 by using the line numbers rather than the caller numbers which are greater in terms of the amount of data, and a communication traffic can therefore be reduced.

After registering the line numbers and the caller numbers (or caller identification numbers corresponding to the caller numbers) in the database (DB) by associating the line numbers with the caller numbers (step 4), the game server 208 transmits PB-signal-input permission, which permits the telephone terminal corresponding to the registered line number (or caller number or caller identification number corresponding to the caller number) to input a PB signal, to the PB converter 206 (step S5).

The start-up sequence is completed when the PB converter 206 returns a PB-signal-input-permitted notification in response to this PB-signal-input permission. Thereafter, the PB converter 206 is ready for accepting the input of a PB signal from the corresponding telephone terminal.

[6.2] Disconnection Sequence

A disconnection sequence is either activated by a telephone terminal or forcedly activated by the game server 208.

[6.2.1] Activation of Disconnection Sequence by Telephone Terminal

Figure 11:
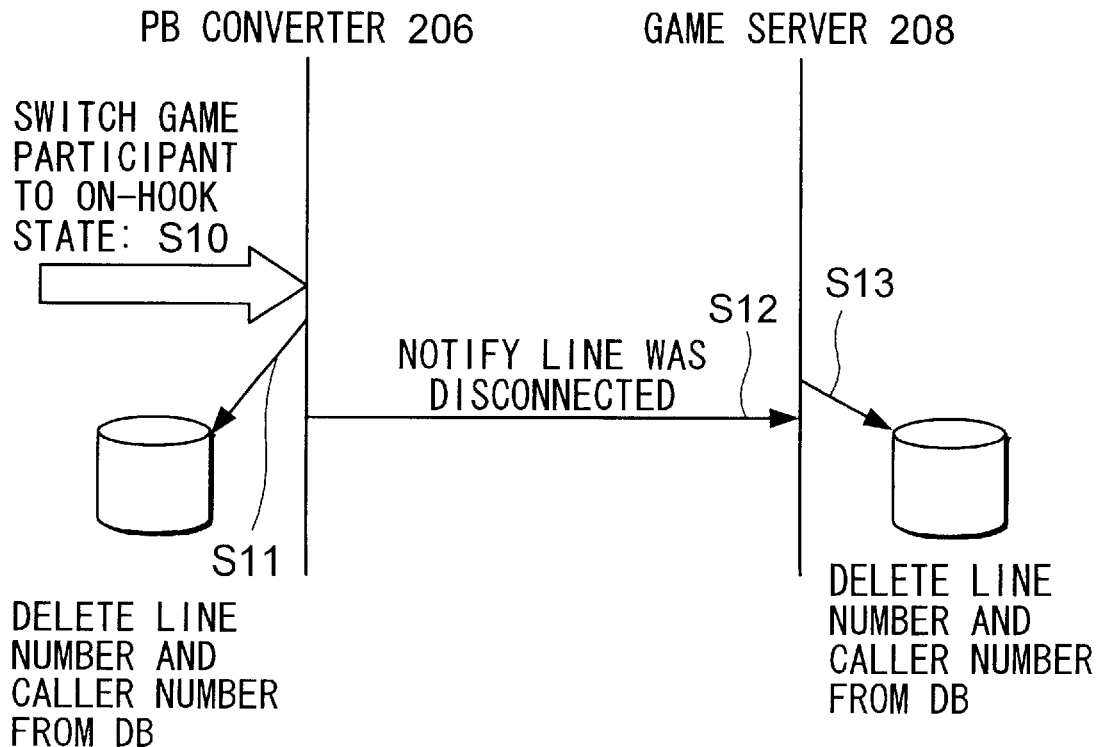
FIG. 11 is a diagram illustrating the sequence of disconnection from a telephone terminal.

A disconnection sequence by a telephone terminal is shown in FIG. 11.

When the disconnection sequence is activated by a telephone terminal, the telephone terminal is switched to an on-hook state (step S10).

Since this disconnects the telephone terminal from the PB converter 206, the PB converter 206 not only corresponds to the on-hook telephone terminal but also deletes the line number and caller number (and caller identification number corresponding to the caller number) associated with each other and stored in the database from the database (step S11).

Then, the PB converter 206 transmits a line-disconnected notification, which notifies the game server 208 that the telephone terminal corresponding to the line number has been disconnected, to the game server 208 (step 12).

Receiving the notification, the game server 208 deletes the line number and the caller number corresponding to the line number (or caller identification number corresponding to the caller number) from the database (step 13).

Alternatively, the above sequence can be constituted as follows. When it is detected that a telephone terminal has been switched to an on-hook state, the game server 208 is notified of this state. The game server 208 then notifies the PB converter 206 of the line number and a line-disconnecting request. Then, the PB converter 206 corresponds to the on-hook telephone terminal, deletes the line number and caller number (and caller identification number corresponding to the caller number) associated with each other and stored in the database from the database, and notifies the game server 208 that the telephone terminal corresponding to the line number has been disconnected, whereby the game server 208 deletes the line number and the caller number corresponding to the line number (or caller identification number corresponding to the caller number) from the database.

[6.2.2] Forced Activation of Disconnection Sequence by Game Server 208

Figure 12:
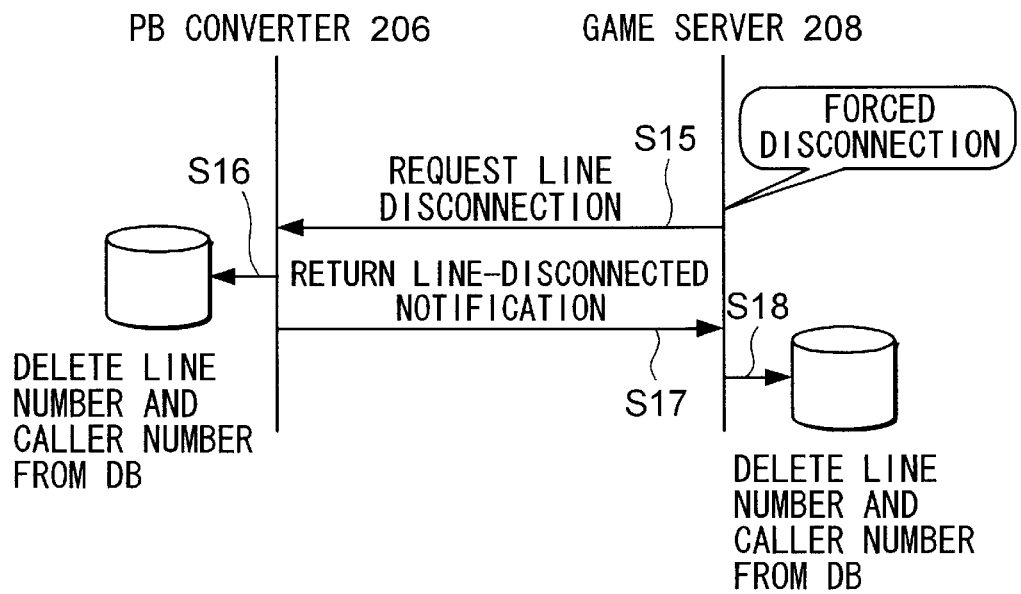
FIG. 12 is a diagram illustrating the sequence of forced disconnection.

A disconnection sequence by the game server 208 is shown in FIG. 12.

When the disconnection sequence is forcedly activated by the game server 208, the game server 208 notifies the PB converter 206 of a line number and a line-disconnecting request (step 15).

The PB converter 206 not only corresponds to the on-hook telephone terminal but also deletes the line number and caller number (and caller identification number corresponding to the caller number) associated with each other and stored in the database from the database (step S16).

Then, the PB converter 206 transmits a line-disconnected notification, which notifies the game server 208 that the telephone terminal corresponding to the line number has been disconnected, to the game server 208 (step 17).

Receiving the notification, the game server 208 deletes the line number and the caller number corresponding to the line number (or caller identification number corresponding to the caller number) from the database (step 18).

[6.3] Caller-number-requesting Sequence

A caller-number-requesting sequence is a sequence for requesting a notification of a caller number (or caller identification number corresponding to the caller number) from the PB converter 206 when the game server 208 has lost the information about the caller number (or caller identification number corresponding to the caller number) for some reason or needs to refer again to the caller number (or caller identification number corresponding to the caller number) of the telephone terminal connected to a particular line.

Figure 13:
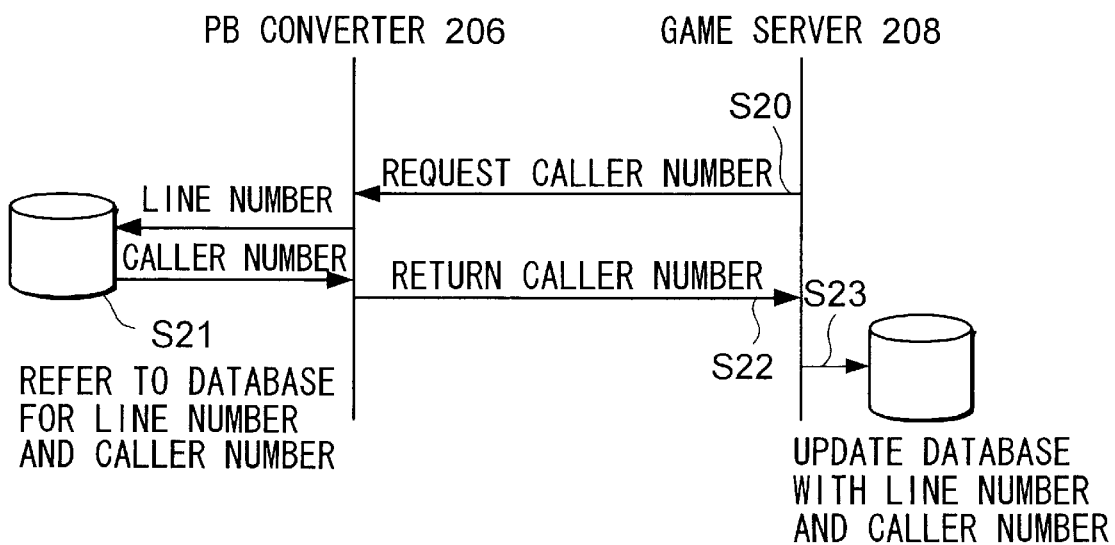
FIG. 13 is a diagram illustrating the sequence of requesting a caller number.

The caller-number-requesting sequence is shown in FIG. 13.

The game server 208 transmits a request for a caller number together with a line number (step S20).

Receiving the numbers, the PB converter 206 refers to the database on the basis of the line number (step S21), reads the caller number (or caller identification number corresponding to the caller number) out of the database, and transmits the caller number together with the line number to the game server 208 to notify the server of the caller number (step S22).

Receiving the numbers, the game server 208 associates the line number with the caller number (or caller identification number corresponding to the caller number) and update the database (step S23).

[6.4] Audio-output-requesting Sequence

An audio-output-requesting sequence is a sequence for transmitting the audio information preset in the PB converter 206 to the user's telephone terminal such as a portable telephone terminal.

In this case, illustrative examples of the audio information include audio guidance corresponding to a game, music such as BGM (Back Ground Music), sound effects such as a sound of explosion, and recorded voices.

Figure 14:
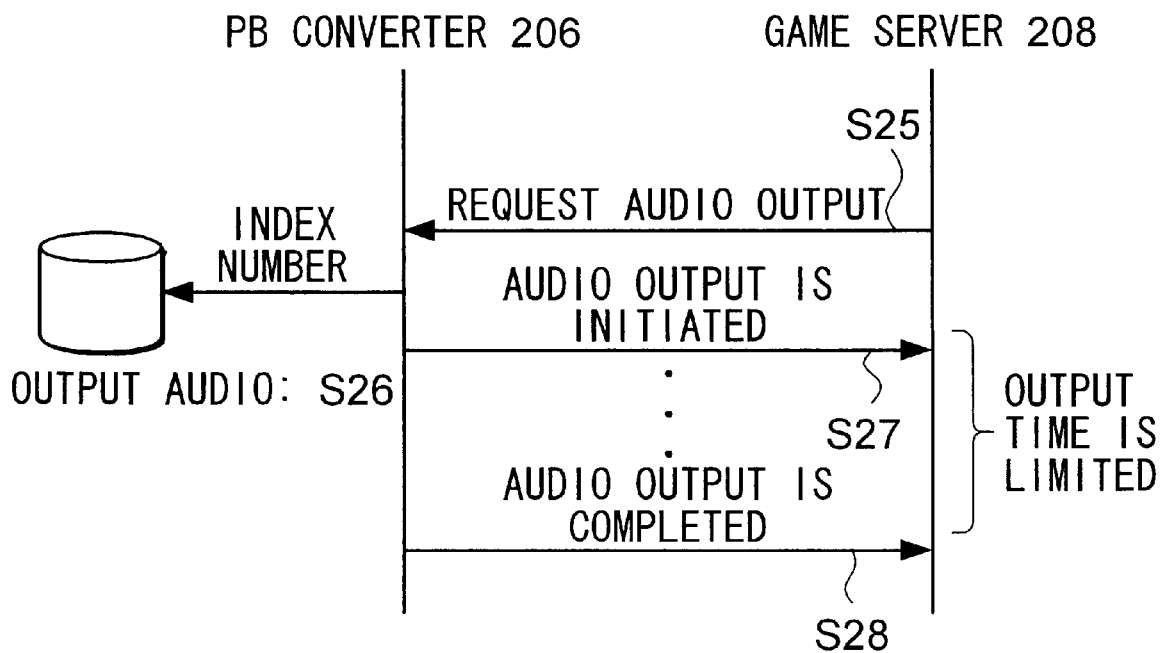
FIG. 14 is a diagram illustrating the sequence of requesting an audio output.

The audio-output-requesting sequence is shown in FIG. 14.

The game server 208 transmits a request for an audio output together with an index number corresponding to particular audio information so as to reproduce the particular audio information on a telephone terminal according to the proceeding of a game (step S25).

Receiving the request and the index number, the PB converter 206 searches the audio information corresponding to the index number out of an audio pool and transmits the audio information to the telephone terminal (step S26).

Then, the PB converter 206 notifies the game server 208 that the output of the audio information has been initiated, as an audio-output-initiated notification (step S27).

When the output time of the audio information requested to be outputted is limited, the PB converter 206 transmits an audio-output-completed notification to the game server 208 when the output of the audio information is completed (step S28).

Figure 15:
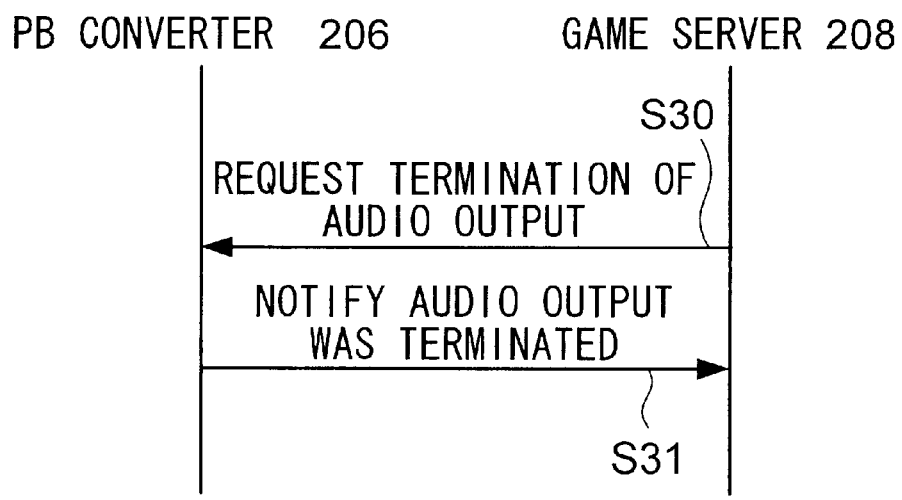
FIG. 15 is a diagram illustrating the sequence of requesting the termination of the audio output.

The audio-output-termination-requesting sequence is shown in FIG. 15.

Further, when the output time of the audio information requested to be outputted is not limited and perpetually continued, the game server 208, as shown in FIG. 15, transmits an audio-output-termination request to the PB converter 206 after a desired amount of time has elapsed since the game server 208 transmitted the request for an audio output to the PB converter 206 (step S30).

Receiving the request, the PB converter 206 terminates the output of the audio information and transmits an audio-output-terminated notification to the game server 208 (step S31).

[6.5] PB-signal-input-prohibition-requesting Sequence

A PB-signal-input-prohibition-requesting sequence is a sequence for permitting only particular players out of a plurality of players (game participants) to key in via the keypad of each telephone terminal so as to control a communication traffic.

Figure 16:
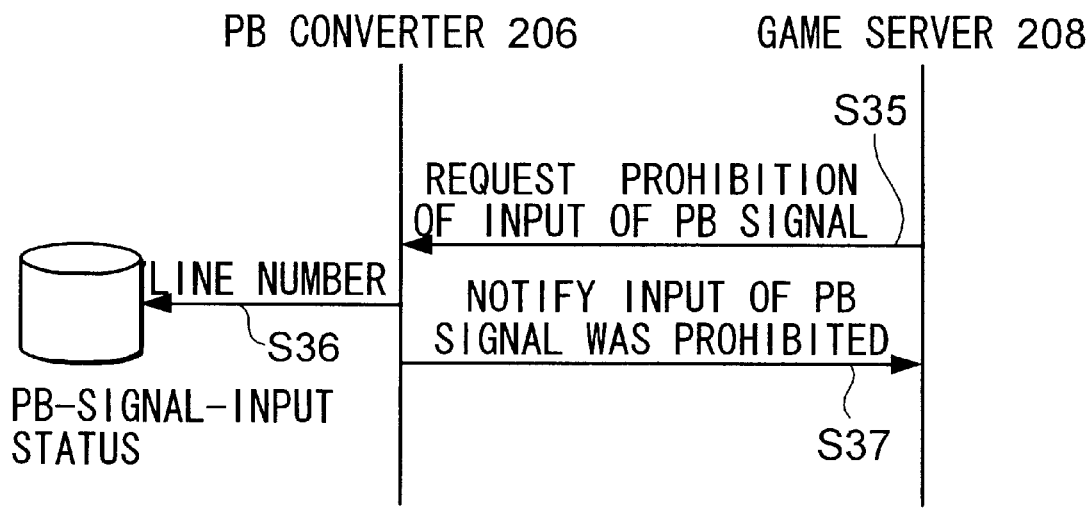
FIG. 16 is a diagram illustrating the sequence of requesting the prohibition of the inputting of a PB signal.

The PB-signal-input-prohibition-requesting sequence is shown in FIG. 16.

The game server 208 transmits a PB-signal-input-prohibiting request together with the line numbers corresponding to telephone terminals to be prohibited from key-in to the PB converter 206 so as to limit telephone terminals permitted to key in (step S35).

Receiving the request and the line numbers, the PB converter 206 prohibits the input of PB signals by disabling the PB signal input statuses of the telephone terminals corresponding to the received line numbers in a PB-signal-input-status database (step S36).

Then, the PB converter 206 transmits a PB-signal-input-prohibited notification to the game server 208 to notify the game server 208 that the input of PB signals has been prohibited (step S37).

[6.6] PB-signal-input-permitting Sequence

A PB-signal-input-permitting sequence is a sequence for permitting a player who has been prohibited from inputting a PB signal in the above PB-signal-input-prohibition-requesting sequence or a newly participating player who is ready for using the network game system to input the PB signal.

Figure 17:
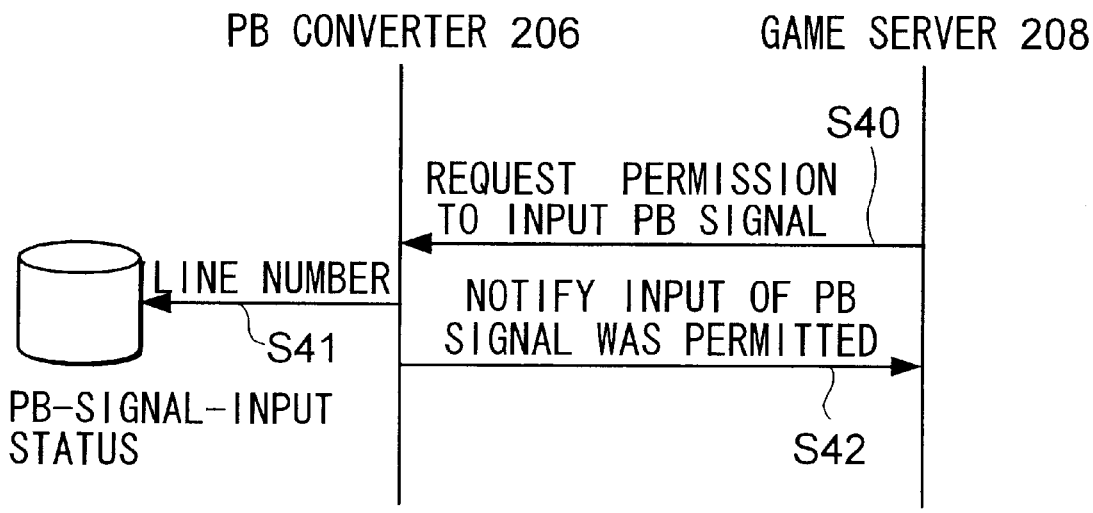
FIG. 17 is a diagram illustrating the sequence of permitting the inputting of the PB signal.

The PB-signal-input-permitting sequence is shown in FIG. 17.

The game server 208 transmits a PB-signal-input-permitting request together with the line number corresponding to the telephone terminal to be permitted to key in to the PB converter 206 so as to newly select a telephone terminal permitted to key in (step S40).

Receiving the request and the line number, the PB converter 206 permits the input of a PB signal by enabling the PB signal input status of the telephone terminal corresponding to the received line number in the PB signal input status database (step S41).

Then, the PB converter 206 transmits a PB-signal-input-permitted notification to the game server 208 to notify the game server 208 that the input of a PB signal has been permitted (step S42).

[6.7] Notification Process Sequence

A notification process sequence is a sequence that is performed for a command which does not need to be checked by the game server 208 and for which notification process is automatically carried out after a particular event.

Figure 18:
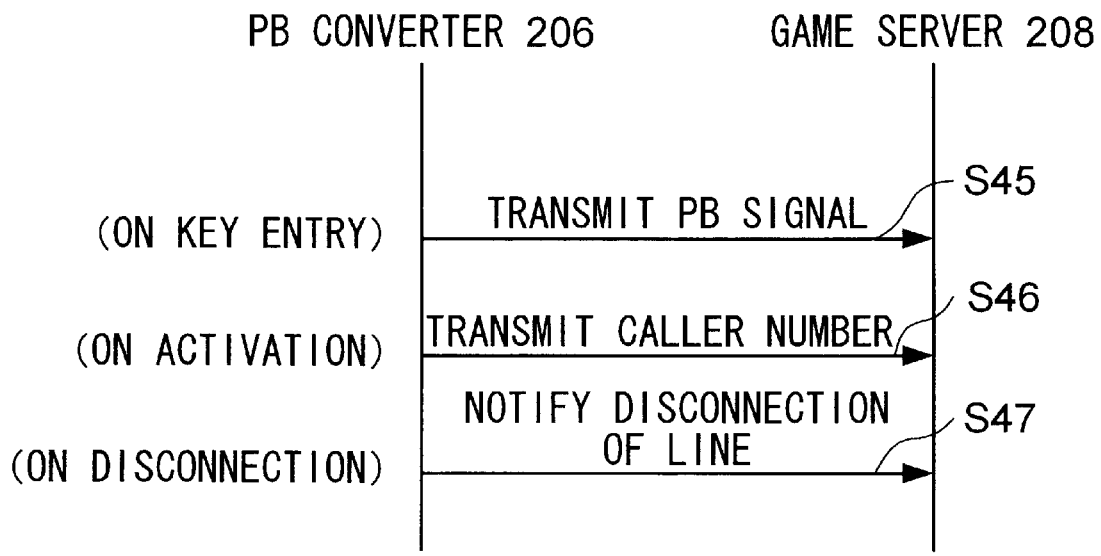
FIG. 18 is a diagram illustrating the sequence of notification process.

An example of the notification process sequence is shown in FIG. 18.

Illustrative examples of the notification process sequence include a PB signal notification from the PB converter 206 that notifies the game server 208 of the PB signal corresponding to a key entered on the keypad of a telephone terminal (step S45), a caller number notification from the PB converter 206 that notifies the game server 208 of a caller number (or caller identification number corresponding to the caller number) at the time of activation (step S46), and a line-disconnected notification from the PB converter 206 that notifies the game server 208 of the disconnection of a line at the time of disconnection (step S47).

[6.8] Test-mode-initiating Sequence

A test mode is a mode used for the maintenance, programming and remote control of a device and is set not to be activated even if a test command is transmitted or received during the normal runtime of an application.

That is, the test mode is an operation mode which is activated only when both the PB converter 206 and the game server 208 are switched to the test mode.

Thus, the test-mode-initiating sequence is a sequence that requests the other device to switch to the test mode when either the PB converter 206 or the game server 208 wishes to switch to the test mode.

Figure 19:
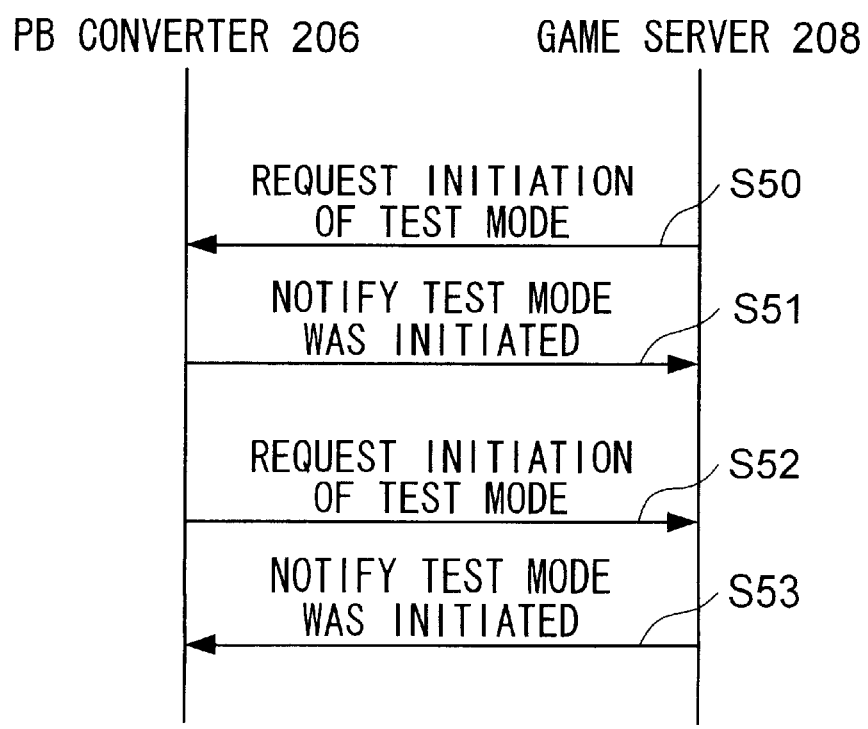
FIG. 19 is a diagram illustrating the sequence of initiating a test mode.

The test-mode-initiating sequence is shown in FIG. 19.

When the game server 208 requests the PB converter 206 to switch to the test mode, the game server 208 transmits a test-mode request to the PB converter 206 (step S50).

In response to this, if the PB converter 206 accepts the request of switching to the test mode, the PB converter 206 not only switches to the test mode but also transmits a test-mode-initiated notification to the game server 208 (step S51).

Receiving the notification, the game server 208 also switches to the test mode.

On the other hand, when the PB converter 206 requests the game server 208 to switch to the test mode, the PB converter 206 transmits a test-mode request to the game server 208 (step S52).

In response to this, if the game server 208 accepts the request of switching to the test mode, the game server 208 not only switches to the test mode but also transmits a test-mode-initiated notification to the PB converter 206 (step S53).

Receiving the notification, the PB converter 206 also switches to the test mode.

After both the PB converter 206 and the game server 208 have switched to the test mode, data will be exchanged between them by using the fourth-type command.

[6.9] Test-mode-terminating Sequence

A test-mode-terminating sequence is a sequence that requests the other device to terminate the test mode when either the PB converter 206 or the game server 208 wishes to switch from the test mode to a normal operation mode.

Figure 20:
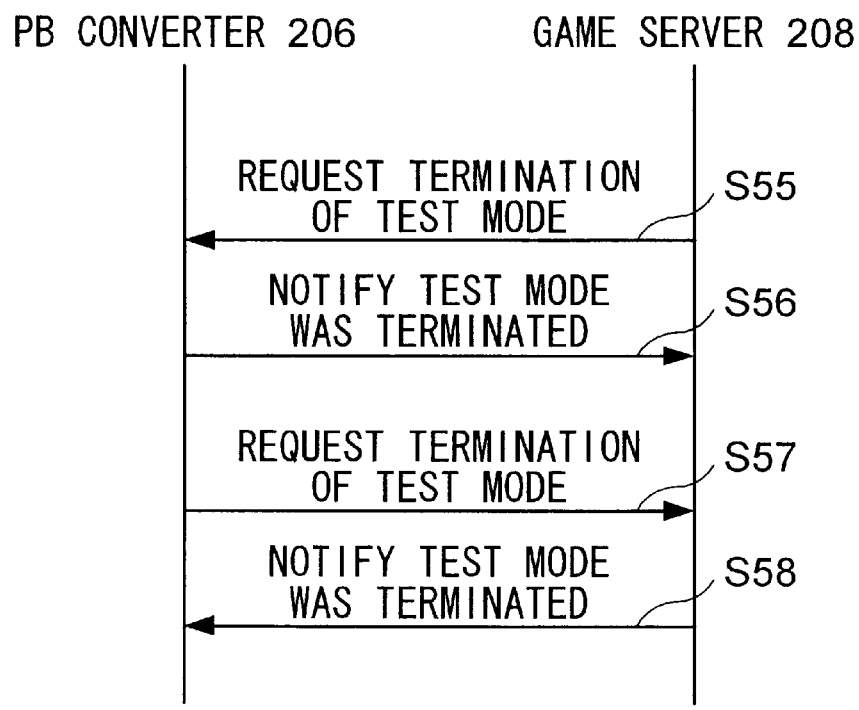
FIG. 20 is a diagram illustrating the sequence of terminating the test mode.

The test-mode-terminating sequence is shown in FIG. 20.

When the game server 208 requests the PB converter 206 to terminate the test mode, the game server 208 transmits a test mode termination request to the PB converter 206 (step S55).

In response to the request, if the PB converter 206 accepts the request of terminating the test mode, the PB converter 206 not only switches to the normal operation mode but also transmits a test-mode-terminated notification to the game server 208 (step S56).

Receiving the notification, the game server 208 also switches to the normal operation mode.

On the other hand, when the PB converter 206 requests the game server 208 to terminate the test mode, the PB converter 206 transmits a test mode termination request to the game server 208 (step S57).

In response to the request, if the game server 208 accepts the request of terminating the test mode, the game server 208 not only switches to the normal operation mode but also transmits a test-mode-terminated notification to the PB converter 206 (step S58).

Receiving the notification, the PB converter 206 also switches to the normal operation mode.

[6.10] Multiuser-communication-initiation-requestinq Sequence

A multiuser-communication-initiation-requesting sequence, in principle, is a sequence in which the game server 208 makes a request to form an audio channel so as to initiate communication between the players connected to the two target line numbers. However, even among three or more players, a series of audio channels can be formed by repeating the same sequence.

Figure 21:
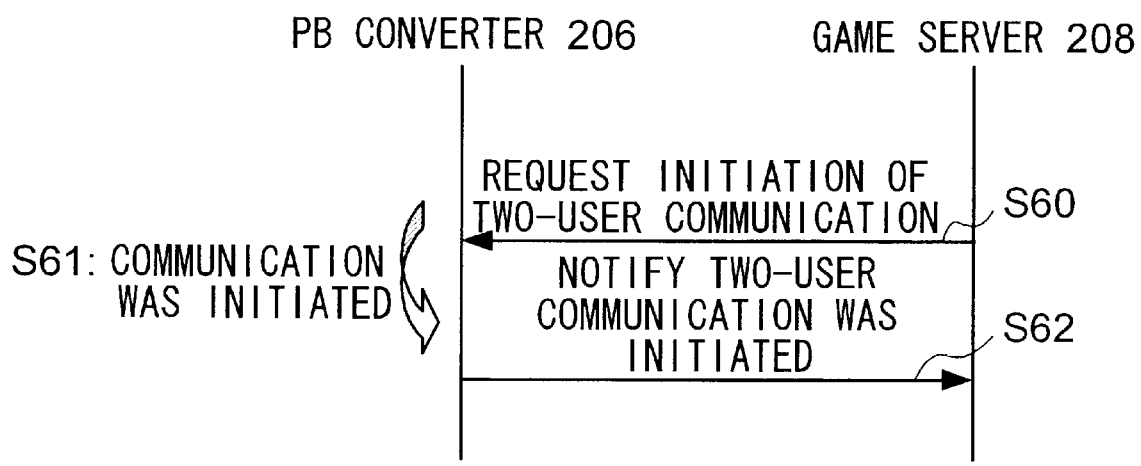
FIG. 21 is a diagram illustrating the sequence of requesting the initiation of multiuser communications.

The multiuser-communication-initiation-requesting sequence is shown in FIG. 21.

The game server 208 transmits a multiuser communication initiation request together with the two target line numbers to the PB converter so as to request the initiation of communication between users (step S60).

Receiving the request and the line numbers, the PB converter 206 electrically connects the computer telephony cards corresponding to the two received line numbers (step S61).

Figure 24:
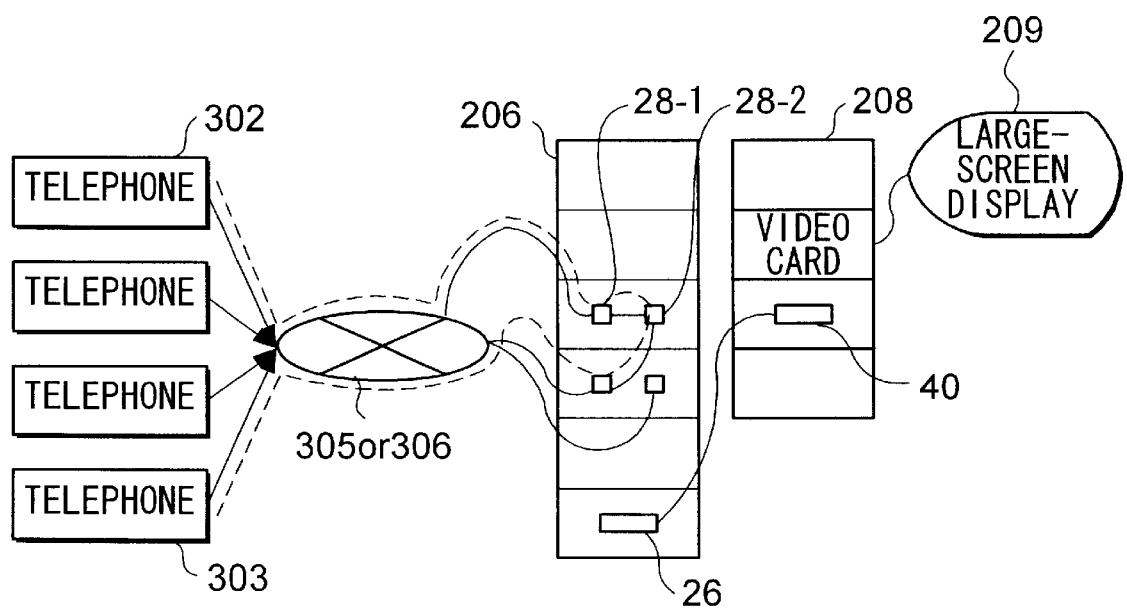
FIG. 24 is a diagram illustrating the state of the multiuser communications.

More specifically, as shown in FIG. 24, the computer telephony card 28-1 and the computer telephony card 28-2 that correspond to the received two line numbers are connected to each other By the connection, an audio channel (indicated by a dashed line in FIG. 24) is formed between the two telephone terminals 302 and 303 corresponding to the computer telephony cards 28-1 and 28-2, respectively, whereby communication is established therebetween.

Thereafter, the PB converter 206 transmits a multiuser-communication-initiated notification to the game server 208 to notify the game server 208 that multiuser communication has been initiated (step S62).

[6.11] Multiuser-communication-termination-requesting Sequence

A multiuser-communication-termination-requesting sequence is a sequence for requesting the cutting of the audio channel which has been already formed between particular users so as to terminate the communication between the users.

Figure 22:
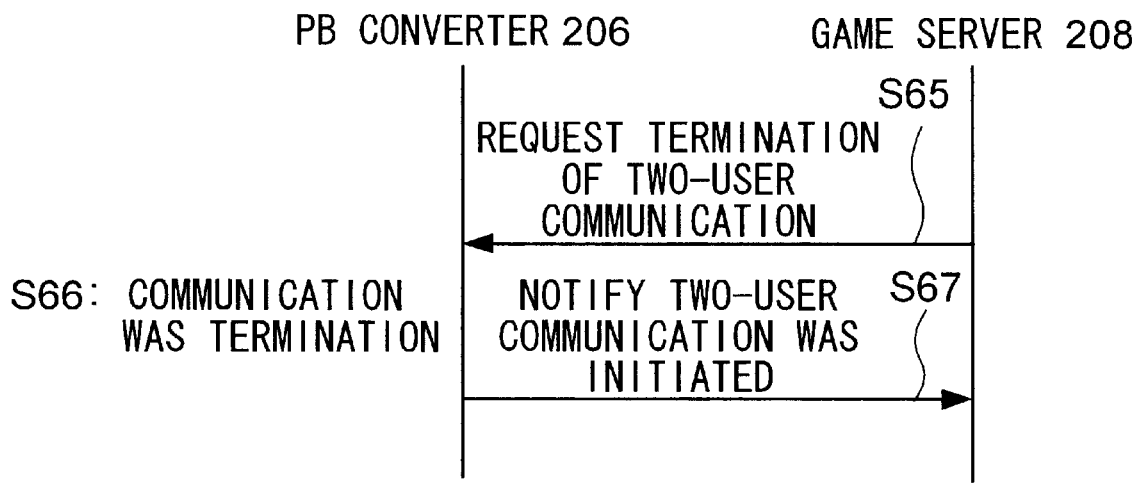
FIG. 22 is a diagram illustrating the sequence of requesting the termination of the multiuser communications.

The multiuser-communication-termination-requesting sequence is shown in FIG. 22.

The game server 208 transmits a multiuser communication termination request together with the two line numbers corresponding to the communication between particular users which is to be terminated to the PB converter 206 in order to request the termination of the communication (step S65).

Receiving the request and the line numbers, the PB converter 206 electrically disconnects the computer telephony cards corresponding to the two received line numbers from each other (step S66).

By the disconnection, the audio channel formed between the two telephone terminals corresponding to the computer telephony cards 28-1 and 28-2 is cut, whereby the communication is terminated.

Thereafter, the PB converter 206 transmits a multiuser-communication-terminated notification to the game server 208 to notify the game server 208 that the multiuser communication has been terminated (step S67).

[6.12] Multiuser-communication-status-requesting Sequence

A multiuser-communication-status-requesting sequence is a sequence for inquiring whether the line corresponding to the selected line number is currently connected to any of other lines.

Figure 23:
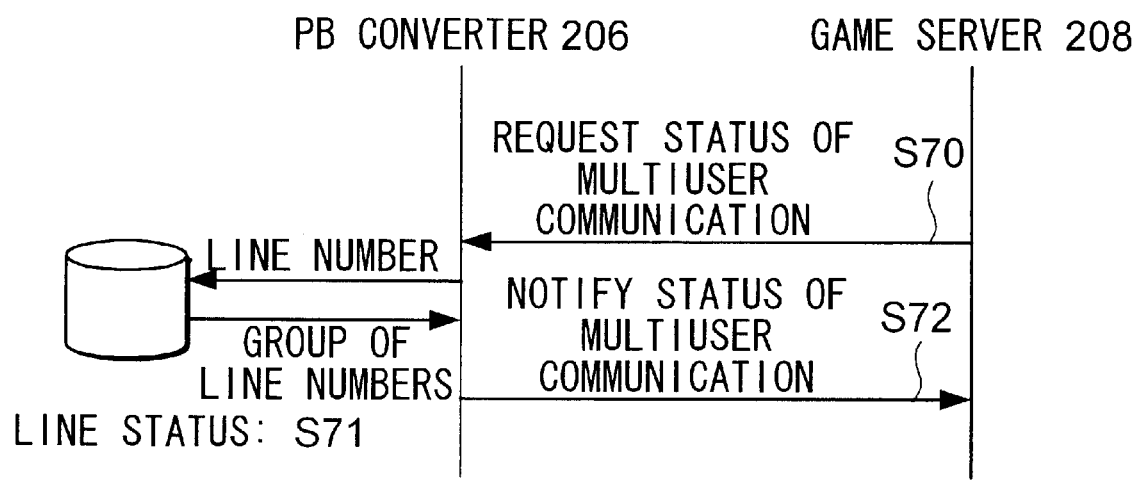
FIG. 23 is a diagram illustrating the sequence of requesting the state of the multiuser communications.

The multiuser-communication-status-requesting sequence is shown in FIG. 23.

The game server 208 transmits a multiuser communication status request together with the selected line number in order to inquire the PB converter 206 whether the selected line is currently connected to any of other lines (step S70).

Receiving the request and the selected line number, the PB converter 206 refers to a line status database for the received line number (step S71). When the selected line is connected to any of other lines, the PB converter 206 transmits a multiuser communication status notification including a group of line numbers to the game server 208, while when the selected line is connected to none of other lines, the PB converter 206 transmits a multiuser communication status notification notifying the status to the game server 208 (status S72).

[7] Operation of First Embodiment

[7.1] General Operation of First Embodiment

Next, a description will be given to the general operation of the first embodiment. Since the first network game server 200-1 and the second network game server 200-2 operate in the same manner, the second network game server 200-2 will be mainly described hereinafter.

When any of the stationary telephone terminal 301, the portable telephone terminal 302 or the portable telephone terminal 303 originates a call to the second network game server via the public line network 300, the PB converter 206 performs the start-up sequence, transmits the number of the connected line and the caller number (or caller identification number corresponding to the caller number) used as the identifier for the telephone terminal to notify the game server 208 of the numbers, and registers the line number and the caller number (or caller identification number corresponding to the caller number) in a database (DB) after associating them with each other.

Meanwhile, after registering the line number and caller number (or caller identification number corresponding to the caller number) associated with each other in the database, the game server 208 transmits PB-signal-input permission, which permits the telephone terminal corresponding to the registered line number (or caller number or caller identification number corresponding to the caller number) to input a PB signal, to the PB converter 206, which in turns returns a PB-signal-input-permitted notification in response to the PB-signal-input permission, whereby the start-up sequence is completed. Thereafter, the PB converter 206 is ready for accepting the input of the PB signal from the telephone terminal which has originated a call.

Along with this, a character (game character) corresponding to a player who is the user of the telephone terminal ready for accepting the input of the PB signal is displayed on the screen of the large-screen display 209 or the television 305.

Thereafter, when the player operates the keypad of a telephone terminal, for example, the portable telephone terminal 302, PB signals corresponding to the operations are inputted in the PB converter 206.

Then, the PB converter converts the inputted PB signals into control data (binary data) for controlling the game server 208 and transmits the control data together with the line number corresponding to the portable telephone terminal 302 from which the PB signals have been inputted.

More specifically, when the portable telephone terminal 302 originates a call to the PB converter 206 via the public line network 300, the PB converter 206 not only allocates any of computer telephony cards 28-1 to 28-n to the call but also outputs the call together with the line number corresponding to the allocated computer telephony card 28-x (x: 1 to n) to the game server 208 via the data communication card 26. Further, when a plurality of lines can be allocated to a single computer telephony card, the line numbers are allocated to the ports of the computer telephony card and transmitted to the game server 208.

Then, the MPU 20 generates control data (binary data) for controlling the game server 208 on the basis of the control program stored in the ROM 21 and outputs the control data to the game server 208 via the data communication card 26 as described above.

The game server 208 performs keyboard emulation on the basis of the inputted control data (binary data) and controls the display of the corresponding character (including the display of the character's reaction along with his movement and action) on a screen on the basis of the inputted line number.

More specifically, the MPU 35 of the game server 208 operates on the basis of the control program stored in the ROM 36 and stores the control data (binary data) inputted from the PB converter 206 in the RAM 37.

Then, the MPU 35 converts the control data (binary data) inputted on the basis of the keyboard emulation function into an operation code and passes the operation code to the game application, whereby the game proceeds.

[7.2] Operation at the Time of Multiuser Communication

[7.2.1] General Operation at the Time of Multiuser Communication

Next, a description will be given to the operation when multiuser communication is carried out in the present embodiment. In this case as well, the first network game server 200-1 and the second network game server 200-2 operate basically in the same manner. Therefore, the second network game server 200-2 will be mainly described hereinafter.

Figure 25:
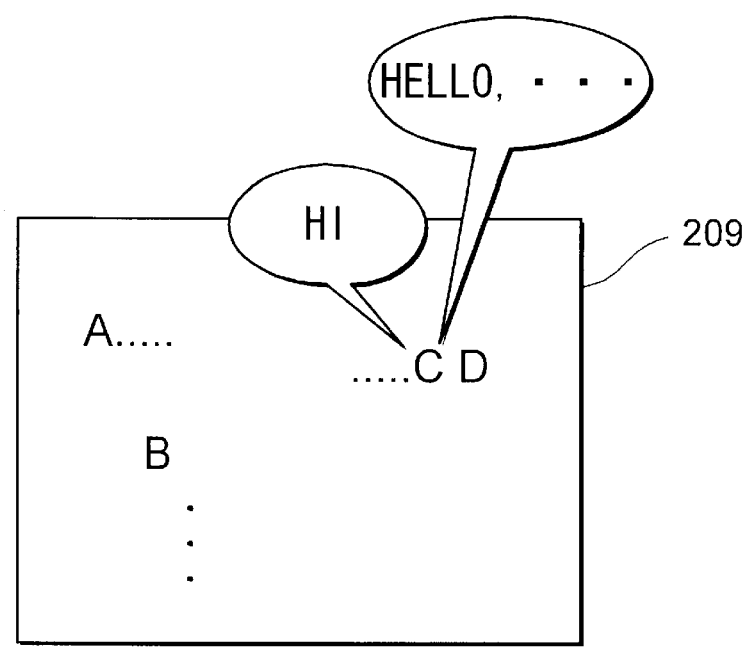
FIG. 25 is a diagram illustrating the action in the case of requesting the initiation of the multiuser communications.

The game server 208 is set to make a multiuser communication initiation request when the (game) characters of players come close to each other within a predetermined distance on the screen of the large-screen display 209 as indicated by the symbols C and D in FIG. 25. For example, the game server 208 is set to make the request when adjacent characters come close to each other within a predetermined distance.

This setting implies that the characters are close enough to each other to communicate with each other.

In such a state, the game server 208 transmits a multiuser transmission initiation request together with the two line numbers (numbers specifying computer telephony cards) corresponding to the game characters C and D to the PB converter 206 in order to request the initiation of multiuser communication.

Receiving the request and the line numbers, the PB converter 206 electrically connects the computer telephony cards corresponding to the two received line numbers, and an audio channel is formed between the two telephone terminals, whereby communication is established.

Thereafter, the PB converter 206 transmits a multiuser-communication-initiated notification to the game server 208 to notify the game server 208 that multiuser communication has been initiated.

As a result, the players corresponding to the characters C and D, for example, can easily exchange such words as "Hello" and "Hi" with each other via the earphones and microphones of the portable telephone terminals.

While the multiuser communication is in progress, the game server 208 transmits a multiuser communication status request together with the number of the selected line in order to inquire the PB converter 206 at predetermined time intervals whether the selected line is currently connected to any of other lines or not. The PB converter 206 refers to a line status database for the received line number. When the selected line is being connected to any of other lines, the PB converter 206 transmits a multiuser communication status notification including a group of line numbers to the game server 208, while when the selected line is connected to none of other lines, the PB converter 206 transmits a multiuser communication status notification notifying the status to the game server 208.

More specifically, in the case of the above example, when the multiuser communication status request is transmitted together with the selected line number corresponding to the character C, a multiuser communication status notification including the line numbers corresponding to the characters C and D is returned.

Thereafter, when the character C has stopped playing the game, the game server 208 transmits a multiuser communication termination request together with the two line numbers corresponding to the characters C and D to the PB converter 206 in order to request the termination of the communication between particular players, i.e., the players corresponding to the characters C and D, and the PB converter 206 electrically disconnects the computer telephony cards corresponding to the received two line numbers from each other. By the disconnection, the audio channel formed between the two players corresponding to the characters C and D is cut, whereby the communication is terminated. Thereafter, the PB converter 206 transmits a multiuser-communication-terminated notification to the game server 208 to notify the game server 208 that the multiuser communication has been terminated.

[7.2.1] Concrete Operation at the Time of Multiuser Communication

A more detailed description will be given to the operation when multiuser communication is carried out.

Firstly, with reference to FIGS. 28 and 31, the operation of multiuser connections among the computer telephony cards 28-1 to 28-n will be described.

As described above, the MVIP controller 431 controls the connection of each telephony port of the cards for both input and output.

In the present embodiment, since a game participant uses a telephone terminal as a controller when the multiuser communication is not carried out, so-called communication is not carried out. In this case, the input data from each telephony port is used mainly for detecting a PB signal in the DSP 432. The output data to each telephony port is, for example, sound data of sound effects provided by the above-described multimedia-pooling function F5.

At the time of multiuser communication, as will be described below, a line connection is conducted in the MVIP controller 431 as follows.

Firstly, when the lines allocated to the telephony ports in the same card are to be connected, the DSP 432 outputs a signal, which instructs the MVIP controller 431 to make a connection such that the input data from one telephony port is read in as the output data to the other telephony port, to the MVIP controller 431. Receiving the signal, the MVIP controller 431 makes the instructed connection, so that the audio inputted from the telephone terminal line-connected to one of the telephony ports is outputted to the telephone terminal line-connected to the other telephony port.

Next, when telephony ports in different cards are connected, the DSP 432 outputs a control signal to the MVIP controller 431 to specify a channel and a slot on the MVIP bus, which is connected to the MVIP controller 431, for storing the input data from the telephony port used in multiuser communication and a channel and a slot on the MVIP bus for storing the output data to the telephony port.

Figure 31:
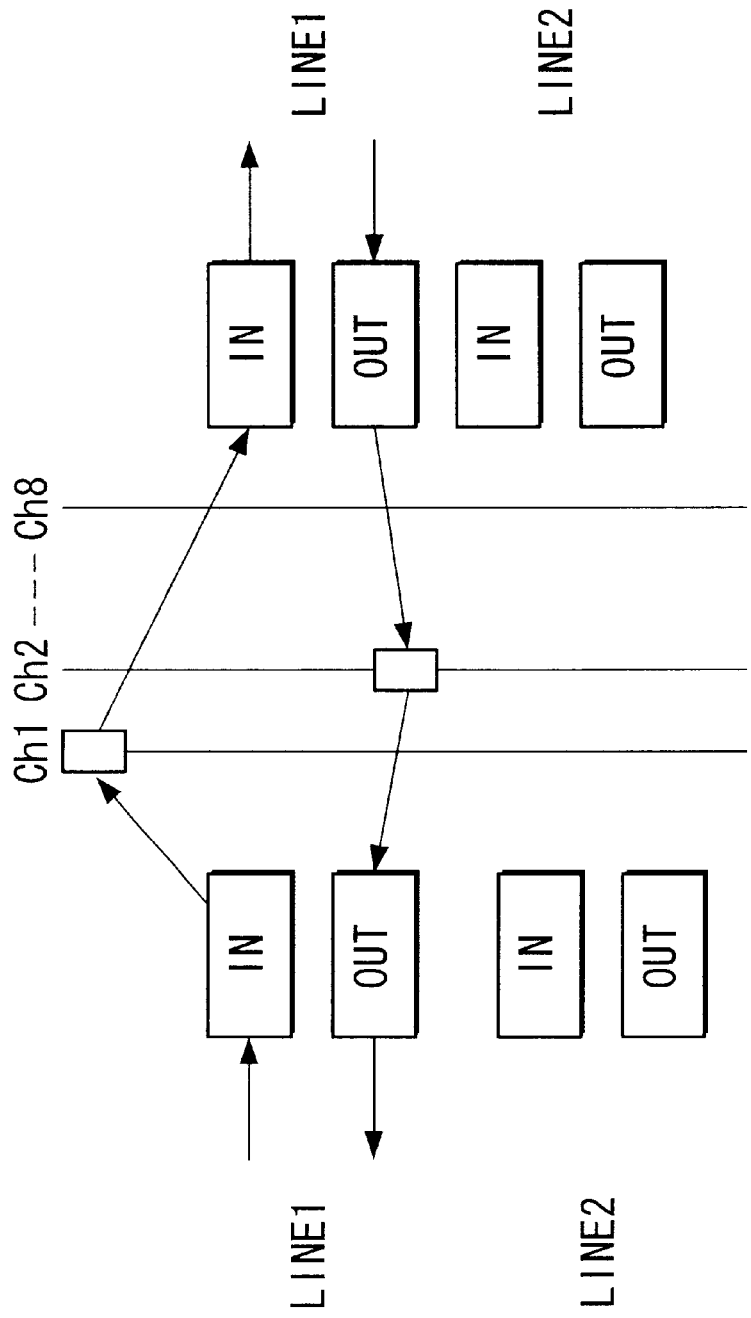
FIG. 31 is a diagram illustrating the multiuser communications.

Receiving the control signal, the MVIP controller 431 outputs the input data from the telephony port to the slot on the channel specified by the DSP 432 and outputs the data stored in the slot on the channel specified by the DSP 432 to the telephony port (refer to FIG. 31).

Although the connection for two-user communication has just been described, communication involving three or more users can be carried out by specifying a channel and a slot for storing input data and a channel and a slot for storing output data for each telephony port.

Figure 32:
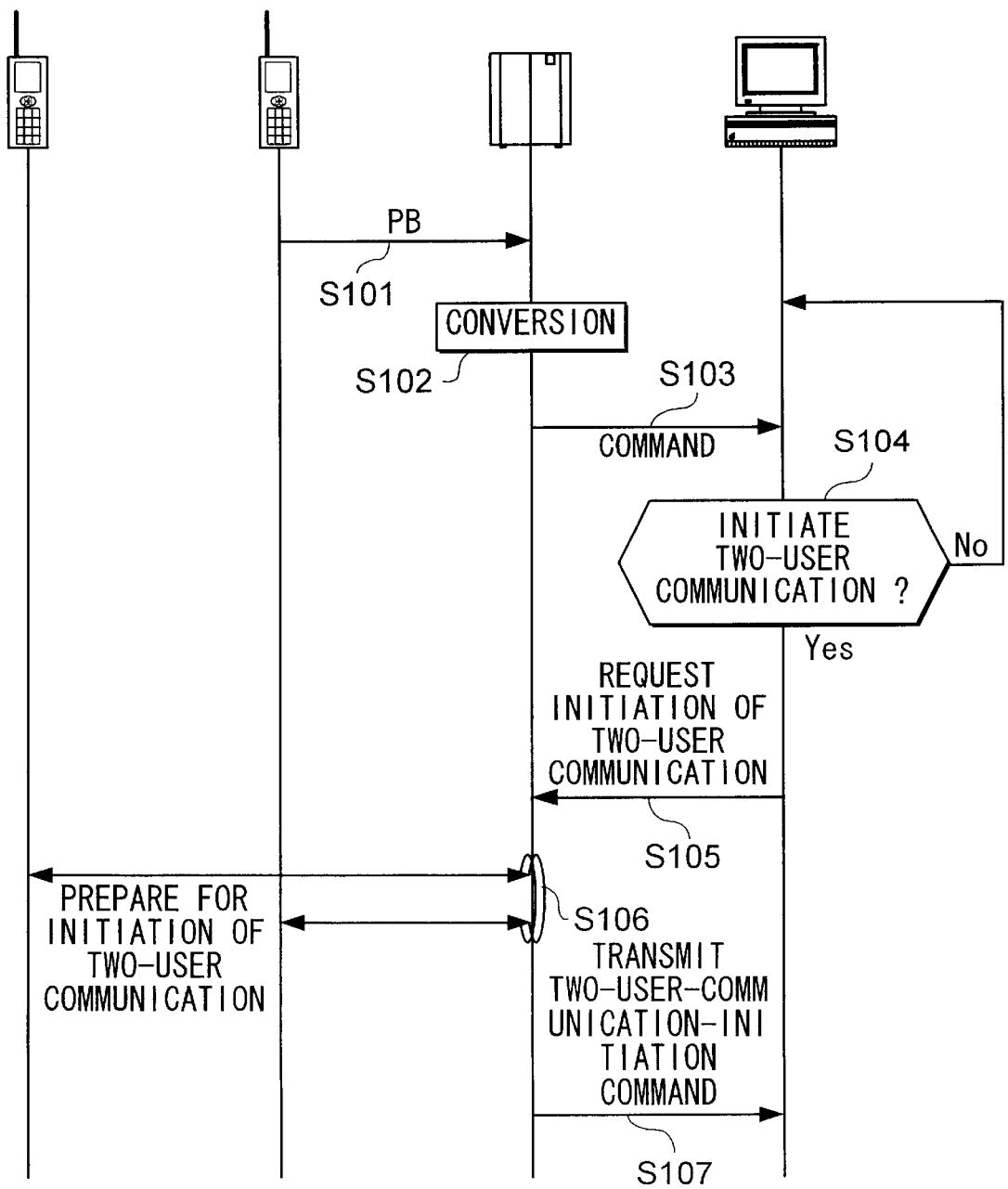
FIG. 32 is a sequence diagram illustrating the procedures at the time of initiating communication between two persons.

Next, the operation at the time of initiating the multiuser communication will be described with reference to the sequence shown in FIG. 32. A description will be given to the overall operation at the time of initiating two-user communication on the basis of the sequence between the PB converter 206 and the game server 208 which has been already described.

A PB signal is inputted into the PB converter 206 by operating the ten key of a telephone terminal (S101). The PB converter 206 converts the PB signal into the above-described command (S102) and transmits the command to the game server 208 (S103).

After receiving the command, the game server 208 processes the processes on the game application by interpreting the command and determines whether or not to initiate multiuser communication (S104). This determination will be described in detail later by presenting specific examples.

When it has been determined in the step S104 that multiuser communication is not to be initiated ("No" in the step S104), the game server 208 waits for another command from the PB converter 206.

On the other hand, when it has been determined in the step S104 that multiuser communication is to be initiated ("Yes" in the step S104), the game server 208 transmits a multiuser-communication-initiation-requesting command to the PB converter 206 (S105). As described above, the PB converter 206 controls the computer telephony cards 28-1 to 28-n, line-connects the telephony ports with each other (S106) and transmits a multiuser-communication-initiation command to the game server 208 (S107).

Figure 33:
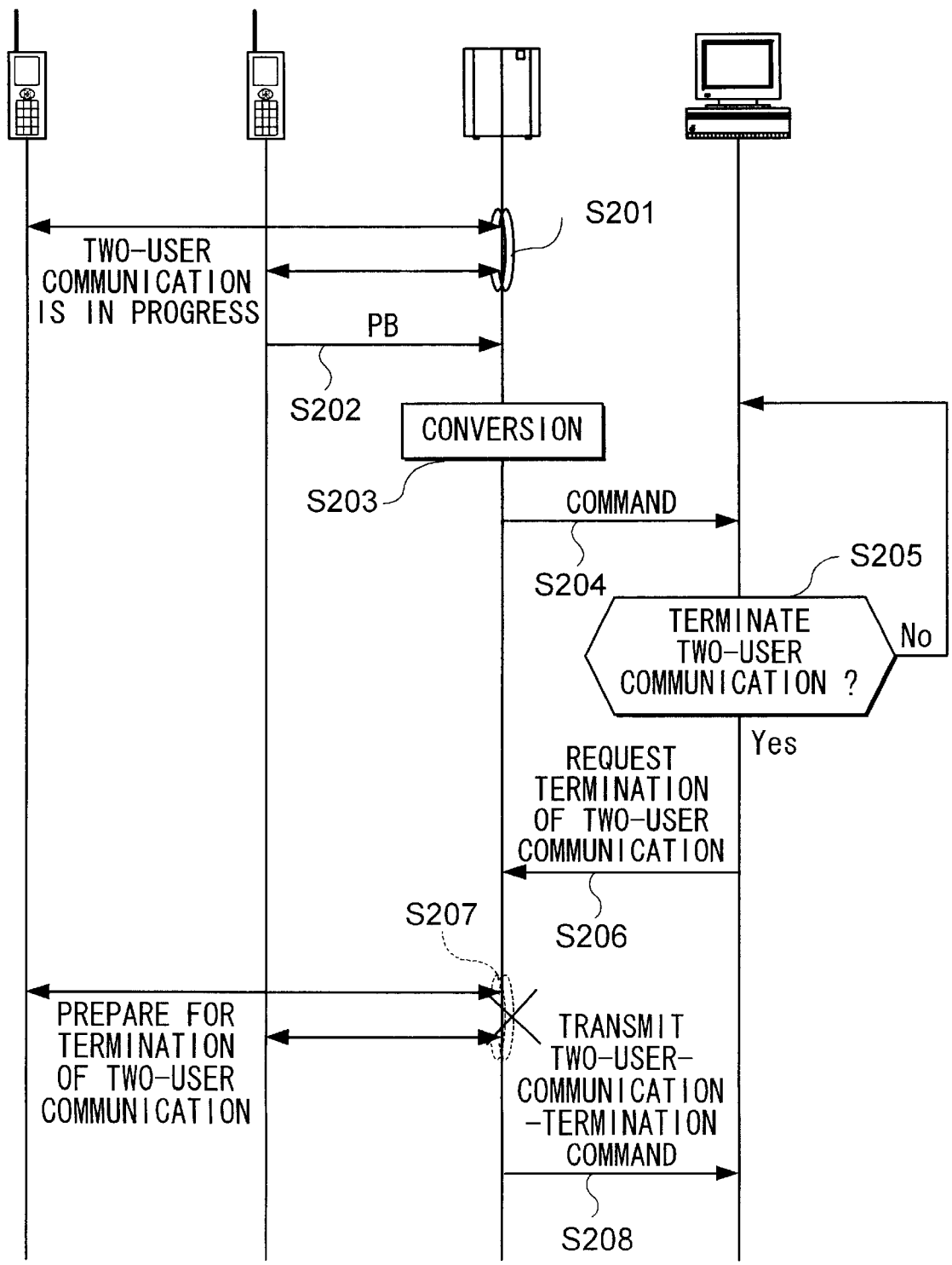
FIG. 33 is a sequence diagram illustrating the procedures at the time of terminating the communication between two persons.

Next, the operation at the time of terminating the multiuser communication will be described with reference to the sequence shown in FIG. 33.

When the two-user communication is in progress between two telephone terminals by the above-described line connection between the telephony ports (S201) and a PB signal is inputted into the PB converter 206 by operating the ten key of the telephone terminal (S202), the PB converter 206 converts the PB signal into a command (S203) and transmits the command to the game server 208 (S204).

After receiving the command, the game server 208 interprets the received command to determine whether or not to terminate the multiuser communication (S205). This determination will also be described in detail later together with the determination of whether or not to initiate the multiuser communication.

When it has been determined in the step S205 that the multiuser communication is not to be terminated ("No" in the step S205), the game server 208 waits for another command from the PB converter 206. When it has been determined that the multiuser communication is to be terminated ("Yes" in the step S205), the game server 208 transmits the above-described multiuser-communication-termination-requesting command to the PB converter 206 (S206).

After receiving the command, the PB converter 206 switches the state of connection in the computer telephony cards 28-1 to 28-n from a multiuser-connected state to a multiuser-not-connected state (S207) and transmits a multiuser-communication-termination command to the game server 208 (S208).

Next, the determination of whether or not to initiate or terminate the multiuser communication will be described with reference to FIG. 34. In the game application of the present embodiment, the position where a character is to be displayed is specified by the Y and Y axes on the screen. In the present embodiment, X1, X2, . . . and Xmax coordinates can be specified in the direction of the X axis, Y1, Y2, . . . and Ymax coordinates can be specified in the direction of the Y axis, and grids that can be specified by (Y, Y) are formed on the screen.

When a character is displayed on the screen, the character number allocated to the character and the coordinates at which the character is displayed are stored together in the database of the game server 208.

In the present embodiment, the line number and the caller number are associated with each other and registered in the database (refer to FIG. 10) and, when a game is to be started, a character is allocated to the line number and the coordinates at which the character is displayed are determined. Further, the same user may be allowed to use the same character every time by preparing in advance a database in which caller numbers and character numbers are associated with each other and registered, or the user may be allowed to select a desired character from usable characters at the time of participating a the game.

In the present embodiment, image data for displaying a character is stored in the external storage 41 of the game server 208 for each character number. Since the character numbers allocated to the users who have already been participating in the game are already registered in the database, the game server 208 searches, selects and allocates a character number which is not yet registered in the database when receiving a line number from the PB converter 206. Then, the allocated character number and the line number are associated with each other and registered in the database.

Then, the game server 208 determines the coordinates at which the allocated character is displayed on the screen. In the present embodiment, the initial display position of the character is made unpredictable by using random numbers. The determined coordinates are also associated with the line number and stored in the database.

Next, the present embodiment will be described by presenting specific examples based on FIGS. 30 and 34. It is assumed that the caller number of the user who has already been participating in the game is "090123456789" and the line number "0" is allocated to this user. It is also assumed that the character number "Ca0" is allocated to the line number "0" and the display coordinates are (X4, Y3).

It is now assumed that the line number "1" is allocated to a user with the caller number "09012345321" when the user participates in the game, that the character number "Ca1" is allocated to this line number and that the initial display position is determined to be (X6, Y4) by the calculation using random numbers.

When the game participant with the caller number "09012345321" operates the ten key of a telephone terminal, the PB signal corresponding to the operated key is inputted to the PB converter 206, and the command representing the operated ten key is inputted to the game server 208 as described above. The game server 208 updates the display position of the character by calculating the display coordinates of the character according to the following rule.

As already described above, since the command transmitted from the PB converter 206 has already been converted into key event data by the keyboard emulation function F21, the game server 208 identifies the line number corresponding to the inputted key event. Then, the game server 208 refers to the database on the basis of the line number to select a character to move and specify the current display coordinates of the character.

Then, it is determined from the key event data which key the user has operated. In the present embodiment, the character is moved to the upper left when the key "1" is determined to have been pressed, one grid above when the key "2" is determined to have been pressed, to the upper right when the key "3" is determined to have been pressed, one grid left when the key "4" is determined to have been pressed, one grid right when the key "6" is determined to have been pressed, to the lower left when the key "7" is determined to have been pressed, one grid down when the key "8" is determined to have been pressed, and to the lower right when the key "9" is determined to have been pressed.

More specifically, when a variable representing the determined key number is represented as Key, the current display coordinates as (X, Y) and the updated coordinates as (Xa, Ya), the coordinates can be calculated as follows.

Key=1 $(Xa, Ya)=(X-1, Y-1)$

Key=2 $(Xa, Ya)=(X, Y-1)$

Key=3 $(Xa, Ya)=(X+1, Y-1)$

Key=4 $(Xa, Ya)=(X-1, Y)$

Key=6 $(Xa, Ya)=(X+1, Y)$

Key=7 $(Xa, Ya)=(X-1, Y+1)$

Key=8 $(Xa, Ya)=(X+1, Y-1)$

Key=9 $(Xa, Ya)=(X+1, Y+1)$

When the coordinate values calculated by the calculation are "0", the coordinates are not to be updated and the display position of the character is not changed. After the display position of the character is changed by updating the coordinates of the character as described above, it is determined whether the moved character is now at an adjacent position to any of other characters. The terms "adjacent position" as used herein represent the condition where other character(s) is/are displayed in any of upper, lower, left and right grids adjacent to the grid in which a character is displayed.

When the coordinates of the character whose display position has been changed by the command inputted from the PB converter 206 are represented as (Xa, Xb), other characters are on the adjacent coordinates when (Xb, Yb) which satisfies the following expression exists.

$$|Xa-Xb|+|Ya-Yb|=1$$

This is because the sum of the absolute difference between the X coordinates and the absolute difference between the Y coordinates of two vertically or horizontally adjacent grids is always 1.

Figure 34:
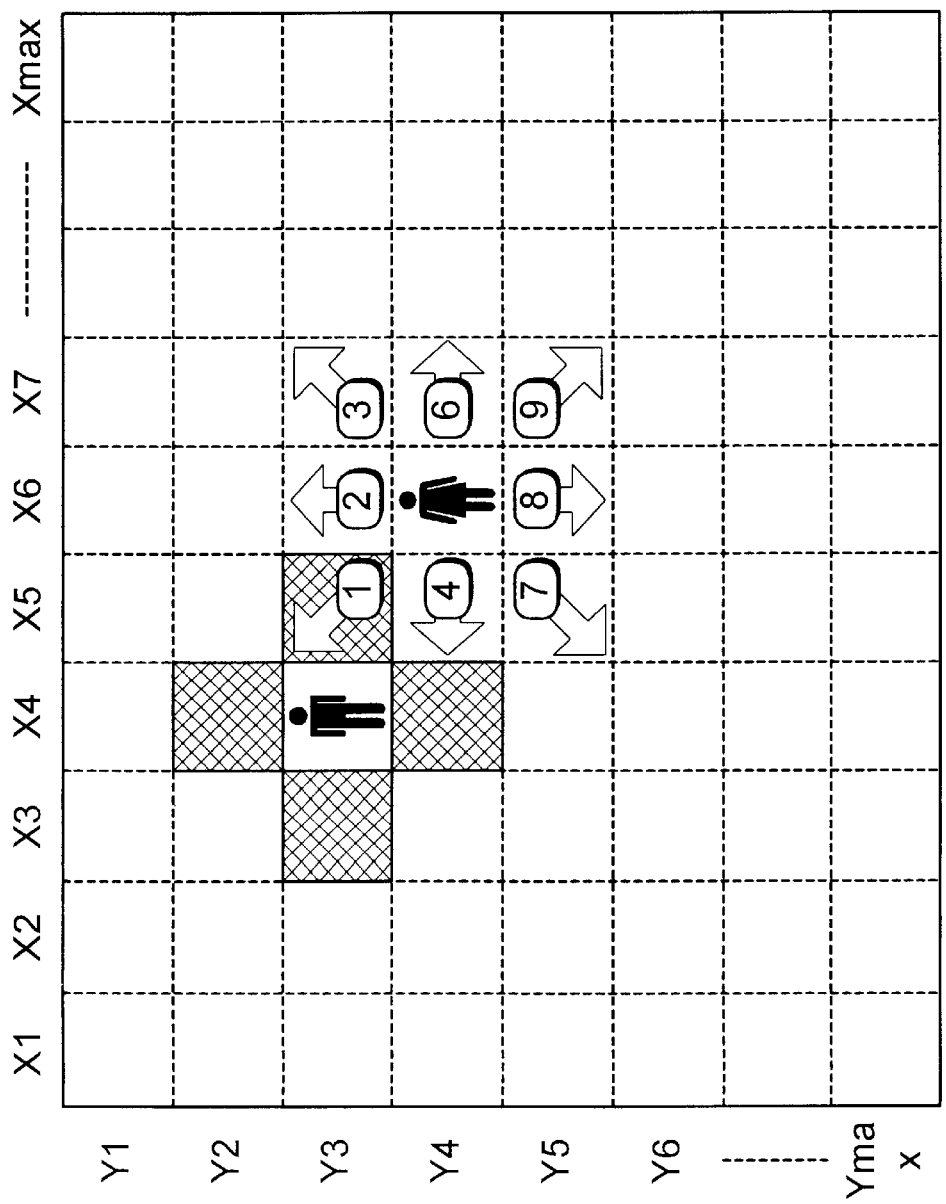
FIG. 34 is a diagram illustrating the condition under which the multiuser communications are initiated.

In the example shown in FIG. 34, the coordinates of the character Ca0 are (Y4, Y3). Therefore, when other characters are adjacent to this character, they are displayed on any of (X3, Y3), (X4, Y2), (X5, Y3) and (X4, Y4). In FIG. 34, since the character Ca1 is displayed on (X6, Y4), when a user presses the key "1" out of the ten keys of a terminal, the coordinates of the character Ca1 are updated as follows.

$$(Xa, Ya)=(X6-1, Y4-1)=(X5, Y3)$$

In this case, since the coordinates of the character Ca0, (X4, Y3), are included in the coordinates (Xb, Yb) that satisfy the expression $|Xa-Xb|+|Ya-Yb|=1$, it is determined that the character Ca0 and the character Ca1 are adjacent to each other.

When it has been determined that they are at adjacent positions to each other, the game server 208 determines to initiate the aforementioned multiuser communication (refer to FIG. 32), identifies the line numbers corresponding to the characters adjacent to each other by referring to the database, generates a multiuser-communication-requesting command specifying the line numbers and transmits the command to the PB converter 206.

Meanwhile, when it has been determined after the initiation of the multiuser communication that the adjacent positions have been cancelled, it is determined that the multiuser communication has been ended. The cancellation of the adjacent positions means that the coordinates (Xb, Yb) which satisfy the expression $|Xa-Xb|+|Ya-Yb|=1$ no longer exist for the character whose coordinates have been changed on the basis of the command from the PB converter. Although the adjacent positions have been described only for vertically adjacent grids and horizontally adjacent grids in the above description, the diagonally adjacent grids may also be included.

Figure 38:
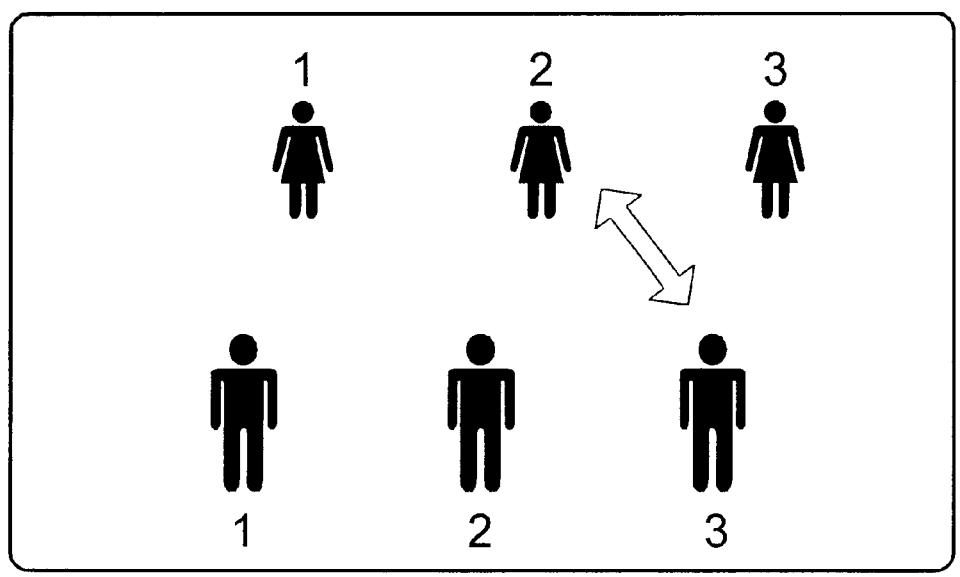
FIG. 38 is a diagram illustrating an application example.

Thus, since any number of users can participate in the game by using telephone terminals and initiate the multiuser communication on the game according to the predetermined condition, a variety of applications using a telephone terminal as a controller can be provided. The examples of applications in which the multiuser communication is initiated according to the predetermined condition are shown in FIGS. 35 and 38.

Figure 35:
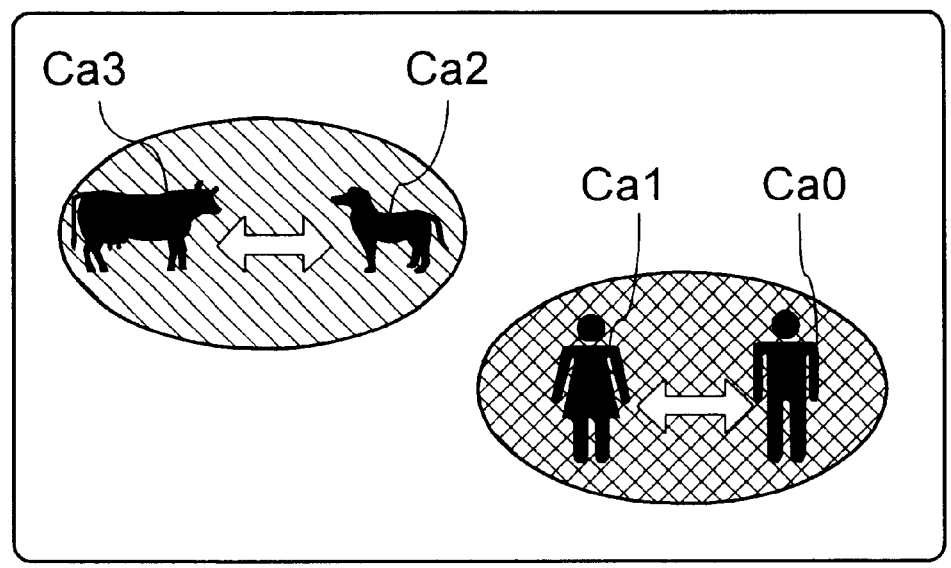
FIG. 35 is a diagram illustrating an application example.

FIG. 35 shows an example of the application in which characters in predetermined areas communicate with each other. In this example, the coordinate range of a communication area and a communication channel are registered in advance and, when the coordinates of the character match the condition of the coordinate range, the multiuser communication initiation command is transmitted over the communication channel set in the range. In the example shown in FIG. 35, communications are initiated between characters Ca0 and Ca1 and between characters Ca2 and Ca3.

Figure 36:
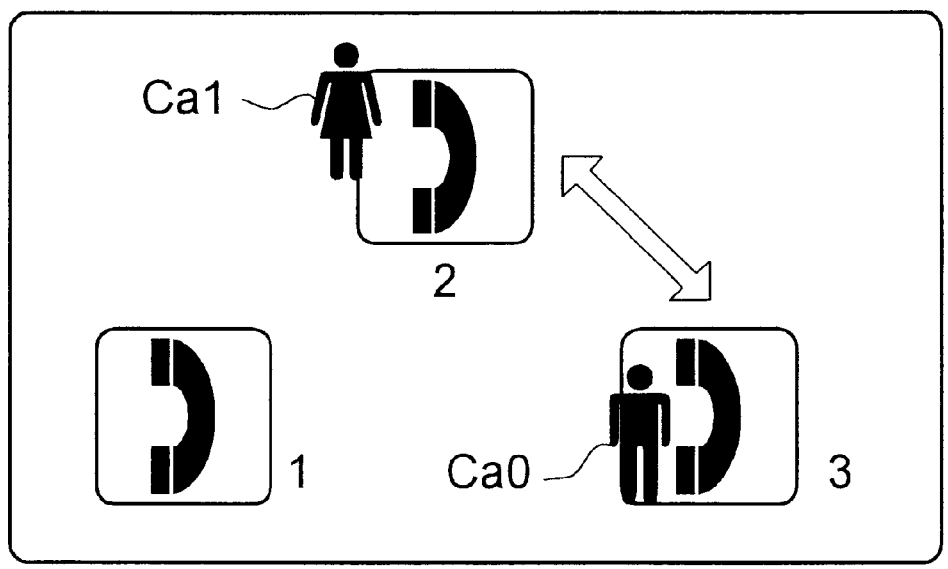
FIG. 36 is a diagram illustrating an application example.

Further, FIG. 36 shows an example of the application in which a predetermined point (area or grid) is set to be a communicatable point. On the game, each point is displayed as a telephone booth, and the connection number allocated to each point is also displayed. When the coordinates of a character match the coordinates of a communicatable point, the line number of the character is allowed to request a connection to other communicatable point. More specifically, in the example shown in FIG. 36, communicatable points to which the connection numbers 1, 2 and 3 are allocated are displayed on the screen. The coordinates corresponding to these points are registered in a database in advance, and the coordinates of the character Ca0 match the coordinates of the point with the connection number 3 while the coordinates of the character Ca1 match the coordinates of the point with the connection number 2. In this case, the character Ca0 is allowed to request a connection to the connection number 2. When the key "2" out of the ten keys of the telephone terminal of the game participant to whom the character Ca0 has been allocated is pressed, multiuser communication is initiated between this telephone terminal and the telephone terminal of the game participant to whom the character Ca1 has been allocated.

Figure 37:
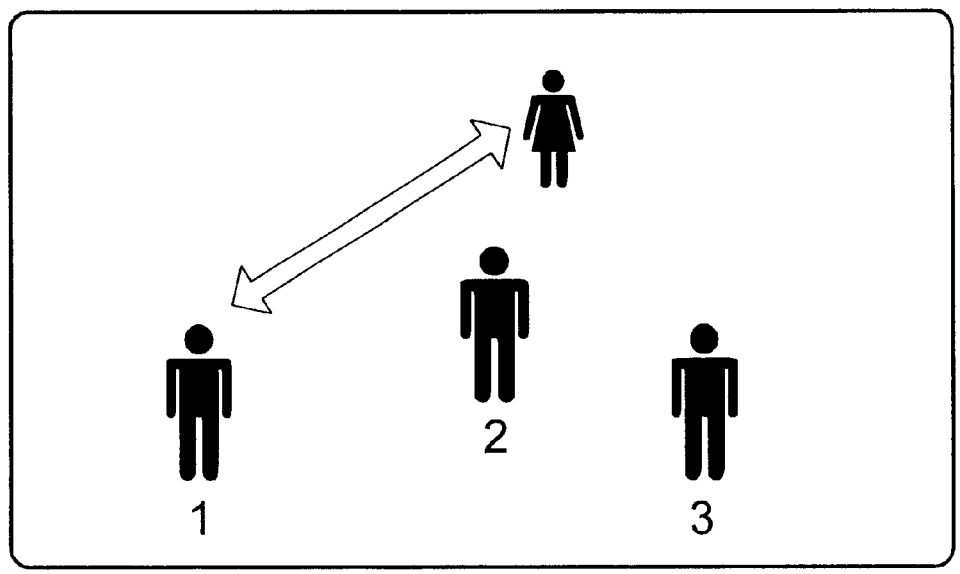
FIG. 37 is a diagram illustrating an application example.

FIG. 37 shows an example of the application in which a game participant to whom a particular character has been allocated is allowed to select which other game participant to communicate with. Selectable characters are displayed on the screen together with connection numbers thereof and, when a game participant to whom a character having a right to make a selection has been allocated selects a desired connection number by the ten key of a telephone terminal, the game participant to whom the character with the selected number has been allocated initiates multiuser communication with this telephone terminal.

The determination of the character having a right to make a selection and the selectable characters can be varied according to the contents of the game.

While only one character having a right to make a decision corresponds to a plurality of selectable characters in the application example shown in FIG. 37, a plurality of characters having a right to make a selection correspond to a plurality of selectable characters in the application example shown in FIG. 38. In this example, all the game participants to whom the characters displayed on the screen have been allocated are provided with a right to make a decision and a connection number. Such applications shown in FIGS. 37 and 38 can be implemented by registering the correspondences between the line numbers to which the characters are allocated and the connection numbers.

Further, though illustration will be omitted, when the game is played against other game participant, for example, multiuser communication may be carried out between opponents.

Alternatively, the actions of the characters may be controlled by the application such that the positions of the characters are fixed for a given period of time after the initiation of the multiuser communication. In this case, the game server 208 transmits, for example, a PB signal input prohibition command to the game server 208.

While, in the above description, a user can participate in the game when he makes a request for connection, the game server 208 may also make the request for connection. For example, the caller numbers of users who can participate in the game are registered in a database in advance, users who wish to participate in the game are selected under a predetermined condition, and the game server 208 requests a connection to the users.

Figure 39:
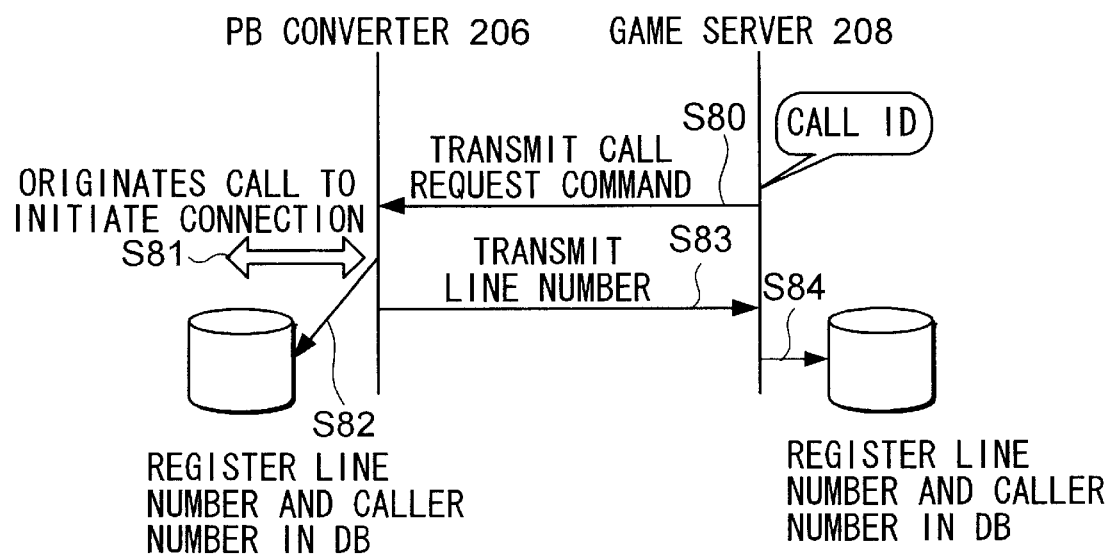
FIG. 39 is a diagram illustrating the sequence of making a call request from the game server.

In such a case, as shown in FIG. 39, the game server 208 transmits a call request command representing a call ID to the PB converter 206 (S80), and the PB converter 206 originates a call to a user to initiate a connection therebetween (S81), registers the correspondence between the line number and the caller number in the database (S82) and transmits the line number to the game server 208 (S83).

The game server 208 associates the received line number with the caller number and registers the numbers in the database (S84).

Following the above procedures, the game server 208 can select a user to be connected, and the variations of the application can be further increased.

[8] Effect of the First Embodiment

As described above, according to the first embodiment of the present invention, since telephone terminals (such as stationary telephones, mobile telephones and PHS) are used as control terminals, everybody can participate in the game with ease and audio communication can be carried out between players.

Further, since the large-screen display can be placed anywhere, a game can be played at a variety of places.

[B] Second Embodiment

In the second embodiment of the present invention, a network information system will be described by taking a real-time network data accumulation system that accumulates data such as questionnaires in real time as an example.

[1] Constitution of Network Accumulation Server

Figure 26:
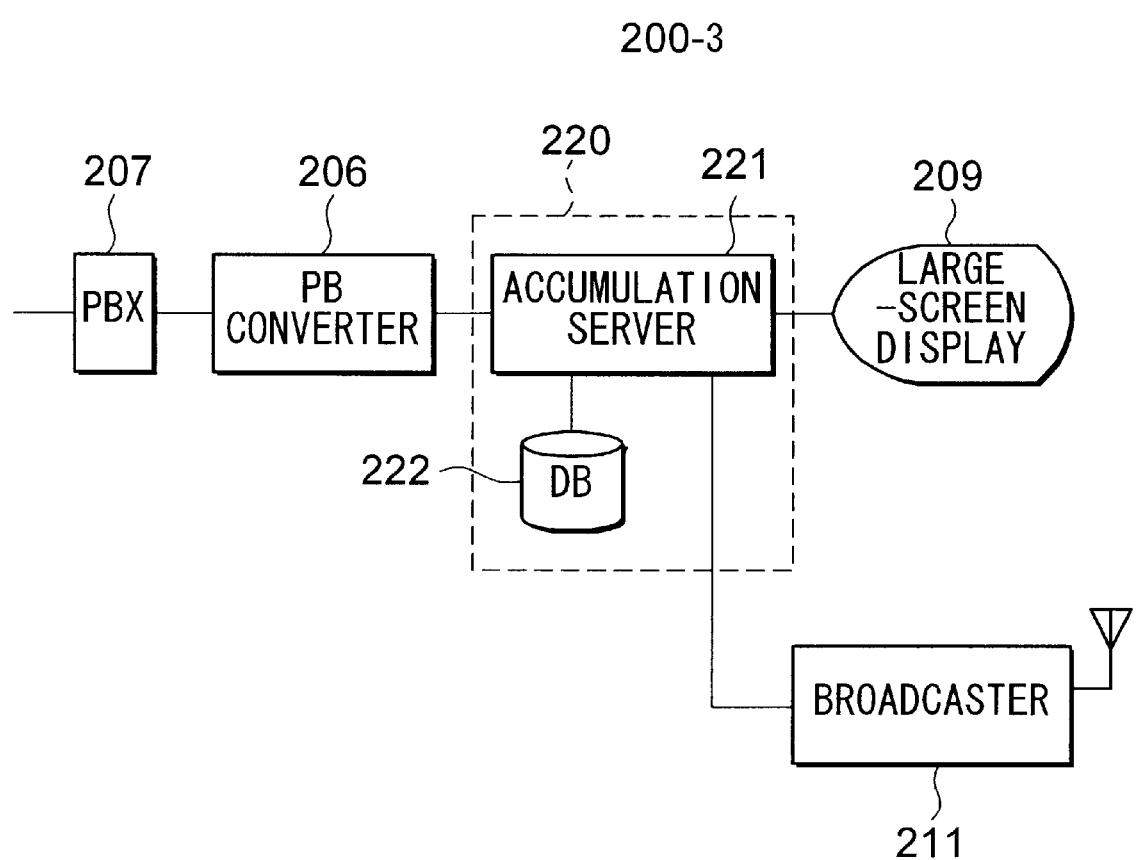
FIG. 26 is a general block diagram of the second embodiment.

The general constitution of the peripheral devices of a network accumulation server in a real-time network data accumulation system is shown in FIG. 26. In FIG. 26, the same components as found in the first embodiment of FIG. 1 are represented by the same numbers.

A description will be given with reference to FIG. 1 as well as FIG. 26 hereinafter.

A network accumulation server 200-3 comprises a PB converter 206 that converts the PB signal inputted from a public line network 300 into control data, a private branch exchange (PBX) 207 that connects the stationary telephone terminal 301, portable telephone terminal 302 or portable telephone terminal 303 connected via the public line network 300 to the PB converter 206, an accumulation server 221 that actually executes a data accumulation application program, a database (DB) management device 222 that stores data such as a variety of questions required for data accumulation or accumulation results, a large-screen display 209 that displays questions or accumulation results on the basis of the image signals outputted from the accumulation server 221, and a broadcaster 211 that converts the image signals and audio signals outputted from the accumulation server 208 into broadcast radio waves and transmits the broadcast radio waves to a household television 305 via a broadcast antenna 210.

The accumulation server 221 and the database management device 222 constitute an accumulation server system 220.

[2] General Operation of Second Embodiment

Next, a description will be given to the general operation of the second embodiment.

The accumulation server 221 executes a data accumulation application program, reads data such as a variety of questions required for data accumulation from the database management device 222, and outputs the image signals corresponding to the data to the large-screen display 209 and the broadcaster 211.

Thereafter, the large-screen display 209 displays the questions on the screen on the basis of the image signals outputted from the accumulation server 221.

Further, the broadcaster 211 converts the image signals and audio signals outputted from the accumulation server 208 into broadcast radio waves and transmits the broadcast radio waves to the household television 305 via the broadcast antenna 210.

Thereafter, when a researchee originates a call to the second network accumulation server 200-3 via the public line network 300 by using any of the stationary telephone terminal 301, the portable telephone terminal 302 or the portable telephone terminal 303, the PB converter 206 performs the start-up sequence, transmits the number of the connected line and the caller number (or caller identification number corresponding to the caller number) used as the identifier for the telephone terminal to the accumulation server 220 to notify the accumulation server 220 of the numbers, and registers the line number and the caller number (or caller identification number corresponding to the caller number) in a database, which is not shown, after associating them with each other.

Meanwhile, after associating the line number and the caller number (or caller identification number corresponding to the caller number) with each other and registering them in the database not shown, the accumulation server 208 transmits PB-signal-input permission, which permits the telephone terminal corresponding to the registered line number (or caller number or caller identification number corresponding to the caller number) to input a PB signal, to the PB converter 206, which in turn returns a PB-signal-input-permitted notification in response to the PB-signal-input permission, whereby the start-up sequence is completed. Thereafter, the PB converter 206 is ready for receiving the PB signal from the telephone terminal which has originated the call.

Then, when the researchee operates the keypad of the telephone terminal as indicated on the question-displaying screen, the PB signals corresponding to the operations of the keypad are inputted into the PB converter 206.

Then, the PB converter 206 converts the inputted PB signals into accumulation data (binary data) for the accumulation server 221 and outputs the data together with the line number corresponding to the telephone terminal 302 which has inputted the PB signals to the accumulation server 221.

More specifically, when the portable telephone terminal 302 originates a call to the PB converter 206 via the public line network 300, the PB converter 206 not only allocates any one of computer telephony cards 28-1 to 28-n to the call but also outputs the call together with the line number corresponding to the allocated computer telephony card 28-x (x: 1 to n) to the accumulation server 220 via a data communication card 26.

Then, the MPU 20 of the PB converter 206 generates accumulation data (binary data) for the accumulation server 221 on the basis of the control program stored in a ROM 21 and outputs the data to the accumulation server 221 via the data communication card 26 as described above.

The accumulation server 221 conducts accumulation on the basis of the inputted accumulation data (binary data) and, as required, displays the result of the accumulation on the accumulation-result screen corresponding to the line number.

More specifically, the MPU of the accumulation server 221 operates on the basis of the control program stored in the ROM and stores the accumulation data (binary data) inputted from the PB converter 206 in a RAM temporarily.

Then, the MPU conducts accumulation on the basis of the inputted accumulation data (binary data) and then outputs the result of the accumulation to the large-screen display 209 or to the broadcaster or stores the result of the accumulation as accumulation result data in the database management device 222.

If the number of researchees is not limited in the PB converter 206, the above system can be used to implement an accumulation system for any number of researchees, while when the number of researchees registered in advance is limited in the PB converter 206, the above system can be used to implement an accumulation system only for particular researchees.

[3] Effect of the Second Embodiment

According to the second embodiment of the present invention, data can be accumulated in real time, and a system can be implemented with ease, at low costs and with flexibility even when a number of researchees are required.

[C] Third Embodiment

In the third embodiment of the present invention, a network information system will be described by taking a broadcast contents distribution system as an example.

[1] General Constitution of Broadcast Contents Distribution System

Figure 27:
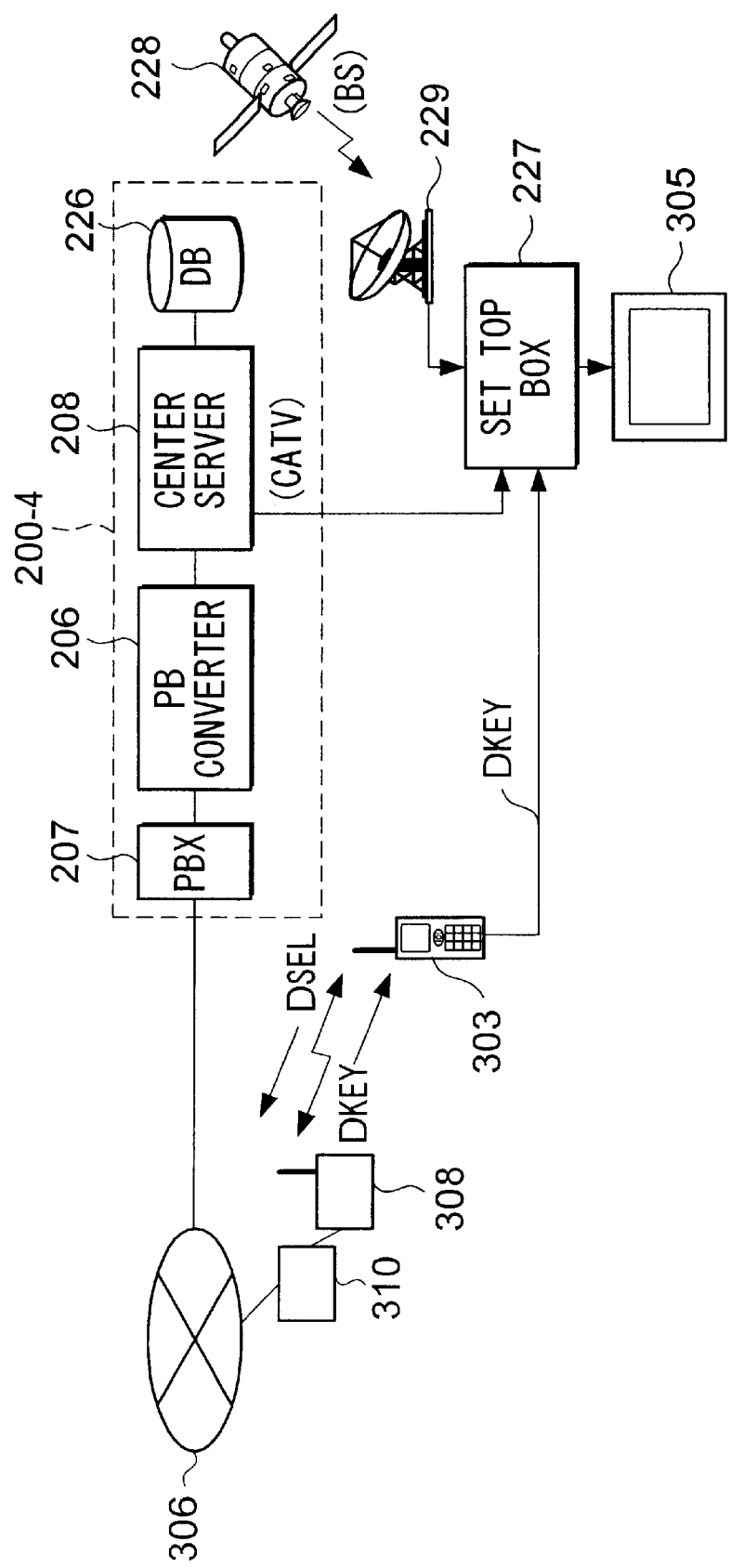
FIG. 27 is a general block diagram of the third embodiment.

The general constitution of the broadcast contents distribution system is shown in FIG. 27. In FIG. 27, the same components as found in the first embodiment of FIG. 1 are represented by the same numbers.

The broadcast contents distribution system comprises a center server 200-4 that distributes contents and a public line network 300 that connects a portable telephone terminal 303 to the server 200-4 via a communication line.

The center server 200-4 comprises a PB converter 206 that converts the PB signals (including selection data DSEL to be described later) inputted from the public line network 300 into control data and transmits descrambling data DKEY which is provided by a center server 225 to be described later to a telephone terminal, a private branch exchange (PBX) 207 that connects the stationary telephone terminal 301, portable telephone terminal 302 or portable telephone terminal 303 connected via the public line network 300 to the PB converter 206, the center server 225 that conducts broadcast contents distribution through the use of a cable television system (CATV) or satellite broadcasting (BS broadcasting), a database management device 226 that stores a variety of contents, and a set top box 227 that descrambles the scrambled picture signals (=contents) distributed from the center server 225 by the cable television system (CATV) or by the satellite broadcasting (BS broadcasting) from a broadcasting satellite 228 via a parabolic antenna 229, on the basis of the descrambling data DKEY provided from the telephone terminal and outputs the descrambled picture signals to the television 305 as normal picture signals.

The public line network 300 comprises a wireless public line network 306, wireless base station 308 and a control station 310.

[2] General Operation of Third Embodiment

Next, a description will be given to the general operation of the third embodiment.

In this case, it is assumed that the center server 200-4 distributes a variety of scrambled broadcast (only downlink) contents via a cable television system or satellite broadcasting and a user intends to view a certain content out of the contents.

Further, it is also assumed that the user knows how to select the content he intends to view by certain means (such as program schedule).

When the portable telephone terminal 303 originates a call to the center server 200-4 via the public line network 300, the PB converter 206 performs the start-up sequence, transmits the number of the connected line and the caller number (or caller identification number corresponding to the caller number) used as the identifier for the telephone terminal, and registers the line number and the caller number (or caller identification number corresponding to the caller number) in a database (DB) after associating them with each other.

Meanwhile, the center server 225 associates the line number with the caller number (or caller identification number corresponding to the caller number) and registers them in a database while constantly distributing broadcast contents by using the cable television system (CATV) or the satellite broadcasting (BS broadcasting).

Thereafter, the game server 208 transmits PB-signal-input permission, which permits the telephone terminal corresponding to the registered line number (or caller number or caller identification number corresponding to the caller number) to input a PB signal, to the PB converter 206, which in turn returns a PB-signal-input-permitted notification in response to the PB-signal-input permission, whereby the start-up sequence is completed. Thereafter, the PB converter 206 is ready for accepting the input of the PB signal from the telephone-terminal which has originated a call.

Along with this, when the user operates the keypad of the portable telephone terminal 303 to select the content he intends to view, a PB signal as the selection data DSEL is inputted from the portable telephone terminal 303 to the PB converter 206 via the wireless base station 308, the control station 310, the wireless public line network 306 and the PBX 207.

Then, the PB converter converts the PB signal as the inputted selection data DSEL into control data (binary data) that can be recognized by the game server 208 and outputs the control data together with the line number corresponding to the portable telephone terminal 302 that has inputted the PB signal to the game server 208.

The center server 225 transmits the descrambling data DKEY corresponding to the control data (binary data) as the inputted selection data DSEL to the portable telephone terminal 303 via the PB converter, the PBX 207, the wireless public line network 306, the control station 310 and the wireless base station 308.

Thereafter, when the portable telephone terminal 303 transmits the descrambling data DKEY to the set top box 227 via a cable or wireless communication using infrared radiation or the like, the set top box 227 descrambles the scrambled picture signals (=contents) distributed from the center server 225 via the cable television system (CATV) or via the satellite broadcasting (BS broadcasting) and the parabolic antenna 229, on the basis of the descrambling data DKEY provided from the telephone terminal and outputs the descrambled picture signals to the television 305 as normal picture signals.

As a result, the content image desired by the user, which corresponds to the selection data DSEL, is displayed on the television 305.

[3] Effect of the Third Embodiment

According to the third embodiment of the present invention, the set top box may not have a communication mechanism to connect to the center server 225. Therefore, the constitution of the device can be simplified and the installation can also be facilitated to a great extent.

Further, since the descrambling data is obtained via a telephone terminal, the charge for the data can be made at the time of billing regular telephone calls, and the set top box needs not to manage the billing information.

[D] Modified Examples of the First to Third Embodiments

Although it has so far been described that the PB converter is connected to the game server, the accumulation server or the center server, the PB converter can also be applied to any server that provides information interactively.

[4] The Fourth Embodiment

While the above first to third embodiments have been described by taking a network game system using a DTMF signal as an example, the fourth embodiment of the present invention is a network game system using a packet signal.

[1] General Constitution of Network Game System

Figure 40:
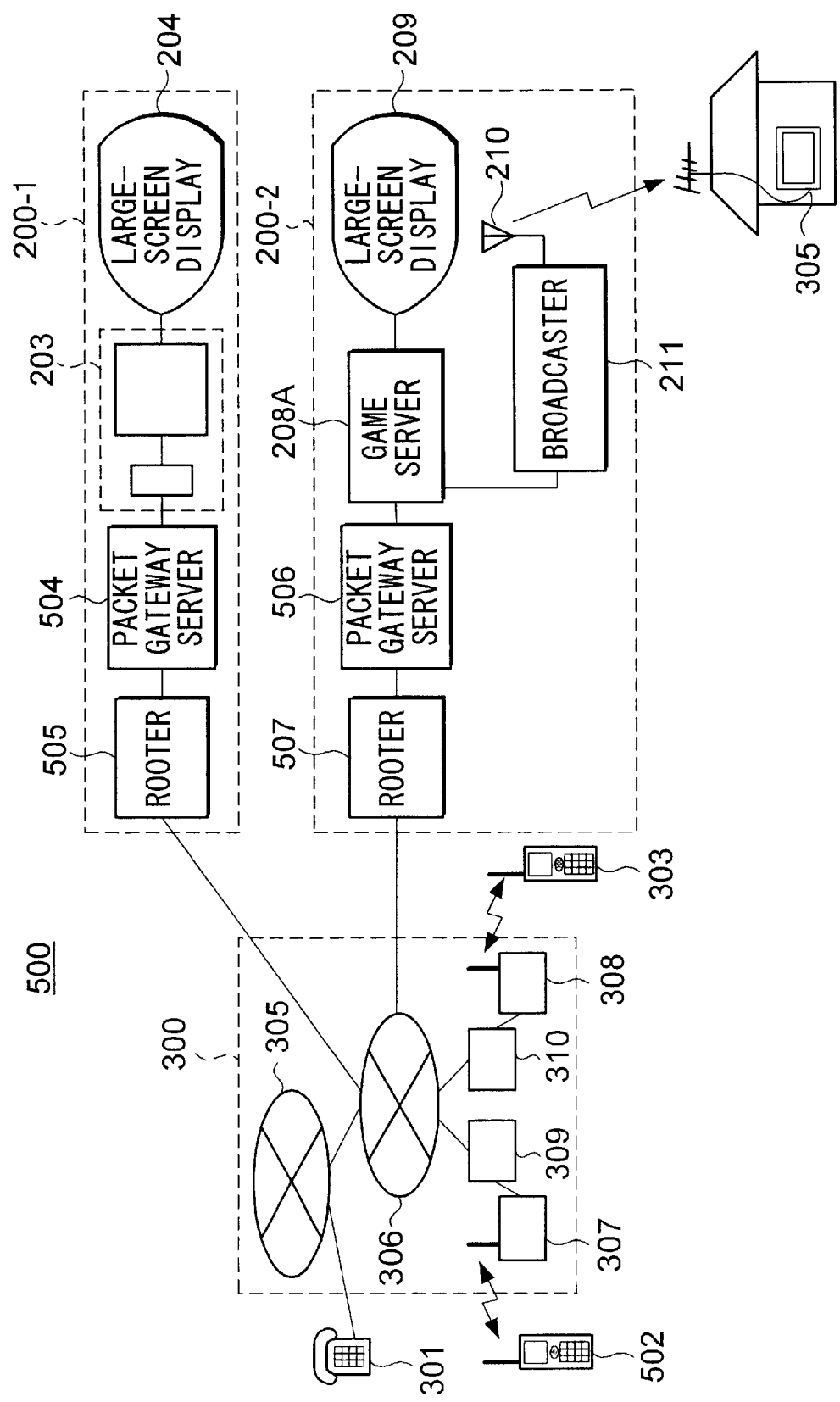
FIG. 40 is a general block diagram of the network game system of the fourth embodiment.

The general constitution of the network game system is shown in FIG. 40. In FIG. 40, the same components as found in the network game system of FIG. 1 are represented by the same numbers.

A network game system 500 roughly comprises a first network game server 200-1, a second network game server 200-2, and a public line network 300 that connects a stationary telephone terminal 301 or a portable telephone terminal 502 or portable telephone terminal 503 that can communicate by a packet-switching exchange system to the network game servers 200-1 and 200-2 via communication lines.

The first network game server 200-1 comprises a packet gateway server 201 that converts the operation data corresponding to the operation of the operating switch (operating button) of the portable telephone terminal 502 or portable telephone terminal 503 which is included in the packet signal inputted via the public line network 300 from the portable telephone terminal 502 or the portable telephone terminal 503 into control data, a rooter 505 that connects the portable telephone terminal 502 or portable telephone terminal 503 connected via the public line network 300 to a packet gateway server 504, a game server 203 that actually executes a game application program, and a large-screen display 204 that displays the game on the screen under the control of the game server 203.

The second network game server 200-2 comprises a packet gateway server 506 that converts the operation data corresponding to the operation of the operating switch (operating button) of the portable telephone terminal 502 or portable telephone terminal 503 which is included in the packet signal inputted via the public line network 300 into control data, a rooter 507 that connects the portable telephone terminal 502 or portable telephone terminal 503 connected via the public line network 300 to a packet gateway server 506, a game server 208A that actually executes a game application program, a large-screen display 209 that displays the game on the screen on the basis of the picture signal outputted from the game server 208A, and a broadcaster 211 that converts the picture signal and audio signal outputted from the game server 208A into airwaves and transmits the airwaves to a household television set 305 via a broadcast antenna 210.

The public line network 300 comprises a wire public line network 305, a wireless public line network 306, wireless base stations 307 and 308, and control stations 309 and 310.

In this case, the constitution of the game server 208A is the same as that of the game server 208 of FIG. 4.

[2] General Constitution of Packet Gateway Server

Since the packet gateway server 201 and the packet gateway server 206 have the same constitution, the general constitutions of the packet gateway servers will be described hereinafter by taking the packet gateway server 201 as an example.

[2.1] General Constitution of Packet Gateway Server 504

Figure 41:
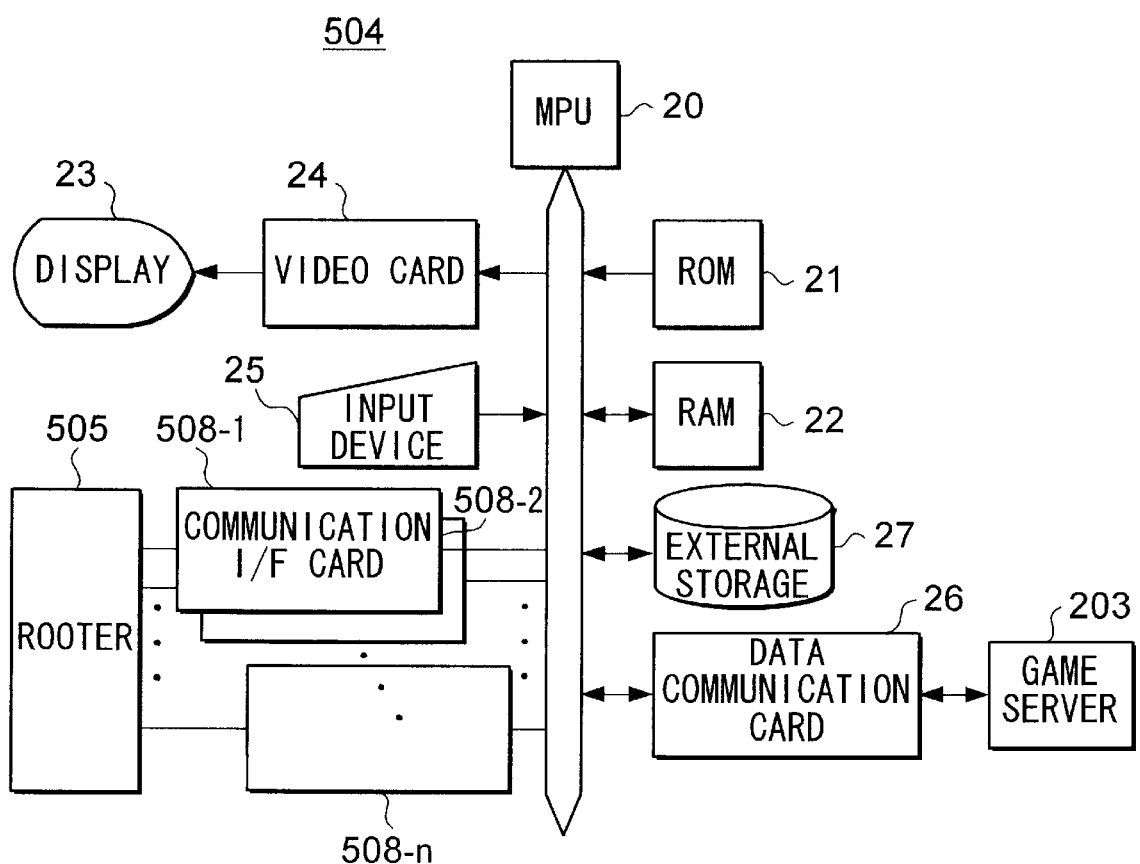
FIG. 41 is a general block diagram of a packet gateway server.

FIG. 41 is a block diagram showing the general constitution of the packet gateway server 504.

The packet gateway server 504 comprises an MPU (Micro Processor Unit) 20 that controls the whole packet gateway server 201, a ROM 21 in which a control program and control data are stored, a RAM 22 which stores a variety of data temporarily and is also used as a working area, a display 23 that displays a variety of information, a video card 24 that interfaces between the MPU 20 and the display 23, an input device 25 such as a keyboard with which an operator performs a variety of operations, a data communication card 26 that interfaces between the MPU 20 and the game server 203, an external storage 27 such as a hard disk that stores large amounts of various data, a plurality of communication interface (communication I/F)-cards 508-1 to 508-n that interface between the MPU 20 and the rooter 505, and buses 29 which interconnect the MPU 20, the ROM 21, the RAM 22, the display 23, the video card 24, the input device 25, the data communication card 26, the external storage 27 and the communication interface cards 508-1 to 508-n with one another.

The above communication interface cards comply with a telecommunication terminal equipment qualification standard and, when a communication interface card having the above function and complying with the qualification standard is used, the present embodiment of the present invention can be accomplished. Therefore, a further description to each function will be omitted.

[4] Constitutions of Functions of Packet Gateway Servers and Game Servers

Next, the constitutions of the functions of the packet gateway servers and the game servers will be described by taking the PB packet gateway server 506 and the game server 208A as examples.

Figure 42B:
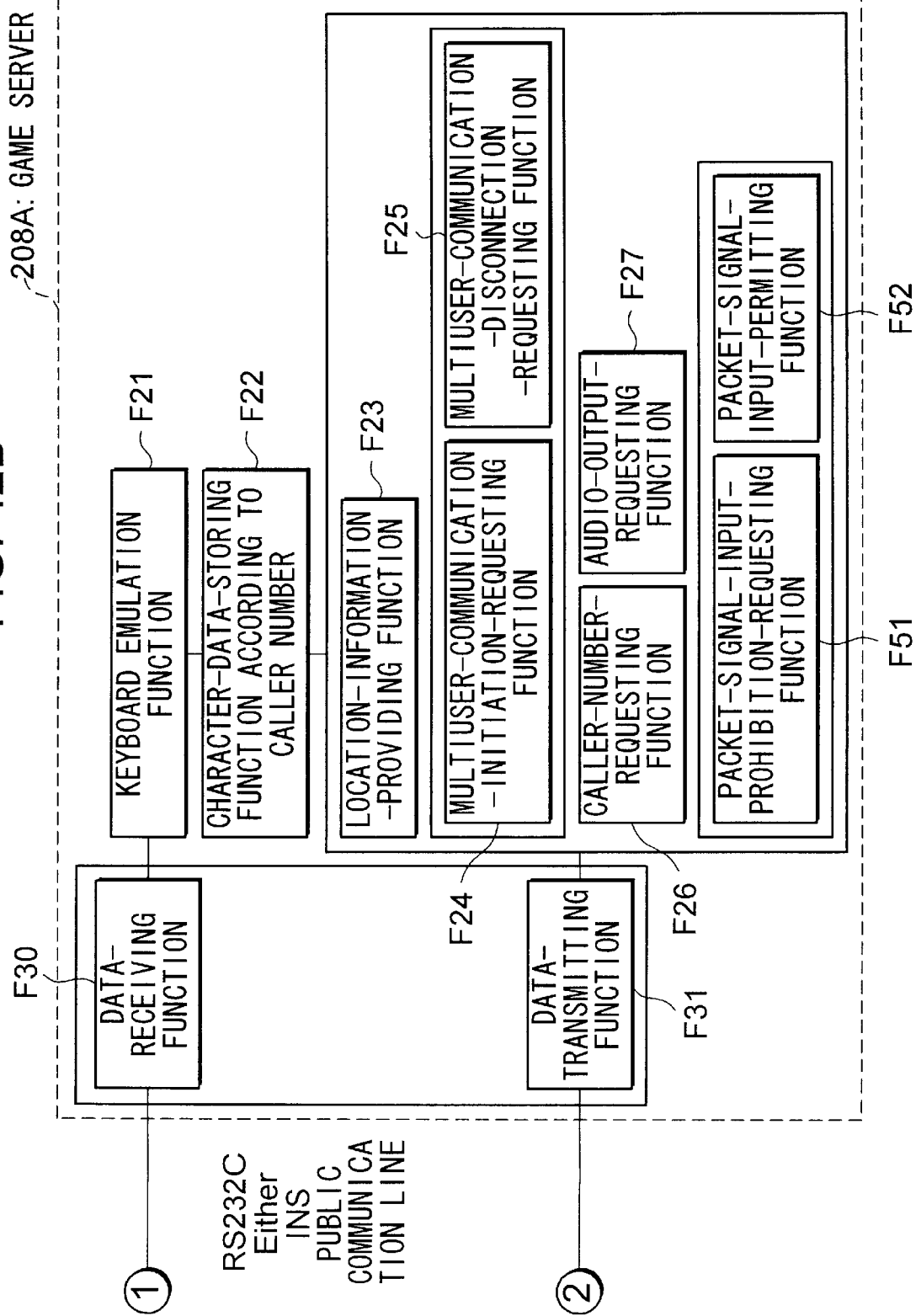

The block diagrams of the functions of the packet gateway server 506 and the game server 208A are shown in FIGS. 42A and 42B. In FIGS. 42A and 42B, the same components as shown in FIGS. 5A and 5B are represented by the same numbers, and detailed descriptions thereof will be omitted.

[4.1] Constitution of Functions of Packet Gateway Server 506

The packet gateway server 506 shown in FIGS. 42A and 42B is different from the PB converter shown in FIGS. 5A and 5B in that the packet gateway server 506 has a control-data-converting function F41 in place of the PB-signal-converting function F1, a packet-signal-input-prohibiting function F42 in place of the PB-signal-input-prohibiting function F2, a caller-number-specific-history-retaining function F43 in place of the caller-number-specific-PB-history-retaining function F8, a caller-number-notifying function F44 in place of the caller-number-notifying function F10, and caller-number-retaining function F45 in place of the caller-number-retaining function F11.

[4.1.1] Control-data-converting Function

The control-data-converting function F41 of the packet gateway server 506 is a function that converts the operation data contained in the packet signal received from the network via the rooter 507 into a predetermined control code.

This predetermined code can be any code according to the specification of the system.

[4.1.2] Packet-signal-input-prohibiting Function

Further, the packet-signal-input-prohibiting function F42 of the packet gateway server 506 is a function that prohibits the transmission of the data corresponding to the packet signal (DTMF) received from a specific stationary or portable telephone terminal to the game server 208.

This packet-signal-input-prohibiting function F42 is used to perform "time-division processing" in place of "real-time processing" which accepts all the inputs from a number of users connected to the game server 208 via stationary telephone terminals and portable telephone terminals in real time. That is, for example, this function makes it possible to receive and process the inputs of PB signals corresponding to 10 users in a certain time slot and those corresponding to other 10 users in the next time slot. Thus, the load on the game server 208 can be reduced.

[4.1.3] Caller-number-specific-history-retaining Function

The caller-number-specific-history-retaining function F43 of the packet gateway server 506 is a function that retains the history (indicating which PB signals were inputted) of received packet signals for each caller number.

By this function, an UNDO function (function to restore the pre-operation state) can be performed, the performance of the player who has marked the high score can be replayed and a data analysis can be performed on the basis of the histories of a plurality of players.

[4.1.4] Caller-number-notifying Function

The caller-number-notifying function F44 of the packet gateway server 506 is a function that pairs a caller number (or a caller identification number corresponding to the caller number) for specifying a portable telephone terminal with a communication line number for specifying any one of the single-line communication interface cards 508-1 to 508-n and notifies the game server 208A of the numbers.

Further, in the case of a multi-line communication interface card, a communication line number is allocated to each communication port of the communication interface cards 508-1 to 508-n to notify the game server 208 of the above numbers. Further, when a plurality of communication interface cards are implemented, a communication line number is allocated to each communication port.

In this case, the communication line numbers are preferably serial numbers from the viewpoint of management.

By the notification, the game server 208A and the packet gateway server 506 can exchange data not by directly exchanging the redundant caller number but by associating the communication line number with the caller number.

[4.1.5] Caller-number-retaining Function

The caller-number-retaining function F45 of the packet gateway server 506 is a function that retains the correspondence between the caller number (or caller identification number corresponding to the caller number) and the communication line number which have been notified by the above caller-number-notifying function.

By retaining the correspondence, the packet gateway server 506 can exchange data with the game server 208 not by directly exchanging the redundant caller number but by being notified of the CTI line number associated with the caller number.

[4.2] Constitution of Functions of Game Server 208A

The game server 208A shown in FIGS. 42A and 42B is different from the game server 208 shown in FIGS. 5A and 5B in that the game server 208A has a packet-signal-input-prohibiting function F51 in place of the PB-signal-input-prohibiting function F28 and a packet-signal-input-permitting function F52 in place of the PB-signal-input-permitting function F29.

[4.2.1] Packet-signal-input-prohibition-requesting Function

The game server 208A has a packet-signal-inputprohibition-requesting function F51 that controls a communication traffic by permitting only particular players out of a plurality of players (game participants) to key in via a keypad.

[4.2.2] Packet-signal-input-permitting Function

The game server 208A has a packet-signal-input-permitting function F52 that permits a player who has been prohibited from inputting a packet signal when the above-described packet-signal-input-prohibition-requesting function F51 is active or a newly participating player who is ready for using the network game system to input the packet signal.

[5] Operation of the Fourth Embodiment

[5.1] General Operation of the Fourth Embodiment

Next, a description will be given to the general operation of the fourth embodiment. Since the first network game server 200-1 and the second network game server 200-2 operate basically in the same manner, the second network game server 200-2 will be mainly described hereinafter.

When either the portable telephone terminal 302 or the portable telephone terminal 303 originates a call to the second network game server via the public line network 300, the packet gateway server 206 performs the start-up sequence, transmits the number of the connected line and the caller number (or caller identification number corresponding to the caller number) used as the identifier of the telephone terminal to the game server 208 to notify the game server 208 of the numbers, and registers the line number and the caller number (or caller identification number corresponding to the caller number) in a database (DB) after associating them with each other.

Meanwhile, after registering the line number and caller number (or caller identification number corresponding to the caller number) associated with each other in the database, the game server 208 transmits packet-signal-input permission, which permits the telephone terminal corresponding to the registered line number (or caller identification number corresponding to the caller number) to input a packet signal, to the packet gateway server 206, which in turn returns a packet-signal-input-permitted notification in response to the packet-signal-input permission, whereby the start-up sequence is completed. Thereafter, the packet gateway server 208 is ready for accepting the input of the packet signal from the telephone terminal which has originated the call.

Along with this, the character (game character) corresponding to a player who is the user of the portable telephone terminal ready for accepting the input of the packet signal is displayed on the screen of the large-screen display 209 or the television 305.

Thereafter, when the player operates the input device (such as a keypad) of a portable telephone terminal, for example, the portable telephone terminal 302, the packet signal corresponding to the operation is inputted to the packet gateway server 206.

A description will be given to the operation of the portable telephone terminal 302 at the time of generating a packet signal with reference to FIGS. 43 to 46.

Figure 43:
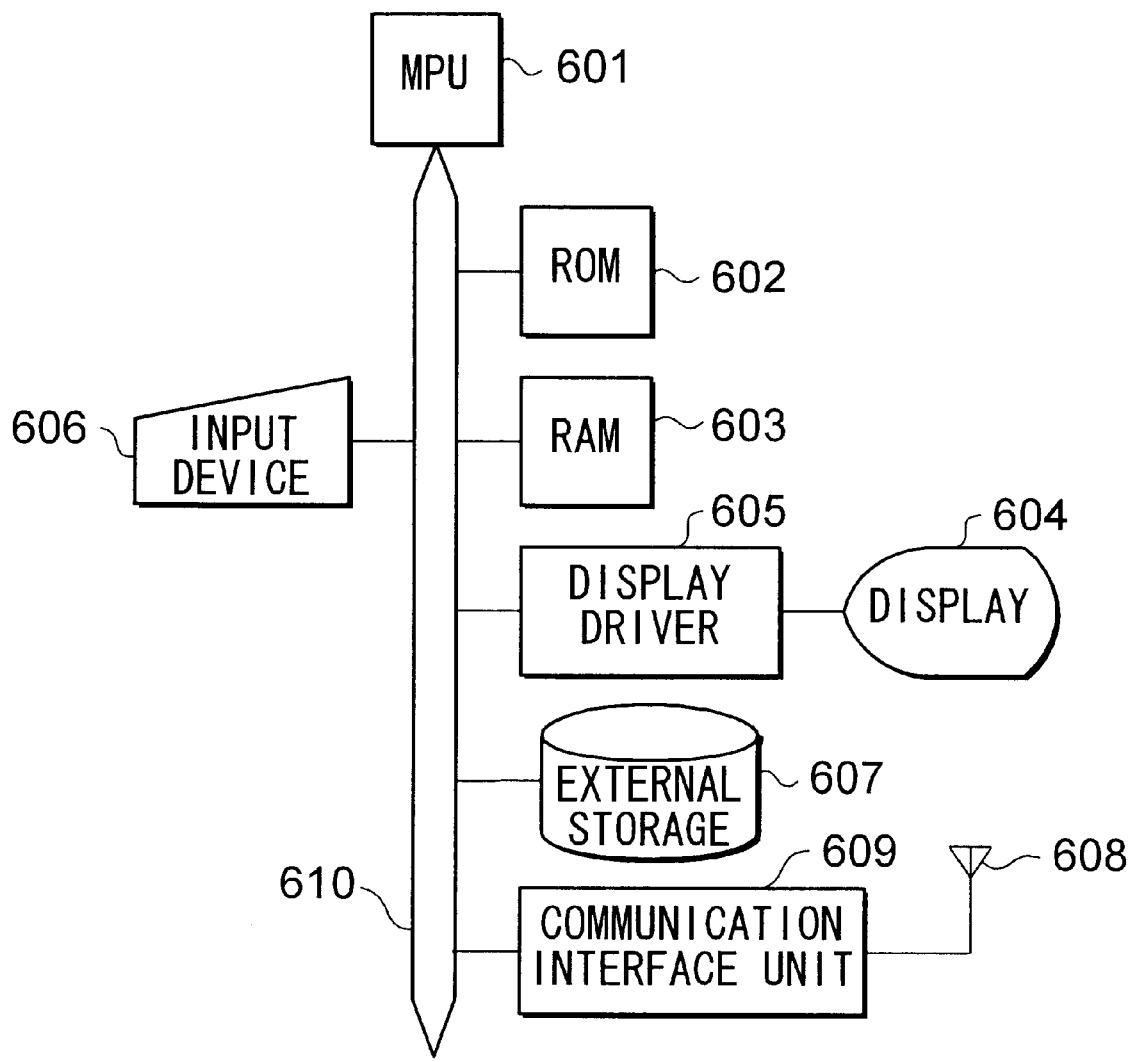
FIG. 43 is a general block diagram of the telephone terminal.

First, a block diagram of the general constitution of the portable telephone terminal 302 is shown in FIG. 43.

The portable telephone terminal 302 comprises an MPU (Micro Processor Unit) 601 that controls the whole portable telephone terminal 302, a ROM 602 in which a control program and control data are stored, a RAM 603 that stores a variety of data temporarily and is also used as a working area, a display driver 605 that controls a display 604 under the control of the MPU 601, an input device 606 having operating switches such as key buttons with which the user performs a variety of operations, an external storage 607 such as an IC memory card that stores a variety of data in a non-volatile manner, a communication interface unit 609 that is capable of carrying out packet communications including audio communication via an antenna 608, and buses 610 that interconnect the MPU 601, the ROM 602, the RAM 603, the display driver 605, the input device 606, the external storage 607 and the communication interface unit 609 with one another.

Figure 44:
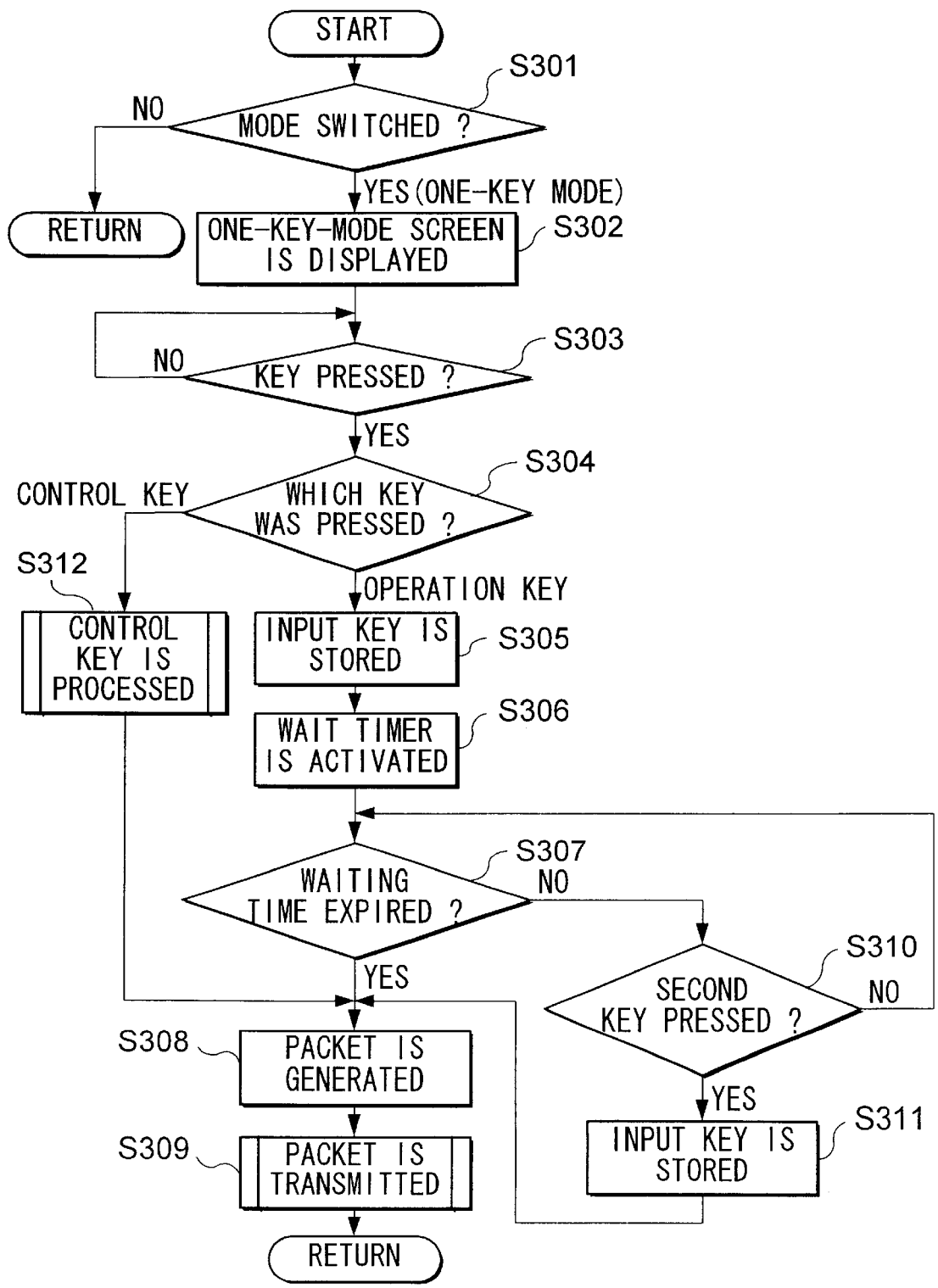
FIG. 44 is a flowchart of the process of the fourth embodiment.

Next, the operation of the portable telephone terminal 302 will be described with reference to the flowchart of processes thereof shown in FIG. 44.

In the fourth embodiment of the present invention, there is provided a "one-key mode" in which a packet signal is automatically generated and transmitted basically by operating one key on the input device 606. Further, in this one-key mode, when the second key is pressed down within a predetermined period of time (300 [msec] in the present embodiment) after the first key is pressed down, a single packet signal is generated from the packet signals corresponding to the two key operations including the second key operation, thereby accomplishing an improvement in operability and a high-speed input operation.

Firstly, the MPU 601 determines whether the operation mode has been switched to the one-key mode by the operation of the input device 606 (step S301).

When it has been determined in the step S301 that the operation mode has not been switched to the one-key mode ("No" in the step S301), a normal process routine, which is not shown, is resumed.

Figure 45:
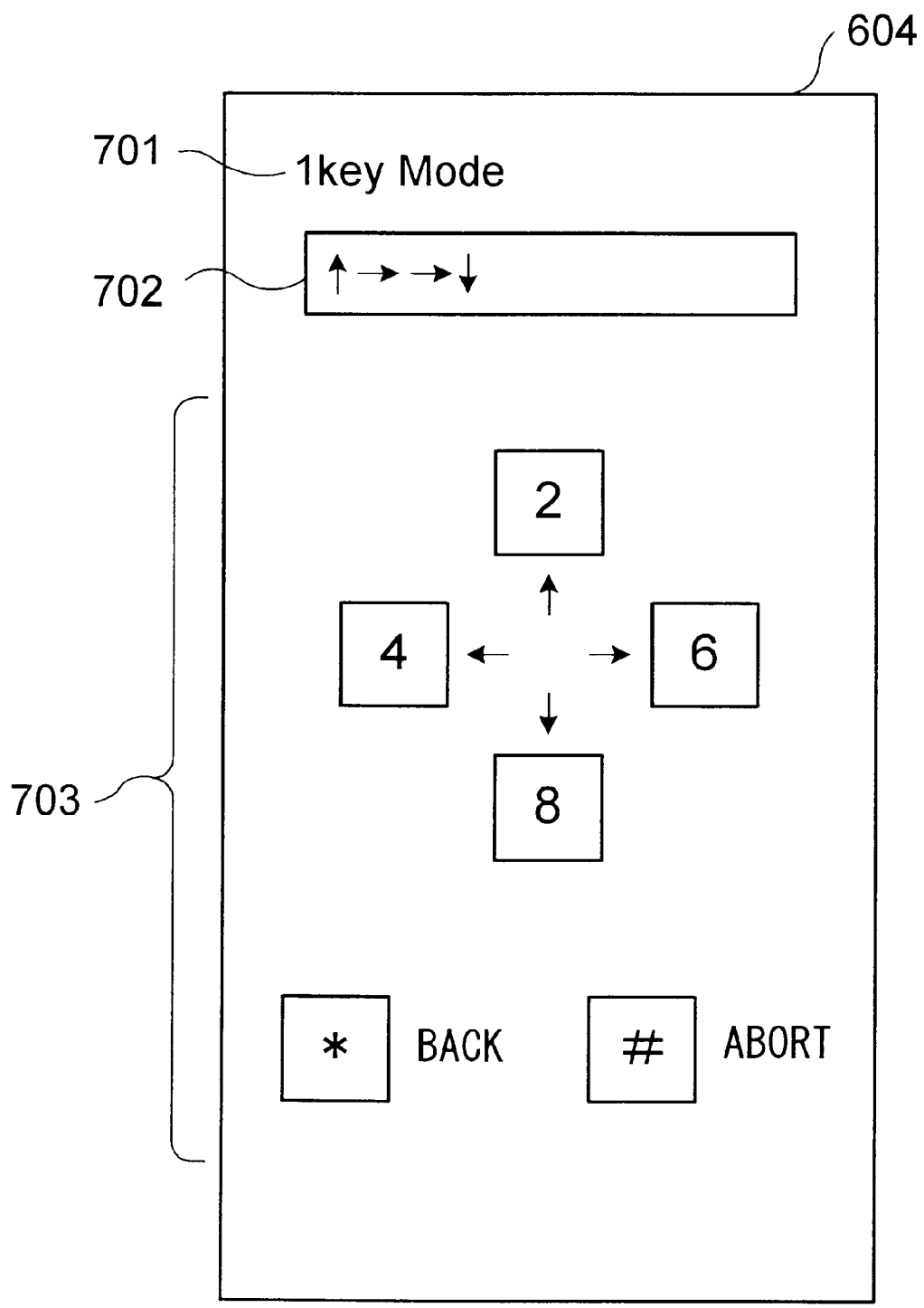
FIG. 45 is a diagram illustrating an example of the display screen of the telephone terminal of the fourth embodiment.

When it has been determined in the step S301 that the operation mode has been switched to the one-key mode ("Yes" in the step S301), a one-key-mode screen as shown in FIG. 45 is displayed on the display 604 (step S302).

As shown in FIG. 45, the one-key-mode screen comprises, for example, a mode display area 701 which displays that the current operation mode is the one-key mode, an operation history display area that displays a history of operations and an operating procedure display area 703 that provides guidance on an operating procedure.

Next, it is determined whether a key has been pressed down or not (step S303). When no key has been pressed down ("No" in the step 303), the terminal 302 will remain on standby as it is.

When it has been determined in the step S303 that a key has been pressed down ("Yes" in the step 303), it is then determined which key has been pressed down (step S304).

When it has been determined in the step S304 that the pressed key is an operation key on a numeric keypad such as "2", "4", "6" or "8", the key data corresponding to the pressed input key is stored (step S305).

Next, a wait timer (300 [msec] in the present embodiment) to wait for the second key input is activated (step S306). In this case, during the waiting time, any input within a predetermined time (for example, 200 [msec]) after the input of the first key is ignored so as not to misregard a single key operation as multiple key operations due to chattering at the time of key operation.

Next, it is determined whether the waiting time of the wait timer has expired or not (step S307). When the waiting time has not expired yet ("No" in the step S307), it is then determined whether the second key has been pressed down or not (step S310).

When a key has been pressed down after the predetermined time during which any key input is ignored after the first key operation and before the expiration of the waiting time of the wait timer (in the present embodiment, 100 [msec]), the key data corresponding to the pressed input key is stored (step S311). Then, the process proceeds to the step S308.

When it has been determined in the step S307 that the waiting time of the wait timer has expired, a packet data is generated on the basis of the stored key data (corresponding to one key or two keys) (step S308).

Next, a description will be given to the packet format of the generated packet data. The following description, however, will be presented for describing one example of the packet format, and the packet format in the present embodiment shall not be limited thereto.

Figure 46:
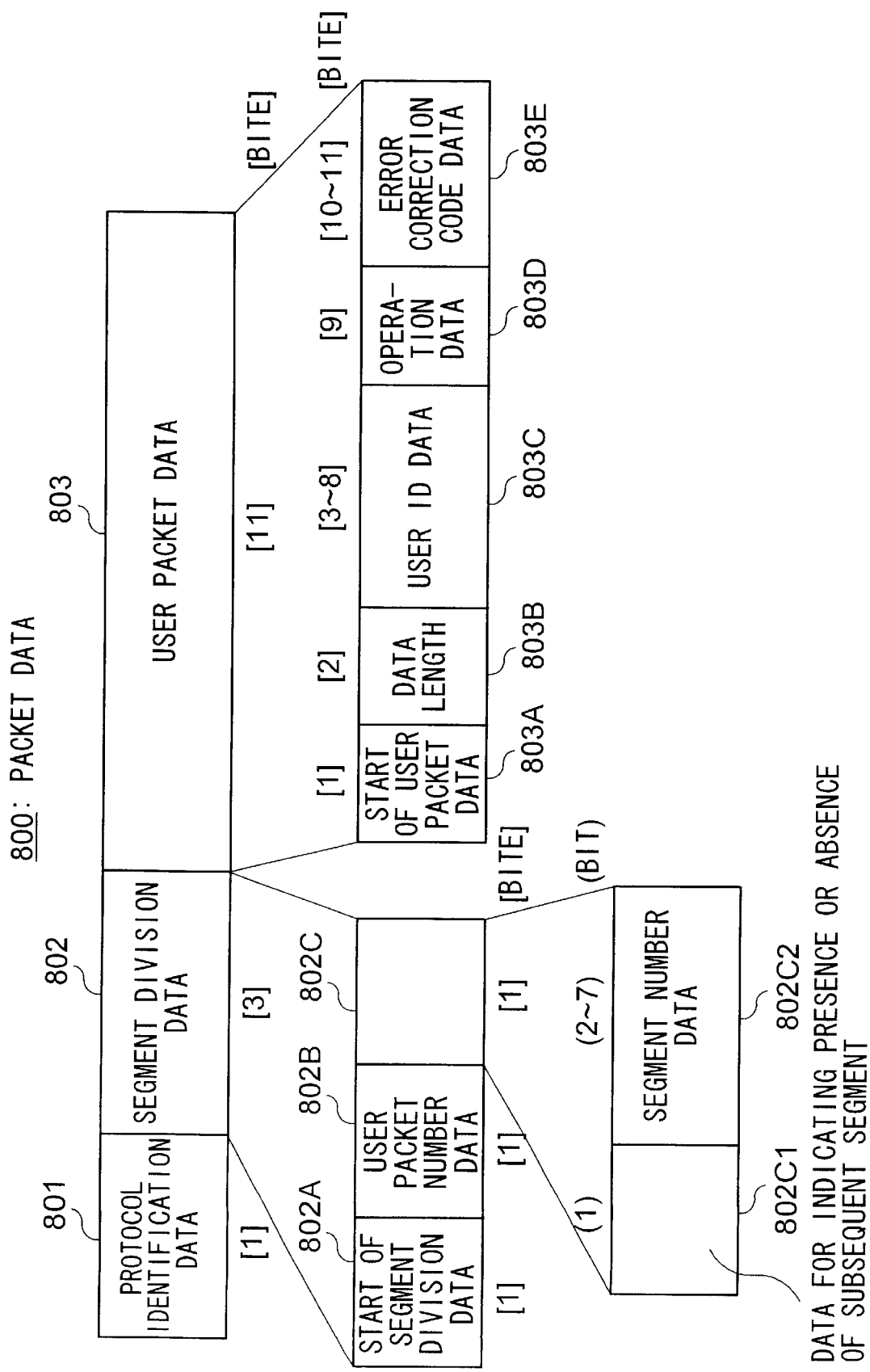
FIG. 46 is a diagram illustrating an example of the configuration of packet data.

As shown in FIG. 46, packet data 800 comprises protocol identification data 801 having an information length of 1 [byte], segment division data 802 having an information length of 3 [bytes] and storing segment division information, and user packet data 803 having an information length of 11 [bytes] and storing user information including operation information.

The protocol identification data 801 is fixed, for example, at a binary value of "00010000", which represents a game control protocol.

The data 802A in the first byte of the segment division data 802 represents the start of the segment division data and is fixed, for example, at a binary value of "00000010".

The data 802B in the second byte of the segment division data 802 is user packet number data and is provided with a binary value for identifying a user packet. This value is circulated and used.

The data 802C in the third byte of the segment division data 802 comprises one-bit data 802C1 for indicating whether another segment follows the segment corresponding to the user packet data 803 included in the packet data and seven-bit segment number data 802C2 for identifying each segment.

The data 803A in the first byte of the user packet data 803 represents the start of the user packet data and is fixed, for example, at a binary value of "100000100".

The data 803B in the second byte of the user packet data 803 represents the data length of the user packet data.

The data 803C in the third to eighth bytes of the user packet data 803 are user ID data for identifying a user and represent a caller number in nibbles. When the bytes are blank, a null code is inserted.

The data 803D in the ninth byte of the user packet data 803 is operation data corresponding to the stored key data.

The data 803E in the tenth and eleventh bytes of the user packet data 803 are error correction code data for correcting errors in the packet data 800.

After packet data is generated, the generated packet data is transmitted (step S309), whereby the process is completed.

Thus, the packet gateway server converts the inputted packet signal into control data (binary data) for controlling the game server 208 and outputs the control data together with the line number corresponding to the portable telephone terminal 302 from which the packet signal has been inputted to the game server 208.

More specifically, when the packet gateway server 206 is called by the portable telephone terminal 302 via the public line network 300, the server 206 not only allocates any one of communication interface cards 508-1 to 508-n to the call but also outputs the call together with the line number corresponding to the allocated communication interface card 508-x (x: 1 to n) to the game server 208A via the data communication card 26. When a plurality of lines can be allocated to a single communication interface card, a unique line number is allocated to each port of the communication interface card and transmitted to the game server 208A.

The MPU 20 generates control data (binary data) for controlling the game server 208A on the basis of the control program stored in the ROM 21 and outputs the control data to the game server 208A via the data communication card 26 as described above.

The game server 208A performs keyboard emulation on the basis of the inputted control data (binary data) and controls the display of the character (including the display of the character's reaction along with his movement and action) corresponding to the line number on a screen.

More specifically, the MPU 35 of the game server 208A operates on the basis of the control program stored in the ROM 36 and stores the control data (binary data) inputted from the packet gateway server 206 in the RAM 37.

Then, the MPU 35 converts the control data (binary data) inputted on the basis of the keyboard emulation function into an operation code and passes the operation code to the game application, whereby the game proceeds.

[5.2] Operation at the Time of Multiuser Communication

Next, a description will be given to the operation when multiuser communication is carried out in the fourth embodiment of the present invention. In this case as well, since the first network game server 200-1 and the second network game server 200-2 operate basically in the same manner, the second network game server 200-2 will be mainly described hereinafter.

The game server 208A is set to make a multiuser-communication-initiation request when the (game) characters of players come close to each other within a predetermined distance on the screen of the large-screen display 209 as indicated by the symbols C and D in FIG. 25. For example, the game server 208 is set to make the request when adjacent characters come close to each other within a predetermined distance.

This setting implies that the characters are close enough to each other to communicate with each other.

In such a state, the game server 208 transmits the multiuser-transmission-initiation request together with the two line numbers (numbers specifying communication interface cards) corresponding to the game characters C and D to the packet gateway server 206 in order to request the initiation of multiuser communication.

Receiving the request and the line numbers, the packet gateway server 206 electrically connects the communication interface cards corresponding to the two received line numbers, and an audio packet channel is formed between the two telephone terminals, whereby communication is established.

Thereafter, the packet gateway server 206 transmits a multiuser-communication-initiated notification to the game server 208 to notify the game server 208 that multiuser communication has been initiated.

As a result, the players corresponding to the characters C and D, for example, can easily exchange such words as "Hello" and "Hi" with each other via the earphones and microphones of the portable telephone terminals.

While the multiuser communication is in progress, the game server 208 transmits a multiuser-communication-status request together with the number of the selected line in order to inquire the packet gateway server 206 at predetermined time intervals whether the selected line is currently connected to any of other lines or not. The packet gateway server 206 refers to a line-status database for the received line number. When the selected line is being connected to any of other lines, the packet gateway server 206 transmits a multiuser-communication-status notification including a group of line numbers, while when the selected line is connected to none of other lines, the packet gateway server 206 transmits a multiuser-communication-status notification to notify the status.

Thereafter, when the character C has stopped playing the game, the game server 208 transmits a multiuser-communication-termination request together with the two line numbers corresponding to the characters C and D to the packet gateway server 206 in order to request the termination of the communication between particular players, i.e., the players corresponding to the characters C and D, and the packet gateway server 206 electrically disconnects the communication interface cards corresponding to the received two line numbers from each other. By the disconnection, the audio channel formed between the two players corresponding to the characters C and D is cut, whereby the communication is terminated. Thereafter, the packet gateway server 206 transmits a multiuser-communication-terminated notification to the game server 208 to notify the game server 208 that the multiuser communication has been terminated.

[6] Effect of the Fourth Embodiment

As described above, according to the fourth embodiment of the present invention, a telephone terminal (such as mobile telephone and PHS) capable of packet communication is used as a control terminal, and packets are automatically generated in sequence on the basis of the operations of operating buttons (keys). Therefore, a time lag associated with the packet communication is reduced to a minimum, whereby the operability improves, and everybody can participate in the game with ease. Further, players can establish audio communication with each other using audio packets.

In addition, since the large-screen display can be placed anywhere, the game can be played at a variety of places.

[F] Modified Examples of the Embodiment

[1] The First Modified Example

While one large-screen display is provided for one game server in the above description, a plurality of large-screen displays placed at different locations may be provided for one game server.

By such a constitution, players in Tokyo and Osaka can participate in the same game by viewing the same screen image.

Further, it is also possible for a player to resume playing the same game on another large-screen display even after he moves to another place.

[2] The Second Modified Example

While it has been described above that multiuser communication is carried out when characters on the screen come within a predetermined range, it is also possible to carry out the multiuser communication by selecting a specific character.

In this case, the character may be selected not only by the game server but also by a player.

What is claimed is:

1. A network information system comprising a plurality of telephone terminals, a signal converter adapted to connect with said telephone terminals through public communication lines, a server adapted to connect with said signal converter through a communication line, wherein each of said telephone terminals comprises:
an operation unit; and
a signal transmitter for transmitting a DTMF signal in response to an operation applied to said operation unit;

said signal converter comprises:
a signal converting unit for converting a DTMF signal received from each of said telephone terminals into control data; and
a data transmitter for transmitting said control data to said server; and said server comprises:
a receiver for receiving said control data generated on the basis of said DTMF signals of said plurality of telephone terminals; and a processor for executing an application program using said control data received by said receiver, wherein said control data corresponds to one or more of said plurality of telephone terminals.

2. The network information system according to claim 1 wherein said signal converter further comprises a connection-request-rejecting unit for rejecting a connection request from a telephone terminal that is not pre-registered.

3. The network information system according to claim 2 wherein said connection-request-rejecting unit comprises a message-transmitting unit for transmitting a message indicating rejection of said connection request to said telephone terminal that is not pre-registered.

4. The network information system according to claim 1 wherein said sign converter further comprises:

an audio information storing unit for storing audio information in advance; and an audio information transmitting unit for transmitting said audio information stored in said audio information storing unit to a telephone terminal in response to an audio output instruction from said server.

5. The network information system according to claim 1 wherein said data transmitter further comprises a data transmission prohibiting unit for prohibiting transmission of control data corresponding to a telephone terminal that is not permitted to transmit said control data.

6. The network information system according to claim 1 wherein a plurality of communication lines are provided between said signal converter and said server, and wherein said data transmitter simultaneously transmits said control data using said plurality of communication lines.

7. The network information system according to claim 1 wherein said signal converter further comprises a target selecting unit for selecting said server on the basis of a DTMF signal received from a telephone terminal.

8. The network information system according to claim 1 wherein:

said server further comprises a connection instructing unit for providing a connection instruction including a designation of at least two telephone terminals on the basis of an executed result of said application program, and transmitting said connection instruction to said signal converter; and said signal converter further comprises a voice communication line forming unit for forming a voice communication line between said telephone terminals designated by said connection instruction.

9. The network information system according to claim 8 wherein:

said data transmitter of said signal converter transmits a communication line number of a communication line used for communication with a telephone terminal together with said control data obtained from said DTMF signal from said telephone terminal; and said connection instructing unit of said server includes in said connection instruction communication lines of said telephone terminals to be connected to said signal converter.

10. The network information system according to claim 8 wherein when said executed result satisfies a predetermined condition, said connection instructing unit determines at least two telephone terminals in the generation of said result as partners of said voice communication.

11. The network information system according to claim 8 wherein said signal converter further comprises a channel disconnecting unit for disconnecting, in accordance with an instruction from said server, one of said telephone terminals from said voice communication line formed by said voice communication line forming unit.

12. The network information system according to claim 1 wherein said server further comprises a data transmitter for transmitting a communication line number of a telephone terminal and data addressed to said telephone terminal to said signal converter through at least one of said communication lines.

13. The network information system according to claim 1 wherein said application program is a game application program and said control data is for controlling the game.

14. The network information system according to claim 1 wherein said application program is an accumulation program and said control data is data to be accumulated.

15. The network information system according to claim 1 further comprising a device for making open to the public an executed result of said application program.

16. The network information system according to claim 15 wherein said device for making open to the public said executed result comprises a large screen display for displaying said executed result of said application program.

17. The network information system according to claim 15 wherein said device for making open to the public said executed result comprises means for broadcasting said executed result of said application program on television.

* * * * *

UNITED STATES PATENT AND TRADEMARK OFFICE
CERTIFICATE OF CORRECTION

PATENT NO.   : 6,681,000 B1
DATED        : Janaury 20, 2004
INVENTOR(S)  : Atsushi Moriguchi et al.

It is certified that error appears in the above-identified patent and that said Letters Patent is hereby corrected as shown below:

<u>Column 45,</u>
Line 15, after "wherein said" delete "sign" and substitute -- signal -- in its place.

Signed and Sealed this

Twenty-sixth Day of April, 2005

JON W. DUDAS
*Director of the United States Patent and Trademark Office*